US012367353B1

United States Patent
Mohammed et al.

(10) Patent No.: US 12,367,353 B1
(45) Date of Patent: Jul. 22, 2025

(54) CONTROL PARAMETER FEEDBACK PROTOCOL FOR ADAPTING TO DATA STREAM RESPONSE FEEDBACK

(71) Applicant: U.S. Bancorp, National Association, Minneapolis, MN (US)

(72) Inventors: Ahmed Mohammed Abdelrahman Mohammed, Dallas, TX (US); Anand K. Yadav, Lakeville, MN (US); Samuel Assefa, Watertown, MA (US)

(73) Assignee: U.S. BANCORP, NATIONAL ASSOCIATION, Minneapolis, MN (US)

( * ) Notice: Subject to any disclaimer, the term of this patent is extended or adjusted under 35 U.S.C. 154(b) by 0 days.

(21) Appl. No.: 19/031,222

(22) Filed: Jan. 17, 2025

Related U.S. Application Data

(60) Provisional application No. 63/729,032, filed on Dec. 6, 2024.

(51) Int. Cl.

| | |
|---|---|
| G06F 40/40 | (2020.01) |
| G06F 18/2413 | (2023.01) |
| G06F 40/284 | (2020.01) |
| G06V 10/764 | (2022.01) |
| G06V 10/82 | (2022.01) |
| G06V 30/19 | (2022.01) |

(52) U.S. Cl.
CPC ........ *G06F 40/40* (2020.01); *G06F 18/24147* (2023.01); *G06F 40/284* (2020.01); *G06V 10/764* (2022.01); *G06V 10/82* (2022.01); *G06V 30/19* (2022.01)

(58) Field of Classification Search
CPC .. G06F 40/30; G06F 40/284; G06F 18/24147; G06V 30/19; G06V 10/82; G06V 10/764
See application file for complete search history.

(56) References Cited

U.S. PATENT DOCUMENTS

| | | | |
|---|---|---|---|
| 7,657,473 B1 | 2/2010 | Meffie et al. | |
| 11,537,932 B2 * | 12/2022 | Bobroff | G06N 20/00 |

(Continued)

FOREIGN PATENT DOCUMENTS

| | | |
|---|---|---|
| CN | 118396123 | 7/2024 |

OTHER PUBLICATIONS

Corchado et al., "Generative Artificial Intelligence: Fundamentals," (2023) ADCAIJ: Advances in Distributed Computing and Artificial Intelligence Journal, Regular Issue, vol. 12, N. 1, e31704.

(Continued)

*Primary Examiner* — Kevin Ky
(74) *Attorney, Agent, or Firm* — FOLEY & LARDNER LLP

(57) ABSTRACT

A method and related systems for providing adaptive responses by varying parameters used to select content includes obtaining an accuracy feedback indicator associated with a first generated message and determine an updated context generation component by applying a feedback-based protocol to the first state to set the control parameters to a second state based on the accuracy of the first generated message. Some embodiments may then generate a content sequence using the modified control parameters and use the content sequence as an input context for a second query to a language model.

17 Claims, 18 Drawing Sheets

(56) References Cited

U.S. PATENT DOCUMENTS

| | | |
|---|---|---|
| 11,694,227 B1 | 7/2023 | Belanger et al. |
| 11,783,432 B1 | 10/2023 | Haas et al. |
| 12,314,304 B1* | 5/2025 | Bachman .............. G06F 16/358 |
| 2013/0144785 A1 | 6/2013 | Karpenko et al. |
| 2013/0191213 A1 | 7/2013 | Beck et al. |
| 2013/0325681 A1 | 12/2013 | Somashekar et al. |
| 2017/0075958 A1* | 3/2017 | Duffy .................. G06F 16/2455 |
| 2017/0249339 A1* | 8/2017 | Lester .................... G06F 16/56 |
| 2018/0300794 A1* | 10/2018 | Viederman ........ G06Q 30/0631 |
| 2018/0329990 A1* | 11/2018 | Severn ................. G06F 16/335 |
| 2020/0012953 A1 | 1/2020 | Sun et al. |
| 2020/0097496 A1* | 3/2020 | Alexander ............ G06F 16/355 |
| 2021/0149963 A1 | 5/2021 | Agarwal et al. |
| 2021/0397610 A1 | 12/2021 | Singh et al. |
| 2022/0318522 A1 | 10/2022 | Wolf et al. |
| 2023/0153522 A1 | 5/2023 | Cho et al. |
| 2023/0230091 A1 | 7/2023 | Vaughn |
| 2023/0259708 A1 | 8/2023 | Pouran Ben Veyseh et al. |
| 2023/0325610 A1 | 10/2023 | Peleg et al. |
| 2024/0095536 A1* | 3/2024 | Lin ........................ G06N 3/084 |
| 2024/0126575 A1 | 4/2024 | Kiriakou et al. |
| 2024/0202539 A1 | 6/2024 | Poirier et al. |
| 2024/0211750 A1 | 6/2024 | Sandbo et al. |
| 2024/0403450 A1* | 12/2024 | Nowak ............... G06F 21/6218 |

OTHER PUBLICATIONS

Yin, J., "AI Technology and Online Purchase Intention: Structural Equation Model Based on Perceived Value," (2021) Sustainability 13.10: 5671, MDPI AG, 19 pages.

* cited by examiner

1100

Text: Your premier credit card was used at Store A in Elkin NC at 4:30 ET on 12/20/22 in the amount of $89.55. Would you like to add a Memo or Instructions? If Yes, respond: V for voice, T for text. If No respond: N
User responds: V
app with Smart Assistant is opened with voice: "what would you like to do"
User speaks: Set expense category to "Home Office Supplies"
app speaks: "That category is not set up. Would you like to add it?"
User speaks: "yes"
app speaks: MM app speaks: "Category set up and expense recorded. Would you like to add a personal memo?
User speaks: "yes"
app speaks: "Record your memo"
User speaks: "Laser Printer toner cartridge"
app speaks: "Your memo is recorded. Would you like something else?"
User speaks: "No"
app speaks: Your Transaction and memo are recorded in the budget tracking section of the Memo log under My Transactions. Thank you for using Memo."

Text: Your premier credit card was used at Store A in Elkin NC at 4:30 ET on 12/20/22 in the amount of $312.55. Would you like to add a Memo or Instructions? If Yes, respond: V for voice, T for text. If No respond: N
User responds: V
app with Smart Assistant is opened with voice: "what would you like to do"
User speaks: "Record expense category for full amount"
app speaks: "What category would you like to use?"
User speaks: "Home office equipment"
app speaks: "Expense recorded to Home Office equipment. Would you like to add a personal memo?
User speaks: "Yes"
app speaks: "Record your memo"
User speaks "HP Laser Jet X1250 with 4-year warranty
app speaks: "would you like to attach a photo of the receipt?
User speaks "NO"
app speaks: Category and MEMO are recorded in the budget tracking Memo log under My Transactions. Thank you for using Memo."
User later receives an email with a copy of the receipt which they file in their documents file folder. User opens Money Memo app, locates the transaction in their MEMO transaction log and attaches the file of the receipt to the logged transaction.

Text: Your _____ premier credit card was used at Store A in Elkin NC at 4:30 ET on 12/20/22 in the amount of $312.55. Would you like to add a Memo or Instructions? If Yes, respond: V for voice, T for text. If No respond: N
    User responds: V
    app with Smart Assistant is opened with voice: "what would you like to do"
app speaks: "Record expense category for full amount"
    User speaks: "What category would you like to use?"
    User speaks: "Home office equipment"
app speaks: "Expense recorded to Home Office equipment. Would you like to add a personal memo?
    User speaks: "Yes"
app speaks: "Record your memo"
    User speaks: "HP Laser Jet X1250 with 4-year warranty.
app speaks: "would you like to attach a photo of the receipt?
    User speaks: "Yes, multiple pages"
app opens camera app and speaks: "align receipt in the window with top at the indicated location and snap"
    User snaps and reviews the photo of receipt —speaks: "Photo is good. Next photo"
app opens camera app and speaks: "align receipt in the window with top at the indicated location and snap"
    User snaps and reviews the photo of the warranty–speaks: "Photo is good. Also record transaction and photos in Warranties"
app speaks: All Photos of your receipt and warranty are recorded in the transaction tracking section and warranty tracking section of the Memo log under My Transactions. Thank you for using Memo."

Text: Your _____ premier credit card was used at Store A in Elkin NC at 4:30 ET on 12/20/22 in the amount of $93.75. Would you like to add a Memo or instructions? If Yes, respond: V for voice, T for text. If No respond: N
User responds: V
    app with Smart Assistant is opened with voice: "what would you like to do"
    User speaks: Record expense in Multiple categories"
app speaks: "What is your first category and amount" and shows top choices on screen (one is groceries)
    User speaks: "groceries with Amount "$58.55"
app speaks: "What is your next category, and amount- you have $35.20 remaining" and shows Prescription RX, non-RX medicine, health care, merchandise, custom, etc.
    User speaks: "custom - for remaining balance"
app speaks: What category name do you want to create (max 50 characters)?
    User speaks: "Charitable contributions with a receipt"
app speaks "we recorded your new category- 'Charitable contributions with a receipt' and allocated the balance of $35.00. Would you like to add a personal memo?"
    User speaks "yes"
app speaks: "Record your memo"
    User speaks: "Contribution was for Elkin 1st United Methodist church to fund school supplies for the local school December backpack drive."
app speaks: "would you like to attach a photo of the receipt?
    User speaks "Yes"
app opens camera app and speaks: "align receipt in the window with top at the indicated location"
    User snaps and reviews the photo —speaks: "Photo is good. This is all I need"
app speaks: Photo of your receipt is recorded in the receipt tracking section of the Memo log under My Transactions. Thank you for using _____ 'Memo."

Text: Your _____ premier FREELANCE credit card was used at Store A in Elkin NC at 4:30 ET on 12/20/22 in the amount of $108.80. Would you like to add a Memo or Instructions? If Yes, respond: V for voice, T for text. If No respond: N User responds: V app with Smart Assistant is opened with voice: "what would you like to do"

User speaks: "Record expense in Multiple Freelancer categories"

app speaks: "What is your first category and amount" and shows top choices of business expenses on screen (one option is office supplies)

User speaks: "Category is "business-office supplies" with AMOUNT of "$58.55" and MEMO-- "office supplies used on John Taylor Job" -- also record the expense under Category -Business Tax-office supplies"

app speaks: "What is your next category, and amount-you have $50.25 remaining" and displays Business-Photo Services, Custom, etc.

User speaks: "Category is business-photo services- with Amount 35.00 and MEMO --wall posters for the Andy Capp job" also record the expense under Category- business tax- photo services"

app speaks "What is your next category, and amount-you have $15.25 remaining and shows personal expense categories and options groceries, medicine, office supplies, etc."

User speaks "personal-groceries with AMOUNT 15.25 and "MEMO --discretionary food"

app speaks: "You have $0.0 remaining; would you like to attach a photo of the receipt?"

User speaks "Yes"

app opens camera app and speaks: "align receipt in the window with top at the indicated location"

User snaps and reviews the photo --speaks: "Photo is good. This is all I need"

app speaks: Photo of your receipt is recorded in the business and personal receipt tracking sections of the Memo log under My Transactions. Thank you for using _____ Memo."

FIG. 15

1600 app with Smart Assistant is opened with voice: "what would you like to do"
User speaks: Capture Cash expense
app speaks: "Who did you pay?"
User speaks: "Elkin NC"    Charity A    "
app speaks: "What Amount and Category would you like to use?
User speaks: "$20.00 with Category Contribution-Cash Out of Pocket"
app speaks: MM app speaks: "$20.00 Contribution-Cash Out of Pocket paid to Elkin NC
Charity A    ". Would you like to add a personal memo?
User speaks: "No"
app speaks: "Would you like anything else?"
User speaks: "Also record the transaction in the personal taxes folder. That is all"
app speaks: "Transaction is recorded in the budgeting AND Personal Tax tracking sections
of the Memo log under My. Have a nice day"

FIG. 16

CONTROL PARAMETER FEEDBACK PROTOCOL FOR ADAPTING TO DATA STREAM RESPONSE FEEDBACK

CROSS-REFERENCE TO RELATED APPLICATIONS

This application claims the benefit of priority to U.S. Provisional Application No. 63/729,032, filed Dec. 6, 2024, the entirety of which is incorporated by reference herein.

BACKGROUND

Network systems must perform traffic management in the context of providing generative response capabilities and real-time data stream analysis. These systems receive real-time user query streams and other data streams on a continuous basis and may be expected to respond to feedback about the quality of the data or data content being provided in an automated manner. Systems may employ load balancers and other subsystems to dynamically adjust resource allocation and application configuration based on the feedback.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 11-16 are example conversations for example scenarios of communication between a user and one or more computing devices regarding a transaction, in accordance with an implementation.

FIG. 18 illustrates an example machine learning framework that techniques described herein may benefit from.

DETAILED DESCRIPTION

Figure 1:
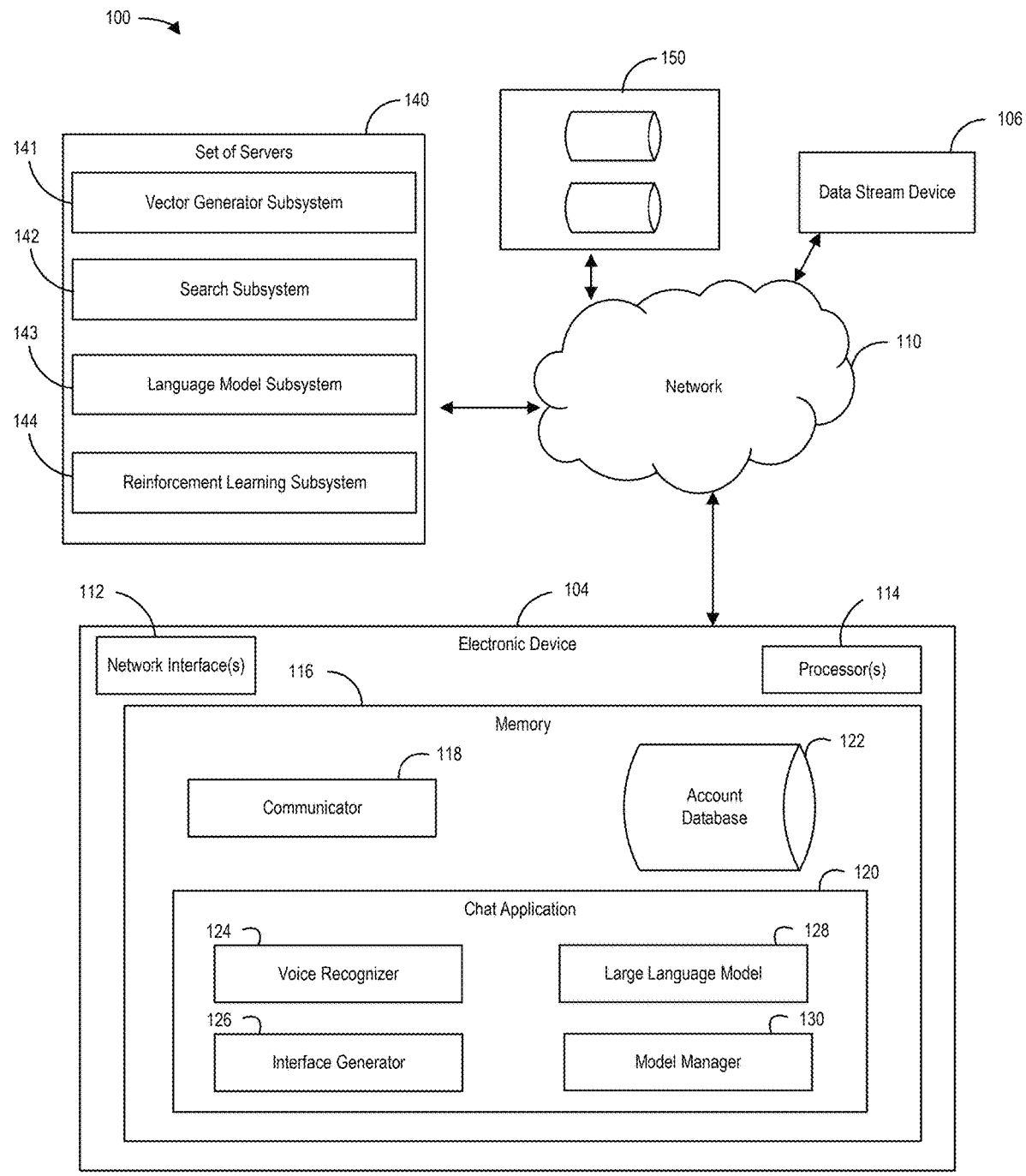
FIG. 1 is an illustration of an example conceptual diagram for using large language processing, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The implementation of generative responses and other machine learning capabilities in a networked system faces several interconnected technical hurdles. When network usage patterns shift, models must offer continuous learning and deployment. Furthermore, the massively concurrent nature of modern applications may create significant scaling challenges. In addition, the computational resources needed for providing real-time responses operations often compete with the network optimization resources. Multimodal inputs may create gaps in data quality across different devices and user populations, challenging the ability to make consistent responses.

Some embodiments may provide an adaptive response to a single client device or multiple client devices by varying control parameters (e.g., hyperparameters) based on feedback provided by the one or more client devices. For example, some embodiments may obtain a set of vectors associated with a user prompt (e.g., a user-provided text sequence) and a second vector associated with a data stream. Some embodiments may then select a vector subset by determining a ranking of distances between content vectors stored in a vector database and at least one of the first or second vectors using control parameters configured to a first state. By using a vector-based search, some embodiments may integrate content of various types into an input context. Some embodiments may then obtain a first message by sending, to a language model, a prompt that includes the user-text sequence and an input context that includes first content associated with the first vector subset. Some embodiments may then obtain feedback indicating an accuracy metric for the first message or another performance metric associated with the first message.

Some embodiments may determine, based on the accuracy feedback indicator, that a performance of the context generation component is inappropriate and, in response, update the context generation component by applying a feedback-based protocol to the first state to set the control parameters to a second state based on the accuracy feedback indicator. By updating the context generation component, some embodiments may increase the quality and reliability of input contexts used by language models to improve the accuracy language model outputs. Furthermore, because the search algorithms are being evolved in this process, improvements created by reinforcement learning is adaptable to multiple types of inputs that may be converted into a vector representation.

While input augmentation operations in the context of language models may provide benefits, language models may often have insufficient information to determine which domain-specific knowledge to retrieve. When a language model lacks sufficient context for a prompt, the language model may hallucinate details, misinterpret a query's domain, or generate overly generic responses. Furthermore, even if augmentation operations are performed, such operations may benefit from user-specific details for which the user himself may be unaware. However, operations to retrieve the correct context even with user-specific details may be hampered by the specificity of user-specific interpretations of accuracy or relevance.

Some embodiments may address one or more of these problems by performing one or more operations described in this disclosure. For example, some embodiments may obtain a text sequence representing a prompt from a user and data stream data associated with the user. Some embodiments may generate representative vectors for the prompt and data stream data to generate a first vector and a second vector, respectively. Some embodiments may select a first vector subset by determining a ranking of first distances between content vectors and at least one of the first vector or the second vector, where the control parameters for determining the distances is configured to a first state. By using vector-based search methods, some embodiments may process multi-modal inputs (e.g., be able to retrieve content related to both text and audio, text and image data, etc.). Furthermore, vector-based search methods may be scaled to perform concurrent searches across multiple databases.

As described, some embodiments may generate a first vector from a user prompt and a second vector from data stream data related to the user. Some embodiments may then generate a first language model input that includes the user-provided text sequence as a prompt and a first input context. The first input context may include data stream data and content mapped to a vector subset resulting from a vector search. For example, some embodiments may construct an input that provides retrieved documents D1, D2, and D3, where D1, D2, and D3 each map to a respective vector of a vector subset retrieved based on distances to the first vector or the second vector. By using distances from the second vector to determine what content to include in an input context, some embodiments may update the input context.

Some embodiments may then receive a feedback indicator indicating whether a previously provided output was accurate or relevant. Some embodiments may then update the control parameters to a second state using a feedback-based protocol acting as a reinforcement learning agent. In some embodiments, a trigger for activating the feedback-based protocol or a parameter to determine the direction or magnitude of changes made by the feedback-based protocol may be determined based on the feedback indicator. For example, if a feedback indicator suggests that a previous answer was sufficiently accurate and relevant, some embodiments may change the state of the control parameters using a same parameter space directional vector of a previous update. Alternatively, some embodiments may simply leave unchanged the state of the control parameters used to perform a search in the case that feedback indicating output satisfaction is received.

After updating the control parameters to a second state using the feedback-based protocol, some embodiments may re-determine the distances between the content vectors and a first vector generated from a user prompt or a second vector generated from the data stream data. The distances may be different due to the change in the control parameters to the second state. Some embodiments may then rank this second set of distances to determine a second vector subset and obtain a second message by sending the data stream data, second content mapped to the second vector subset, and the text sequence to the language model. Some embodiments may then receive additional feedback indicators, perform additional updates to the control parameters using the feedback-based protocol, where such updates may take place during a training session or in real-time with actual user inputs. By using the feedback-based protocol to test different combinations of a search operation's control parameter space, some embodiments may improve the accuracy, relevancy, or user-specific criteria associated with a language model's output. Furthermore, some embodiments may transfer parameter sets developed for one user to be applicable to searches performed for other users, increasing the scalability of such operations to mass deployment.

In brief overview, the system 100 can include a set of servers 140 and an electronic device 104. The set of servers 140 can be configured to store various types of data, such as data stream data from a data streaming device 106. The set of servers 140 can transmit data to the electronic device 104 and the electronic device 104 can execute a large language processing model to receive contextual information regarding the transaction from a user of the electronic device 104. The electronic device 104 can transmit the contextual information to the set of servers 140 for storage. The set of servers 140, the electronic device 104, or the data streaming device 106 can communicate over a network 110. The system 100 may include more, fewer, or different components than shown in FIG. 1.

The set of servers 140, the electronic device 104, and/or the data streaming device 106 can include or execute on one or more processors or computing devices and/or communicate via the network 110. The network 110 can include computer networks such as the Internet, local, wide, metro, or other area networks, intranets, satellite networks, and other communication networks such as voice or data mobile telephone networks. The network 110 can be used to access information resources such as web pages, websites, domain names, or uniform resource locators that can be presented, output, rendered, or displayed on at least one computing device (e.g., the set of servers 140, the electronic device 104, and/or the data streaming device 106), such as a laptop, desktop, tablet, personal digital assistant, smartphone, portable computers, or speaker.

The set of servers 140, the electronic device 104, and/or the data streaming device 106 can include or utilize at least one processing unit or other logic devices such as a programmable logic array engine or a module configured to communicate with one another or other resources or databases to perform one or more of the operations described in this disclosure. As described herein, computers can be described as computers, computing devices, or client devices. The set of servers 140 and/or the data streaming device 106 may each contain a processor and a memory. The components of the set of servers 140, the electronic device 104, and/or the data streaming device 106 can be separate components or a single component. The system 100 and its components can include hardware elements, such as one or more processors, logic devices, or circuits.

The set of servers 140 can be a server or computer that is configured to store various types of data, such as data stream data, image data, audio data, other types of content data, etc.

For example, the set of servers 140 can store ledgers for different accounts in memory (e.g., in a database in memory).

The accounts for which the set of servers 140 stores ledgers and transaction data can include profile data. The profile data can include identifiers of electronic devices that correspond to the different accounts and/or identifiers of transaction cards that correspond to the different accounts. The set of servers 140 can store transaction data for transactions in the accounts based on the identifiers of the transaction cards that performed the transaction matching identifiers in the respective accounts.

The electronic device 104 may include one or more processors that are configured to provide a chat interface that a user can use to add contextual data for a transaction to a record of transaction data that the set of servers 140 stores for the transaction. The electronic device 104 may comprise a network interface 112, a processor 114, and/or memory 116. The electronic device 104 may communicate with the set of servers 140 via the network interface 112, which may be or include an antenna or other network device that enables communication across a network and/or with other devices. The processor 114 may be or include an ASIC, one or more FPGAs, a DSP, circuits containing one or more processing components, circuitry for supporting a microprocessor, a group of processing components, or other suitable electronic processing components. In some embodiments, the processor 114 may execute computer code or modules (e.g., executable code, object code, source code, script code, machine code, etc.) stored in memory 116 to facilitate the operations described herein. The memory 116 may be any volatile or non-volatile computer-readable storage medium capable of storing data or computer code.

The memory 116 may include a communicator 118, a chat application 120, and/or an account database 122, in some embodiments. In brief overview, the chat application 120 may cooperate to generate and/or maintain a chat interface at a display of the electronic device and/or through which a user can provide voice data. The chat application 120 can use large language processing techniques to determine responses based on the transaction data of the transaction and, in some cases, account data of an account associated with the user. Upon completing the interaction with the user and collecting contextual information regarding the transaction through the chat interface, the electronic device 104 can transmit the contextual information to the set of servers 140 to store in a record (e.g., a file, document, table, listing, message, notification, etc.) with the other transaction data of the transaction.

The communicator 118 may comprise programmable instructions that, upon execution, cause the processor 114 to communicate with the set of servers 140 and/or any other computing device. The communicator 118 may be or include an application programming interface (API) that facilitates communication between the electronic device 104 (e.g., via the network interface 112) and other computing devices. The communicator 118 may communicate with the set of servers 140 and/or any other computing device across the network 110.

The communicator 118 can establish a connection with the set of servers 140. The communicator 118 can establish the connection with the set of servers 140 over the network 110. To do so, the communicator 118 can communicate with the set of servers 140 across the network 110. In one example, the communicator 118 can transmit a syn packet to the set of servers 140 and establish the connection using a TLS handshaking protocol. The communicator 118 can use any handshaking protocol to establish a connection with the set of servers 140.

The chat application 120 may comprise programmable instructions that, upon execution, cause the processor 114 to generate a chat interface and communicate with a user of the electronic device 104 through the chat interface. The chat application 120 can additionally communicate and/or control other applications stored in the memory 116 of the electronic device 104. For example, the chat application 120 can automatically activate a camera application stored in the memory 116 responsive to receiving a request at the chat interface to take a picture. The chat application 120 can operate or control any applications stored in the memory 116 of the electronic device 104.

The chat application 120 can include a voice recognizer 124, an interface generator 126, a large language model 128, and a model manager 130. The components 124-130 can operate to maintain a chat interface through which a user of the electronic device 104 can provide inputs and the components 124-130 can operate to provide outputs based on the inputs. The components 124-130 can automatically process the inputs to generate text string responses to images and/or text strings that are provided into the chat interface. In doing so, the components 124-130 can collect additional transaction data regarding transactions, store the additional transaction in the account database 122, and/or transmit the additional transaction data to the set of servers 140. The components 124-130 can do so without relying on predefined templates or complicated user interfaces for the communication.

The processor 114 can activate the chat application 120 or perform other operations described in this disclosure. The processor 114 can activate the chat application 120 in response to receiving the message from the set of servers 140 (e.g., a message indicating a database transaction). For example, the electronic device 104 can receive the message containing database transaction data for a database transaction through the communicator 118. In response to receiving the message, the processor 114 can activate (e.g., open) the chat application 120 to access a user interface provided by the chat application 120.

Upon opening or activating the chat application 120, the interface generator 126 of the chat application 120 can generate and/or present a user interface of the chat application 120. The interface generator 126 can comprise programmable instructions that, upon execution, cause the processor 114 to generate a user interface of the chat application 120. Upon receiving the selection, the interface generator 126 can configure the chat application 120 to receive audio data from the microphone of the electronic device 104 through a chat interface. The user interface can include a form or an input portion or the user can navigate the user interface to such a form or input portion. The form or input portion can be located on a chat interface of the chat application 120. The user can provide text, video, or image input into the form or input portion of the user interface. In some cases, the electronic device 104 can receive audio recordings and the chat application 120 can automatically translate the audio records into text. The chat application 120 can input the translated text into the chat interface.

The voice recognizer 124 may comprise programmable instructions that, upon execution, cause the processor 114 to convert audio into text. For example, the user of the electronic device 104 can speak into a microphone of the electronic device. The microphone can capture the speech as audio data and transmit the audio data to the chat application 120. The voice recognizer 124 can convert speech into text, such as by using Fourier transforms. The voice recognizer 124 can cluster and classify words of the text to generate a prompt (e.g., a feature vector of input data) or input to insert into the large language model 128.

In some embodiments, a message to the electronic device 104 from the set of servers 140 may include a string of text asking whether the user wishes to use voice or text to provide input into the chat application 120. The user may respond to the message (e.g., send a message, such as a text message, back to the set of servers 140) with an indication to use voice to provide input into the chat application 120. The indication may be, for example, the letter "q." The electronic device 104 can transmit the message containing the indication to the set of servers 140. The set of servers 140 can transmit a message back to the electronic device 104 that causes the processor 114 to activate the chat application 120 and generate a voice chat interface through which the chat application 120 can receive inputs from the user via the microphone of the electronic device 104.

The large language model 128 can be or include a machine learning model (e.g., neural network, a transformer, etc.) that has been trained to output a text sequence to a chat interface of the chat application 120 in response to inputs at the chat interface. The large language model 128 can be trained using few-shot and/or zero-shot learning techniques.

In some embodiments, the large language model 128 can be trained to output responses to inputs regarding data stream data. The large language model 128 can output the request as a string of text to the chat interface for display on the electronic device 104. The text-to-speech converter can convert the text into audio data. The electronic device 104 can play audio data through speakers of the electronic device 104. The large language model 128 can receive a response to the request either as a text input into the chat interface or as audio input into the chat interface and automatically generate a new string of text based on the response. The large language model 128 can iteratively repeat this process to maintain a conversation with the user through the chat interface of the chat application 120.

In some embodiments, the large language model 128 is stored at the set of servers 140. For example, the electronic device 104 can communicate or otherwise establish a communication session with the set of servers 140. The electronic device 104 can transmit the inputs as text in messages to the set of servers 140. The set of servers 140 can input the text into the large language model 128 stored in memory of the set of servers 140 and execute the large language model 128. The large language model 128 can generate responses to the inputs as text. The set of servers 140 can transmit the responses to the electronic device 104. The electronic device 104 can present the responses to the user at the chat interface as text or audio data. The user can view or hear the responses and provide further input based on the responses. The electronic device 104 can iteratively repeat this process to maintain a conversation between the user and the large language model 128.

The model manager 130 may comprise programmable instructions that, upon execution, cause the processor 114 to provide inputs into the large language model 128, execute the large language model 128, and identify outputs of the large language model 128. For example, the user of the electronic device 104 can speak into a microphone of the electronic device 104. The microphone can capture the speech as audio data and transmit the audio data to the chat application 120. The model manager 130 can execute the large language model 128 based on such inputs to cause the large language model 128 to output responses to the prompts or inputs. The model manager 130 can facilitate an interaction between the large language model 128 and a user accessing the electronic device 104, such as an interaction regarding a database transaction or financial transaction. For example, the user can select an option in a push notification displayed on the display of the electronic device 104 (or send a text message response to the message from the set of servers 140) to add additional transaction data for the transaction. In response to the selection by the user, the processor 114 of the electronic device 104 can activate or open the chat application 120. The model manager 130 can input the transaction of the transaction into the large language model 128. The model manager 130 can execute the large language model 128. The large language model 128 can output a text response requesting further data regarding the transaction based on the input transaction data. The model manager 130 can display or play the text response for the user through the chat interface.

Subsystems 141-144

In some embodiments, the set of servers 140 may use a vector generator subsystem 141 to store vector representations of content retrieved from the electronic device 104, the data streaming device 106, or another computer system described in this disclosure. The vector generator subsystem 141 may perform operations such as tokenizing text, converting tokens in embedding vectors, or otherwise performing operations to store convent vectors mapping to content in a set of vector databases 150. Additionally, the vector generator subsystem 141 may generate a query vector or a client feature vector from data provided by the electronic device 104 or the data streaming device 106. For example, the set of servers 140 may receive prompt text from the electronic device 104, process it through a pre-trained embedding model, and output a dense vector representation as a query vector. Alternatively, or additionally, the set of servers 140 may receive data stream data from the data streaming device 106, process it through a pre-trained embedding model, and output a dense vector representation as a query vector.

In some embodiments, the set of servers 140 may use a search subsystem 142 to search for content data related to one or more queries retrieved from the electronic device 104 or another computer system described in this disclosure. For example, the set of servers 140 may generate a set of content vectors based on content provided by the electronic device 104, the data streaming device 106, or external data sources. Some embodiments may then use the search subsystem 142 to search the set of content vectors based on a query vector or a client feature vector. For example, the search subsystem 142 may use approximate nearest neighbor algorithms like Hierarchical Navigable Small World (HNSW) or Inverted File Index (IVF) to find content vectors that are close to a client feature vector in a high-dimensional space. For example, the search subsystem 142 may calculate a set of cosine similarity scores between the query vector and candidate content vectors and select closest matching documents based on a similarity threshold to include an input context for a language model (e.g., the large language model 128). Some embodiments may perform a vector similarity search algorithm (VSSA) to search for one or more content vectors. Some embodiments may then construct an input context for a language model that includes the content from which the one or more content vectors is generated.

In some embodiments, the set of servers 140 may use a language model subsystem 143 to generate a set of outputs. In some embodiments, the language model subsystem 143 may include its own version of a large language model. For example, the set of servers 140 may host and execute its own version of a transformer-based language model having over two billion parameters. Alternatively, or additionally, the language model subsystem 143 may access an API to use a language model hosted on another server. In some embodiments, the language model subsystem 143 may access the large language model 128 on the electronic device 104.

When using a language model, the language model subsystem 143 may provide the language model with a text sequence representing a prompt and an input context. The input context may be generated from data stream data provided by the electronic device 104, the data streaming device 106, or other computer devices. Some embodiments may use an input context that includes content used to generate a set of content vectors retrieved using VSSA operations or other search operations performed by the search subsystem 142.

In some embodiments, the set of servers 140 may use a reinforcement learning subsystem 144 to update one or more control parameters (i.e., hyperparameters) of the search subsystem 142. A reinforcement learning subsystem 144 may perform an action related to setting control parameter values (e.g., set control parameters for a search operation at a first state), receiving a reward signal indicating performance (e.g., obtaining an indication of increased accuracy as a successful reward, obtaining an indication of failure, etc.), and adjusting control parameters (e.g., through gradient descent or another gradient-based method) to increase future reward values.

Some embodiments may use the reinforcement learning subsystem 144 to update various types of control parameters used to perform the search subsystem 142. For example, some embodiments may update the number of clusters in the case that the search subsystem 142 uses an IVF search operation. In some embodiments, the reinforcement learning subsystem 144 may modify control parameters such as the number of neighbors to search (k), an approximation factor (epsilon), or a distance metric type (e.g., cosine, Euclidean, Manhattan, etc.). In some embodiments, the reinforcement learning subsystem 144 may modify parameters that may impact computational performance. For example, if the search subsystem 142 performs a HNSW operation, the reinforcement learning subsystem 144 may modify an index construction graph quality (M) or search depth (efSearch) parameter.

Figure 2:
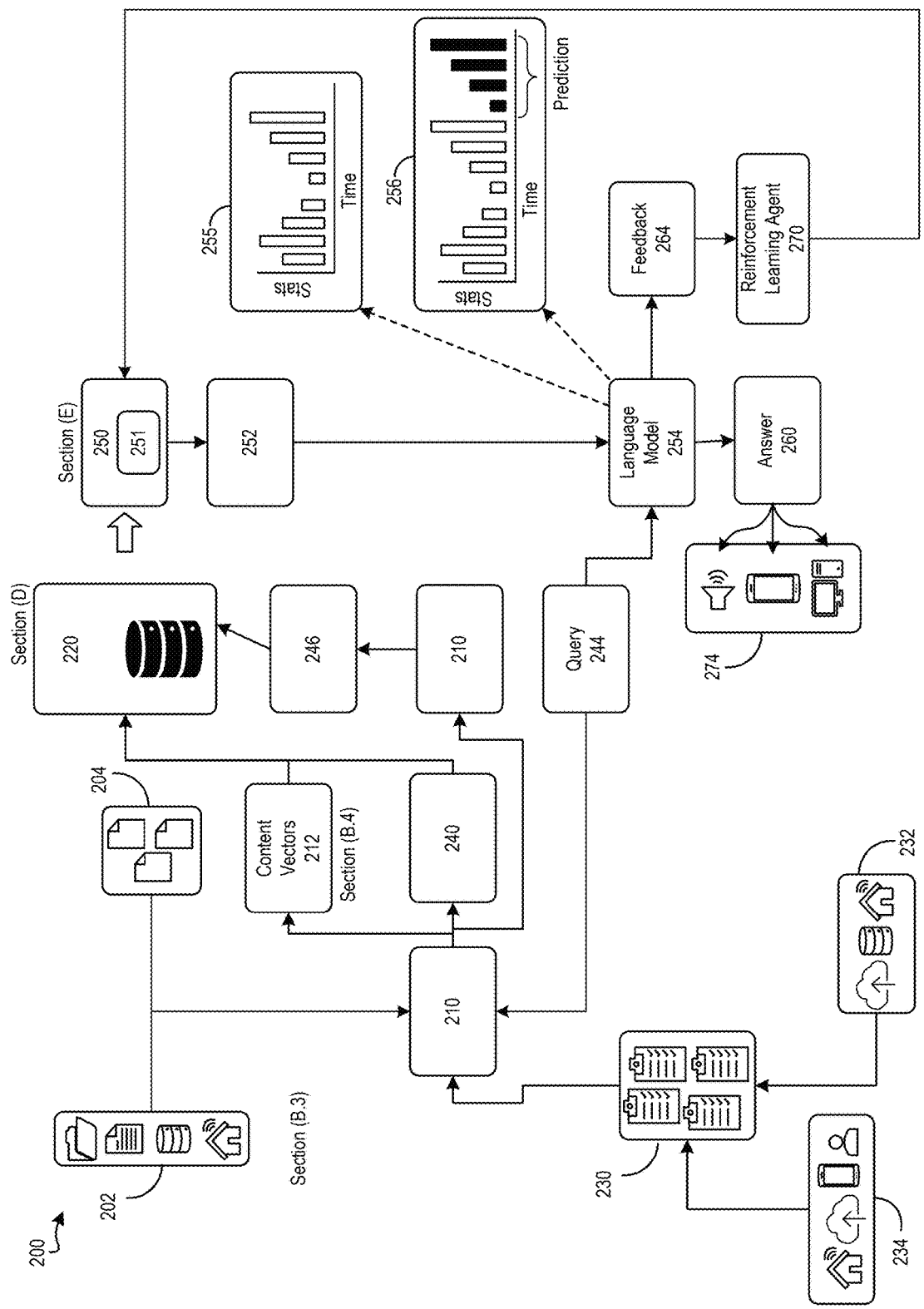
FIG. 2 is an illustration of an example conceptual architecture for using large language processing, in accordance with an implementation.

FIG. 2 depicts an example conceptual diagram for using large language processing, in accordance with an implementation. In some embodiments, a system 200 may obtain content 202 and content 204 in order to use in a database. In some embodiments, the content 202 may include documents, computer files, database records or other data from other databases, sensor data, etc. The content 204 may include pre-processed documents or other data. An encoder subsystem 210 may receive the content 202 and the content 204 to generate a set of content vectors 212. The encoder subsystem 210 may include an encoder model and an embedding model, which may be used together to generate vectors. For example, the encoder subsystem 210 may provide data from the content 204 to an embedding model (e.g., Word2Vec (Continuous Bag of Words and Skip-gram), Global Vectors for Word Representation (GloVe), and FastText, etc.) to generate an initial set of embedding vectors. The encoder subsystem 210 may then provide the embedding vectors to an encoder model such as a transformer-based model (e.g., Bidirectional Encoder Representations from Transformers (BERT), Robustly Optimized BERT Pretraining Approach (ROBERTa), Generative Pre-trained Transformer (GPT), etc.) to generate a set of output embeddings that may be included in the set of content vectors 212.

In some embodiments, the content 202 may include various types of collected data. For example, the content 202 may include nutrition data from one or more nutrition-associated publicly available databases. The content 202 may include personalized data, such as a household electric power consumption data, user transactional data (e.g., those from the bank databases), Internet of Things devices data, scanned data, etc.

Some embodiments may store the set of content vectors 212 into a set of vector databases 220. For example, the encoder subsystem 210 may perform vectorization operations by providing text data from the content 202 to an embedding neural network of the encoder subsystem 210 (e.g., a transformer-based neural network or a simple one or two-layer neural network). Some embodiments may further use indexing operations to index the vectors in the set of vector databases 220. For example, some embodiments may use indexing operations associated with a vector search indexing algorithm ("VSIA") to generate indexing-related data structures by performing indexing-related methods, such as KD-tree-based methods, locality-sensitive hashing techniques, or graph-based methods.

The data stored in the set of vector databases 220 may be stored in various forms, such as vectors of the set of content vectors 212 representing document text weights or representing portions of those documents. In some embodiments, different portions of different documents may the associate with different content vectors stored in the set of vector databases 220. Furthermore, vectors stored in the set of vector databases 220 may be stored in various forms. For example, some embodiments may store a record in the of "[ID|Numerical Values]," where "ID" may represent a vector identifier, and "Numerical Values" may represent a set of vector weights.

Some embodiments may further receive data 230 from a first set of client devices 232 or a second set of client devices 234. In some embodiments, the first set of client devices 232 includes user-controlled devices such as smart phones, Internet-accessible computing devices, tablet devices, laptops, connected home monitoring devices, etc. Alternatively, in some embodiments, the second set of client devices 234 may include a set of client devices that may provide automated data, such as a data stream which includes energy consumption data, water consumption data, or temperature data. The data 230 may be collected and processed by the encoder subsystem 210 to form a feature vector 240. It should be understood that some embodiments may use different versions of encoder subsystems to generate vectors. For example, some embodiments may use a first version of the encoder subsystem 210 in a first server to generate the set of content vectors 212 and use a second version of the encoder subsystem 210 executing on a second server to generate the feature vector 240.

In some embodiments, the data 230 may include data that a user had manually uploaded (e.g., by manually scanning relevant materials, such as grocery or gas receipts). For example, the data 230 may include screenshots for receipts, datasheets (e.g., energy bills, water bills, etc.) and upload them to the AI system. Furthermore, some embodiments may receive data from the first set of client devices 232, where such data may include data uploaded in real-time to one or more cloud databases. In some embodiments, the first set of client devices 232 may include internet-things devices as well, and the data from such devices may include as a part of the second set of client devices 234.

In some embodiments, a client device may initiate the submission of a query 244, where the query may include a text sequence that is entered by a user into a form, a machine-generated query based on a user interaction with an application, a script-generated query that is triggered based on one or more criteria being satisfied, etc. Some embodiments provide the query 244 to the encoder subsystem 210, where the encoder subsystem 210 may then generate a set of vectors 246. For example, the query 244 may include a text sequence, and the encoder subsystem 210 may generate a text sequence vector to be used as the set of vectors 246 or to include in the set of vectors 246. Some embodiments may use the set of vectors 246 to obtain context data. For example, some embodiments may provide text sequence vector or another vector of the set of vectors 246 to the context generation component 250.

In some embodiments, the set of vectors 246 may be combined with other user-related data such as the feature vector 240. For example, some embodiments may then use the feature vector 240 and the set of vectors 246 in combination with a context generation component 250 to determine an input context 252. For example, the context generation component 250 may perform operations based on one or more VSIAs, such as Approximated Nearest Neighbor (ANN), Product Quantization (PQ), and HNSW. The context generation component 250 may perform a search to list the top-k most relevant documents based on distances in an encoder space, where k is an integer.

Some embodiments may provide the input context 252 to a language model 254. In some embodiments, the language model 254 may be or include an external model that is accessible via an API. Alternatively, or additionally, the language model 254 may be or include an internal language model that is directly accessible without accessing a network or an external computer system. The language model 254 may then generate an answer 260. The language model 254 may also output program code or other parameters usable to render graphics, such as a first graphic 255 and a second graphic 256, where the first graphic 255 may indicate statistical information of past data, and the second graphic 256 may indicate one or more predicted values.

Some embodiments may automate data acquisition when using the language model 254. For example, some embodiments may interface with one or more external applications or external data systems to extract the real-time data from one or more data sources disclosed in this disclosure. Upon receiving the query 244, some embodiments may send a request signal to a data acquisition trigger to communicate with external real-time data sources to push or submit their latest data. Some embodiments may integrate external data systems with the language model 254 such that, upon receiving the query 244, such external data systems may provide additional data to the language model 254.

In addition to sending the answer 260 to a client device, some embodiments may receive feedback 264, where the feedback 264 may indicate whether the answer 260 satisfies or does not satisfy a set of criteria, such as accuracy-related criteria. For example, in some embodiments, the feedback 264 may indicate that the answer 260 has decreased the accuracy with respect to a previous answer. Some embodiments may use the feedback to trigger the use of a reinforcement learning subsystem 270 to update a set of control parameters 251 used by the context generation component 250. For example, the set of control parameters 251 may include one or more VSIA control parameters.

The reinforcement learning subsystem 270 may update one or more control parameters of the set of control parameters 251 over one or more update iterations to determine an updated context generation component 250. For example, the reinforcement learning subsystem 270 may perform thousands of consecutive policy-based actions to fine-tune the index search performed by the context generation component 250. In some embodiments, the reinforcement learning subsystem 270 takes actions within the environment of the context generation component 250, receives rewards or penalties, and adjusts the state of the context generation component 250 by adjusting values of the set of control parameters 251 to maximize the cumulative reward during the training operations or real-time update operations.

After updating the set of control parameters 251 to generate an updated context generation component 250, some embodiments may perform another search to generate a second version of the input context 252 that retrieves a different set of content from the set of vector databases 220 or documents related to the set of vector databases 220. Some embodiments may then obtain a second version of the answer 260 from the language model 254 after providing the language model 254 with the query 244 and the second version of the input context 252. Some embodiments may then provide the answer 260 with one or more client devices of the set of client devices 274. By using the reinforcement learning subsystem 270 to improve the context generation component 250 by varying the set of control parameters 251, some embodiments may explore different input contexts and different documents. Such variations may yield in vastly superior performance with respect to accuracy or other metrics of language model performance.

Figure 3:
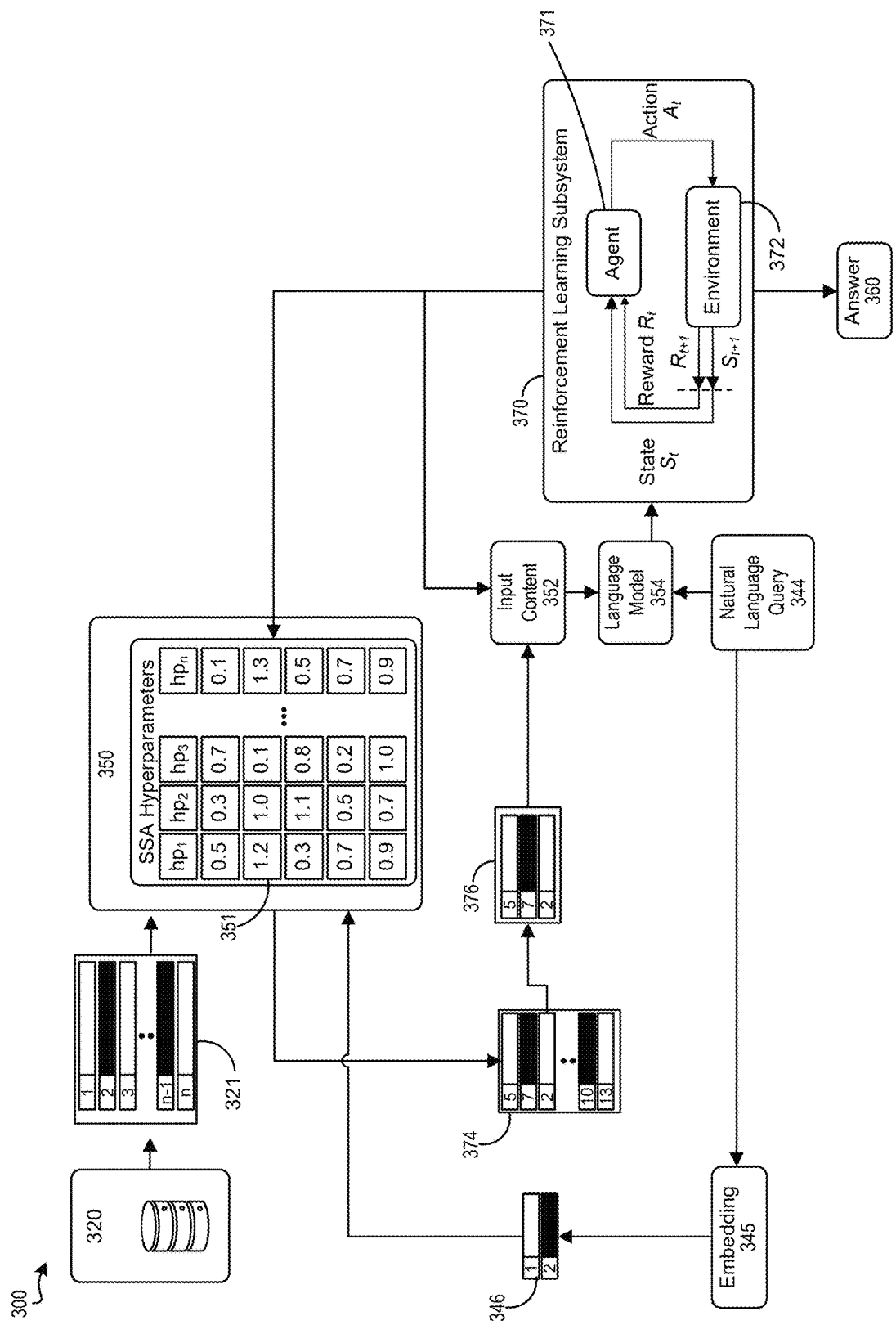
FIG. 3 is an illustration of an example architecture providing adaptive responses by varying parameters in a control loop for a communication component, in accordance with an implementation.

FIG. 3 is an illustration of an example conceptual architecture for using large language processing, in accordance with an implementation. The system 300 shows a set of vector databases 320 that includes a set of content vectors 321, where each respective content vector of the set of content vectors 321 maps to a discrete item of content (e.g., a book) or a portion of the item of content (e.g., a specific chapter in the book). In addition, some embodiments may generate a set of embedding vectors 345 from the natural language query 344 and then use the set of embedding vectors 345 to generate a set of query vectors 346 (where the set of query vectors 346 may be the same or be derived from the set of embedding vectors 345). In some embodiments, the set of query vectors 346 may also be used to update a set of control parameters 351 of a context generation component 350.

Some embodiments may use the context generation component 350 to generate a list of vectors based on distances to the set of query vectors 346 and determined a ranked set of content vectors 374, where distance determination may be based on the set of control parameters 351. Some embodiments may then use the ranked set of content vectors 374 to determine a vector subset 376, where the vector subset 376 may be or include a list of content vectors closest to a client feature vector. Some embodiments may then retrieve content for an input context 352, where the content may be mapped to the vector subset 376 or otherwise associated with the vector subset 376. Some embodiments may then provide the input context 352 and the natural language query 344 to a language model 354. The language model 354 may then generate an answer 360, where a response to the answer 360 may include one or more feedback indicators.

Some embodiments may use the feedback indicators to determine whether to use a reinforcement learning subsystem 370. In some embodiments, the reinforcement learning subsystem 370 may implement a policy in control loop to determine updates to the context generation component 350 or to a window size of the input context 352 (e.g., by limiting the number of vectors to select for in the vector subset 376). When using the reinforcement learning subsystem 370 to update the set of control parameters 351 of the context generation component 350, the reinforcement learning subsystem 370 may apply a policy to change one or more values of the set of control parameters 351. In cases where a positive observation is made (e.g., receiving feedback that a more accurate answer is provided), an agent 371 may receive a reward (e.g., +1). In cases where a negative observation is made (e.g., receiving feedback that a less accurate answer is provided), an agent 371 may receive a negative value (e.g., −1). Based on the outcomes, the agent 371 may then update an environment representation 372, where the environment representation 372 may include or represent the set of control parameters 351. Alternatively, or additionally, some embodiments may use the reinforcement learning subsystem 370 to rearrange the top-k list of vectors to populate in the vector subset 376. Some embodiments may then check for accuracy improvement after shuffling the ordering of documents in an input context in the re-arranged top-k list of vectors.

Some embodiments may use these operations to monitor user resource use (e.g., computing resource use, weekly/monthly/annual spending, etc.) and provide feedback to optimize resource use. In some embodiments, a user may upload resource use data via using automated APIs, directly entering data, scanning receipts, etc. Some embodiments may combine a user's internal transactions (e.g., database transactions, financial transactions, etc.) across different channels (e.g., changes to account records, changes via third party networks, etc.). Some embodiments may use this data with other data (e.g., automated sensor data, electricity consumption data, etc.) to generate outputs using a language model (e.g., indicating inefficient resource use, suggesting additional types of resource use, etc.).

Some embodiments may use a language model using operations described in this disclosure to generate the answer 360, where examples of the answer 360 may include categorized analytics about resource use (e.g., grocery spending, gas spending, and energy consumption rates), visual reports and graphics indicating resource use, voice reports indicating resource use, visual and voice reporting of projected categorized resource use (e.g., spending per frequently purchased items in grocery items), etc. In some embodiments, a language model also provides information or facts about or related to a product they purchased (e.g., nutrition facts and number of calories of food purchased), information about the amount spent in certain products, etc. For example, some embodiments may generate an answer that indicates information about a purchased product that may help a user optimize future behavior, where such information may include nutrition information associated with Dietary Reference Intakes (DRIs) established by the Health and Medicine Division of the National Academies of Sciences. Furthermore, some embodiments may use data stream data from smart devices, internet-of-things devices, to generate a report on energy use and provide recommendations on saving energy consumption.

Figure 4:
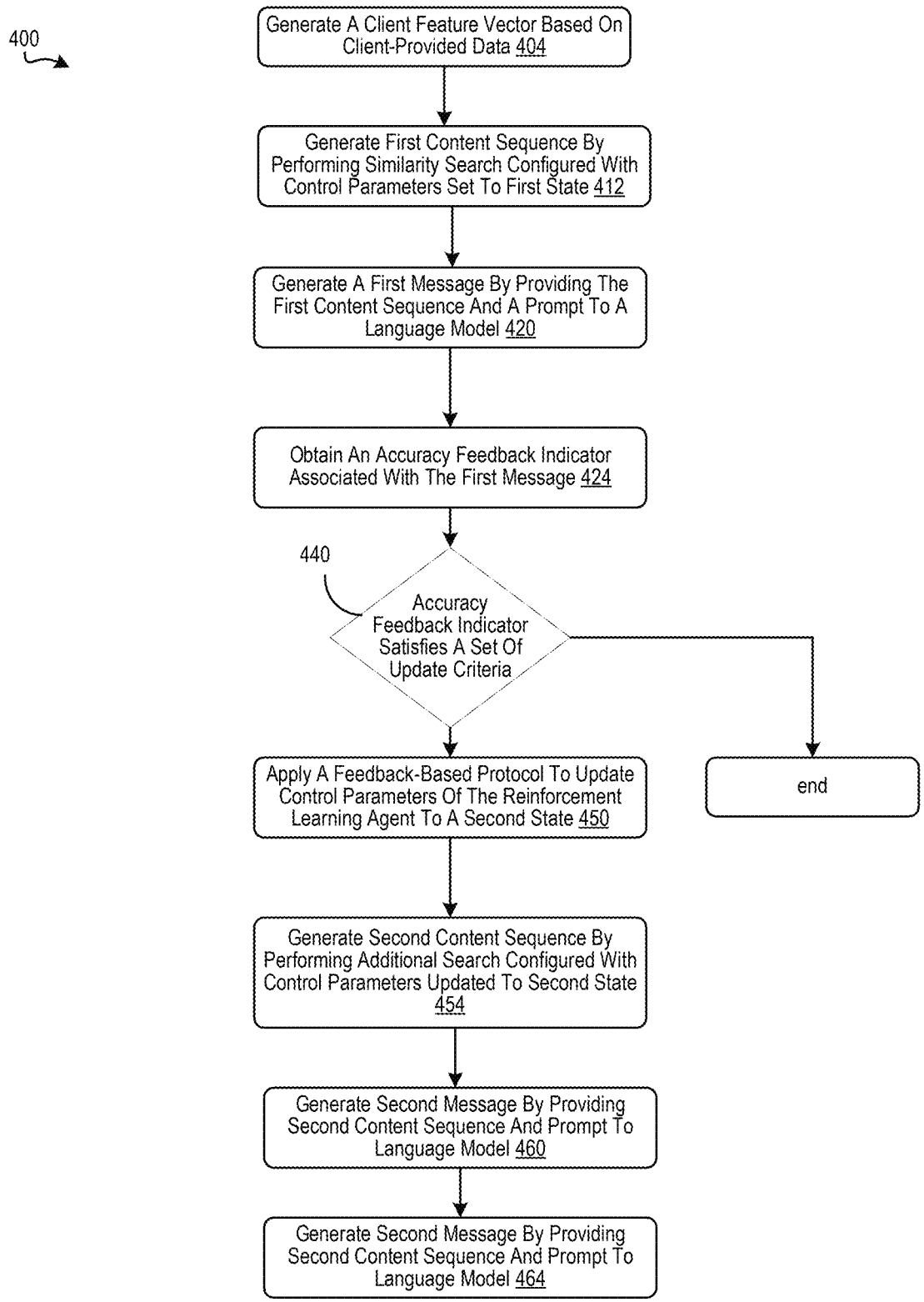
FIG. 4 illustrates an example flowchart of a process for providing adaptive responses to a set of client devices by varying control parameters, in accordance with an implementation.

FIG. 4 illustrates an example flowchart of a process 400 for providing adaptive responses to a set of client devices by varying control parameters, in accordance with an implementation. Some embodiments may generate a client feature vector based on client-provided data, as indicated by block 404. Some embodiments may obtain client-provided data in the form of data stream data, where the data stream data may include both user-entered device data and data provided in an automated fashion from electronic devices. For example, some embodiments may retrieve data stream data that includes data from a temperature monitoring device, electric consumption monitoring device, etc. The data stream data may be provided in real time or maybe collected from a data source used to store the data stream data.

Some embodiments may generate a first content sequence by performing a similarity search configured by control parameters that are set to a first state, as indicated by block 412. Some embodiments may generate a first content sequence by performing a similarity search (e.g., based on cosine distance) to find the most relevant content (e.g., documents, images, videos, etc.) or other information from a set of vector databases by determining distances between a query vector (e.g., a client feature vector) and representative vectors of that database. Some embodiments may select from the representative vectors, the K-nearest neighbors in the embedding space. In some embodiments, the other vectors may represent entire documents. Alternatively, or additionally, one or more of the representative vectors may represent portions of documents, where other portions of the documents may be associated with other representative vectors.

Some embodiments may determine distances between the client feature vector and content vectors. Some embodiments may determine distances between a set of content feature vectors and a client feature vector in a shared vector space generated by using one or more embedding models. For example, some embodiments may obtain a user's electronic sensor stream, which includes temperature, pressure, and vibration data every second. Some embodiments may provide the data to an embedding model that includes a trained temporal convolutional network (TCN) to generate a compact 64-dimensional vector. Some embodiments may then determine distances between this compact 64-dimensional vector and a set of content feature vectors in the embedding space.

Additionally, some embodiments may perform a processing step on the data stream data to generate derived features, where the derived features may include annotations on the data stream data, derivatives of numeric values from the data stream data, summaries from the data stream data, etc. Some embodiments may then use these derived features in lieu of the original data stream data when generating vectors based on data stream data. It should also be understood that some embodiments may use these operations to generate vectors for other types of input data instead of data stream data, such as data that is provided once to a server.

In some embodiments, derived data may include data generated based on voice data. For example, some embodiments may receive a user's voice stream in data stream data, generate a text transcript based on the voice data, and then generate a set of tokens based on the transcript. Some embodiments may then generate a set of vectors based on the set of tokens and determine distances based on this set of tokens.

In some embodiments, derived data may include data generated based on visual data. For example, some embodiments may receive a user's video feed in data stream data and generate a set of object labels by feeding the video feed to a machine learning model trained to perform object recognition. Various types of object recognition models may be used. For example, some embodiments may provide a convolutional neural network that is trained to perform object recognition operations with image data that is part of the data stream data. Some embodiments may use the convolutional neural network to output a set of object categories and generate one or more vectors based on the set of object categories.

When determining distances, some embodiments may use one or more various types of distances, such as Euclidean distance, cosine similarity, or Manhattan distances. For example, after determining a first vector as a client feature vector, some embodiments may determine cosine similarity distances between this first vector and a set of content feature vectors, which may be or include a collection of other vectors representing stored content. Some embodiments may permit configurations to determine which type of distance metric to use. For example, some embodiments permit a user to modify a control parameter of a context generation component to select either the use of a Euclidean distance or the use of a cosine similarity distance to select one or more documents for inclusion in a context, as indicated elsewhere in this disclosure.

As described elsewhere in this disclosure, some embodiments may specify the arrangement of the different content in a context. For example, some embodiments may associate each respective vector of a set of content feature vectors with a respective document weight of a first set of document weights. Some embodiments may then determine an order in which the documents corresponding with the set of content feature vectors is presented. Some embodiments may then determine a first set of modified weights based on the first set of document weights and distances. In some embodiments, a candidate content vector having a greater distance from a client feature vector may be associated with a modified weight, where the modified weight reduces a priority of the document associated with this candidate content vector. For example, if the order of documents to be presented in a context is presented in descending order based on weight, some embodiments may reduce the modified weight of a document to a lesser value based on a magnitude of a vector space distance between a content vector representing the document and a client feature vector.

Some embodiments may change or determine a document order based on document type. For example, some embodiments may assign document categories to the documents, where document category may indicate a type of document (e.g., an academic article, government-issued document, a legal document, etc.). Some embodiments may then determine one or more weights of a set of document weights based on these document categories, such as assigning the weight value 0.25 to each respective document having a document category "weight." As described elsewhere in this disclosure, some embodiments may determine a second set of document weights based on one or more modify control parameters. Some embodiments may update an association between a category of the document categories and a vector of the set of content feature vectors based on a difference between the first set of document weights and the second set of document weights.

Some embodiments may determine one or more domain categories to associate with a user-provided prompt based on the contents of the user-provided prompt. For example, some embodiments may use a rules-based keyword method or key phrase method to match a prompt with a domain category. Alternatively, or additionally, some embodiments may use the same vector generated from a user-provided prompt for use as a domain category by determining one or more categories associated with the vector space region holding the vector. For example, some embodiments may determine a client feature vector and then determine a domain category based on the client feature vector by determining that the client feature vector is within a vector space region associated with domain category. Some embodiments may instead rely on distances from centroids or other characteristic vectors associated with domain categories. Some embodiments may determine vector distances in vector space between a client feature vector and a set of domain category vectors ("domain space vector distances") representing different domain categories. For example, some embodiments may determine that a client feature vector is a distance D1 from a first domain category vector and is a distance D2 from a second category vector, where D1 is less than D2. In response, some embodiments may associate the first domain category with the client feature vector or a prompt corresponding with the client feature vector based on a comparison of the domain space vector distances.

Some embodiments may then use this domain category to assign a set of databases for a search, where this selection may reduce the number of total databases to be searched. For example, based on the determination that a text sequence representing a user prompt is associated with a first domain category, some embodiments may search a first subset of databases. Then, based on a determination that a text sequence representing a user prompt is associated with a second domain category, some embodiments may search a second subset of databases. Furthermore, some embodiments may use this method to enhance the efficiency of network operations, particularly if the first subset of databases is stored in a set of computer devices located within a first region and if the second subset of databases is stored in a second set of computer devices located in a second region.

Some embodiments may generate a first message by providing the first content sequence and a prompt to a language model, as indicated by block 420. Some embodiments obtain a first message by using an API endpoint of a language model. For example, some embodiments may send a POST request to a language model's API endpoint containing a JSON payload with a prompt field and a context field that includes the first content sequence determined using operations described for block 412 or other operations described in this disclosure. The API may then return a JSON response containing generated text that may be used as the first message.

Alternatively, or additionally, some embodiments may use a local deployed language model that is directly accessible through code. For example, some embodiments may use a Python-based model that includes the program code "model.generate(prompt=question, context=first_content_sequence, max_tokens=5000)," where "question" is a user-provided question or an automated question, "first_content_sequence" is a list that includes the first content sequence, etc. By using a local deployed language model, some embodiments may overcome network limitations and mitigate operating risks created by hardware failure or network failure.

Some embodiments may determine a size of a language models context window and modify the number of documents to be retrieved based on this context window. For example, some embodiments may modify a control parameter k based on the number of tokens that a language model may accept, where the control parameter controls the input window size of the language model. For example, some embodiments may determine bins of token ranges, where the value k may depend on which bin that a token range falls into. For example, a language model may accept up to 1000 tokens and, in response, some embodiments may set the value of k to be equal to "3." Alternatively, the language model may accept up to 5,000 tokens and, in response, some embodiments may set the value of k to be equal to "5."

Some embodiments may use different optimization methods to update the parameters. In some embodiments, the computer system may have access to a plurality of feedback-based protocols and select which of those protocols to use for updating a set of control parameters. For example, a computer system may have access to feedback-based protocol methods that involve Bayesian optimization of control parameters, grid search optimization, evolutionary algorithms, etc. The selection of a feedback-based protocol may itself be based on the number of control parameters to be optimize, a number of permitted optimization steps per iteration, user-set parameter or various other types of values. For example, some embodiments may select a Bayesian optimization method for use as a feedback-based protocol from a plurality of feedback-based protocols based on a determination that a user had set a configuration parameter to indicate Bayesian optimization methods. Some embodiments may compare the accuracy improvement rates or other performance metrics of different types of feedback-based protocols and select these performance metrics accordingly.

Some embodiments may obtain an accuracy feedback indicator associated with the first message, as indicated by block 424. In some embodiments, and accuracy feedback indicator may be used to indicate the accuracy of a language model output. Such accuracy may be represented as a loss function output (i.e., a measurement of a difference between a model's predicted outputs and actual target values), a recall output (i.e., a measure of actual positive instances the model successfully identified out of all true positive cases), or a precision score (i.e., a proportion of correct positive predictions out of all positive predictions made by the model).

In some embodiments, a user may indicate that a first message is inaccurate through interactive user interface elements (e.g., thumbs-down buttons, negative reaction emojis, etc.). Alternatively, or additionally, some embodiments may permit a user to provide a feedback indicator via explicit feedback forms in the interface, the user-provided feedback may be converted into an accuracy feedback indicator using sentiment analysis model. In some embodiments, a user may provide quantitative indicators via using a ratings system or other type of scoring system to permit a user to indicate data accuracy or relevancy. Some embodiments may determine one or more accuracy outputs by using one or more various types of testing systems, such as a rules-based system, a machine learning testing system, a user-supplied feedback information, etc.

During model training and/or after model deployment, some embodiments may determine an accuracy feedback indicator based on a difference between the response vector and the client feature vector. For example, some embodiments may first generate a response vector by providing the first message to an encoder. Some embodiments may then determine a difference between the response vector and a client feature vector generated from an initial data stream or other type of input data (e.g., a user-provided prompt).

Some embodiments may obtain a feedback indicator that indicates a failure based on a determination that a set of boundaries are exceeded by one or more outputs of a language model. Some embodiments may do so, for example, after model deployment. For instance, some embodiments may provide an input context and a prompt to a language model using operations described in this disclosure, where the language model may then output a predicted temperature or other predicted value. Some embodiments may compare this predicted temperature or other predicted value with a set of numeric boundaries and determine that the predicted value is either below a minimum of the set of numeric boundaries or greater than a maximum of the set of numeric boundaries. In response to determining that the predicted temperature or other predicted value exceeds the set of numeric boundaries, some embodiments may indicate a failed outcome and proceed to trigger an update to control parameters, as described elsewhere in this disclosure.

Some embodiments may determine whether the accuracy feedback indicator satisfies a set of update criteria, as indicated by block 440. Some embodiments may use a threshold function to evaluate whether an accuracy feedback indicator satisfies a set of criteria by comparing the accuracy feedback indicator to predefined limits. For example, some embodiments may compare conditionals that return false when feedback values violate a minimum required level, where returning false causes updates to a protocol, as indicated elsewhere in this disclosure.

Some embodiments may compare a prompt with an output to determine whether the output sufficiently matches the prompt with respect to one or more target tokens of the prompt. For example, some embodiments may first retrieve a set of target tokens from a text sequence provided by a user representing a user prompt. Some embodiments may then determine whether the set of target tokens are found in a corresponding output generated based on the user prompt. Some embodiments may perform a count of matches between the set of target tokens and the output message provided by a language model. In response to a determination that the count of matches does not satisfy a threshold, some embodiments may then determine that a feedback indicator indicates a failed outcome.

In response to a determination that the accuracy feedback indicator satisfies the set of update criteria, some embodiments may proceed to operations described by block 450. Otherwise, operations of the set of update criteria may end until another feedback indicator is obtained.

Some embodiments may apply a feedback-based protocol to update control parameters to a second state, as indicated by block 450. In some embodiments, a feedback-based protocol may be used to update the control parameters of a reinforcement learning agent that modify the control parameters from a first state to a second state. The feedback-based protocol may modify the control parameters in various ways, such as by adding values, reducing values, etc. For example, some embodiments may modify control parameters to increase one or more thresholds to increase a relevancy requirement.

Some embodiments may create a new state with different control parameters by applying a set of reward values that favor additional changes to control parameters, where the multiple iterations of improvement operations may occur to change control parameters to improved values. Some embodiments may use a gradient-based method to determine new control parameters, where updates to control parameters may take place in an iterative fashion. For example, some embodiments may retrieve a previous parameter update gradient associated with a previous iteration of an operation to update control parameters. The previous parameter update gradient may represent or correlate with a difference in control parameter values between two iterations or changes in state. Some embodiments may then determine a result indicating that an accuracy feedback indicator indicates an improvement in accuracy. In response, some embodiments may determine an update gradient for the next parameter to be updated ("next parameter update gradient") based on this previous parameter update gradient, where the previous parameter update gradient. Some embodiments may then determine the next parameter update gradient, some embodiments may use a feedback-based protocol to determine a next vector direction of the next parameter update gradient. For example, the feedback-based protocol may choose to update the next parameter update gradient to be in a same vector direction as a previous vector direction of a previous parameter update gradient. In response, some embodiments may determine an update gradient for the next parameter to be updated ("next parameter update gradient") based on this previous parameter update gradient, where the previous parameter update gradient.

Some embodiments may restrict what control parameters may be changed or restrict the extent of such changes. Some embodiments may implement a set of tolerance boundaries that prevent one or more control parameters from exceeding a corresponding set of boundaries for those one or more control parameters. For example, some embodiments may implement a set of tolerance boundaries that prevents a control parameter affecting the number of clusters to be searched from exceeding fifty. Some embodiments may implement a set of tolerance boundaries to test whether a candidate new state satisfies the set of tolerance boundaries, where updates to a set of control parameters depend on a determination that the candidate new state satisfies the set of tolerance boundaries. For example, some embodiments may determine that a candidate new state generated by a reinforcement agent exceeds a tolerance boundary that limited a search time for a search and, in response, prevent the candidate new state from being used as a new set of control parameters.

Alternatively, some embodiments may determine that an accuracy feedback indicator indicates a decline in accuracy, indicates another type of failed outcome, or otherwise indicates a negative reward. For example, the accuracy feedback indicator may indicate that a user provided negative feedback regarding the accuracy of a report provided by a language model. In response, some embodiments may determine a set of parameter space directions of a previous update to the control parameters. Some embodiments may then apply a new set of parameter space directions, where the new set of parameter space directions includes at least one opposite direction with respect to a previous parameter space direction. For example, if a first iteration of updating a set of control parameters includes an update a first parameter state to a second parameter state that involves an increase to a first control parameter and a decreased to a second control parameter, some embodiments may then decrease the first control parameter or increase the second control parameter during a second iteration of updating the set of control parameters. In some embodiments, a next parameter update gradient for an update caused by a failed outcome or an indication of a negative reward may include at least one shared direction with a previous parameter update gradient.

As discussed elsewhere in this disclosure, an accuracy feedback indicator may be used to control the direction of updates to control parameters for a context generation component. For example, after determining a result that indicates an accuracy feedback indicator satisfies accuracy threshold (e.g., satisfies and accuracy threshold equal to 0.80), some embodiments may update the context generation component. In some embodiments, the value of the reward may depend on the LLM, the accuracy of a language model output. For example, some embodiments may determine an F1 score ranges between 0.0 and 1.0, where the accuracy feedback indicator may be determined to be a satisfactory result if the F1 score is greater than 0.95. In response, to determining that the result is satisfactory, some embodiments may determine that the accuracy feedback indicator indicates an improvement in accuracy. Alternatively, some embodiments may use a measure of accuracy changes to control improvements.

Some embodiments may provide consecutive adjustments to the hybrid parameters of a search subcomponent of a context generation component. Furthermore, when providing adjustments, some embodiments may use one or more random processes to perform explorations of a parameter space. Some embodiments may determine a set of random values using random or pseudorandom processes. For example, some embodiments may determine a random value using an algorithm-based pseudorandom process or a random process based at least in part on a measurement. Some embodiments may determine an exploration parameter or a reward parameter based on the set of random values and use the exploration parameter or the reward parameter to update one or more control parameters. For example, some embodiments may determine that a previous update to control parameters of a context generation component resulted in an output that is more accurate. Some embodiments may generate a reward value by multiplying or otherwise modifying a quantitative measurement in the accuracy increase with the reward parameter. Some embodiments may then determine whether the reward value outweighs an exploration parameter that would cause a more random selection in the control parameters used by a context generation component.

The feedback-based protocol may modify one of various types of control parameters. Some embodiments may modify the control parameters that affects searches used to determine which documents are selected, such as a set of search parameters that includes distances, the number of nearest neighbors considered, etc. For example, some embodiments may modify a parameter set that includes a parameter controlling the maximum number or otherwise limits the number of nearest neighbors to be included for consideration. Alternatively, or additionally, some embodiments may modify a parameter set of control parameters to change the number of clusters that are being searched or modify a search radius for the search. For example, some embodiments may determine search through clusters of vectors in lieu of the vectors themselves (e.g., searching the distances between a client feature vector and cluster centroid clusters) and modify a parameter set to limit the number of clusters to search to five.

Some embodiments may modify a control parameter used to control the number of retrieved documents or document chunks per during a similarity search, the chunk size of a document chunk for text splitting, or the overlap between chunks. For example, some embodiments may modify a set of search parameters that includes a parameter controlling a number of documents to be retrieved to search for a greater number of neighbors with respect to a client feature vector, where such modifications may increase. In some embodiments, may include parameters used to select a chosen embedding model, an embedding dimension, a similarity metric being used (e.g., cosine, L2), or a score threshold to determine which documents get retrieved. In some embodiments, a control parameter may include a temperature or randomization element used to select relevant data. For example, some embodiments may determine a set of random values and select a set of relevant data based on the temperature.

Some embodiments may generate a second content sequence by performing an additional search configured with control parameters updated to the second state, as indicated by block 454. To generate the second content sequence, some embodiments may use operations similar to or the same as those described for block 404 or the block 412 after generating an updated reinforced agent using operations described for block 450. For example, some embodiments may perform a cosine-based similarity search to determine distances between a first vector representing input data (e.g., data stream data) and other vectors in a vector space using a reinforced agent that has been updated to use parameters of the second state.

When generating the second content sequence, some embodiments may modify the top K list and receive feedback for accuracy improvements resulting from shuffling document ordering. For example, as described elsewhere, some embodiments may associate each respective vector of a set of content feature vectors with a respective document weight of a first set of document weights. Some embodiments may modify a control parameter such that one or more control parameters of the second state causes the generation of a second set of document weights associated with the content of the first set of content feature vectors (e.g., by determining document weights using a different algorithm based on the first set of content feature vectors). Some embodiments may then determine a second set of modified weights based on the second set of document weights and distances. Some embodiments may then generate a content sequence having a new content order, where the new content order is determined by the second set of modified weights.

Some embodiments may generate a second message by providing the second content sequence and the prompt to the language model, as indicated by block 460. To generate the second message, some embodiments may use operations similar to or the same as those described for block 420. For example, some embodiments may provide an API with a prompt and the second content sequence, where the API may then provide a second message. In response, the API of the language model may respond with an updated version of an answer that may be more accurate than a previous version of the answer.

Some embodiments may send the second message to a client system, as indicated by block 464. For example, a server system may push messages directly to connected clients through WebSocket connections or Server-Sent Events (SSE) for real-time communication. For example, some embodiments may send a web response to a client device that is then presented on a visual display of the client device. Alternatively, some embodiments may use a message broker or queue systems to perform asynchronous delivery of the second message. Alternatively, or additionally, a language model described in this disclosure, such as the language model used to generate the second message, may be configured to directly send the second message to a client system.

Figure 5:
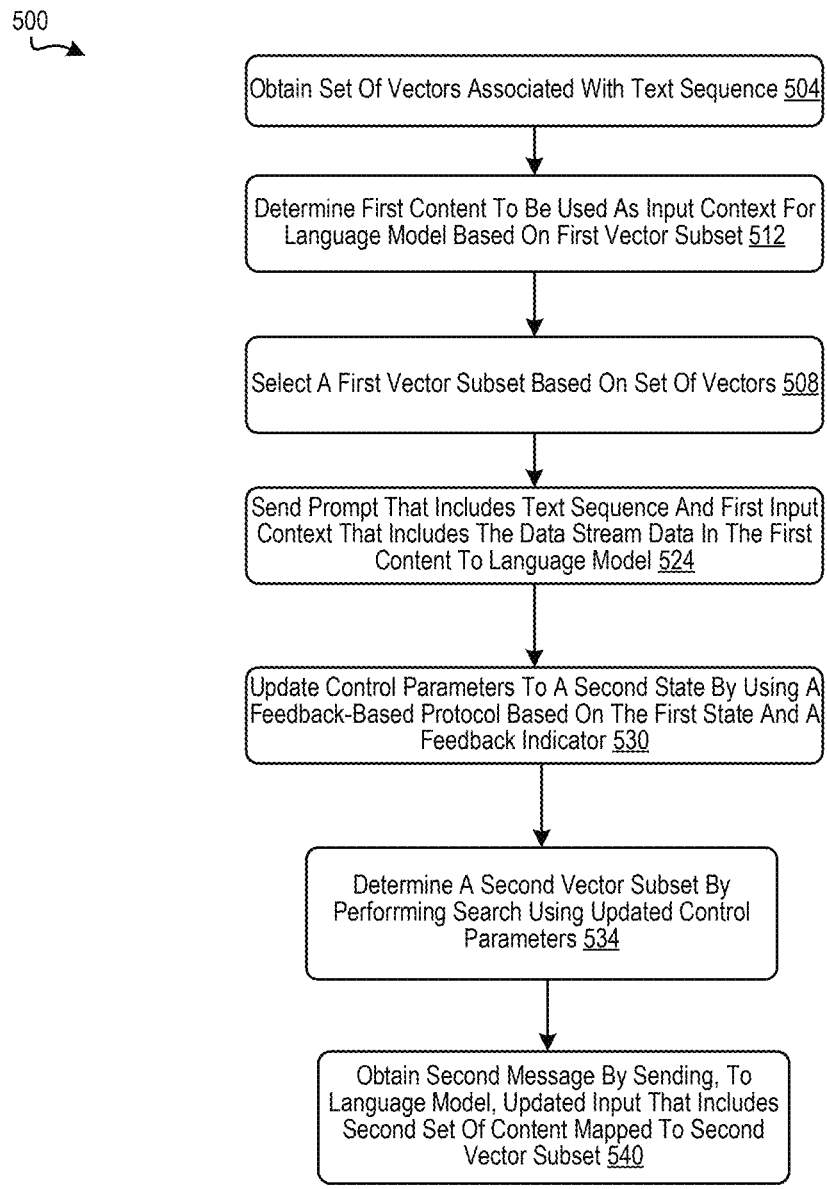
FIG. 5 illustrates an example flowchart of a process for providing adaptive responses to data stream data, in accordance with an implementation.

FIG. 5 illustrates an example flowchart of a process 500 for providing adaptive responses to data stream data, in accordance with an implementation. Some embodiments may obtain a set of vectors associated with the text sequence, as indicated by block 504. When obtaining a set of vectors, some embodiments may obtain a first vector associated with the text sequence entered into a first client device at a second vector associated with data stream data provided by second client device. For example, some embodiments may obtain a text sequence vector by providing a user prompt to an encoder model and obtain a data stream vector by providing data stream data to the encoder model. Alternatively, or additionally, some embodiments may first generate a summary or annotation or other derive data from the data stream vector and provide this derive data to the encoder model.

Some embodiments may select a first vector subset based on set of vectors, as indicated by block 508. Some embodiments may select a first vector subset based on a ranking of distances between context vectors and at least one of the first vector or the second vector using control parameters of a search subsystem. In some embodiments, the control parameters may be configured to a first state, where the control parameters may be configured to a second state using one or more operations described elsewhere in this disclosure. As described elsewhere in this disclosure, modification of the control parameters may change the types of vectors retrieved during a search, number of vectors retrieved during the search, or change some other aspect of a search or search results.

Some embodiments may determine first content to be used as an input context for a language model based on the first vector subset, as indicated by block 512. Some embodiments may retrieve documents mapped to or otherwise associated with the first vector subset. When determining content, some embodiments may determine content using operations similar to or the same as those described for block 412 or block 420. For example, based on a determination that a first document is identified by or otherwise mapped to a first vector in the first vector subset, some embodiments may include this first document in the first content.

Some embodiments may send, to a language model, a prompt that includes the user-provided text sequence and a first input context that includes the data stream data in the first content, as indicated by block 524. Some embodiments may send the prompt in a manner similar to or the same as that described for block 420. For example, some embodiments may provide the language model with the user-provided text sequence and, as input context, content mapped to a vector subset.

Some embodiments may update control parameters to a second state by using a feedback-based protocol based on the first state and a feedback indicator, as indicated by block 530. When updating a set of control parameters using a feedback-based protocol, some embodiments may use one or more operations described for block 450. For example, some embodiments may use a gradient-based method to update control parameters of a search subsystem.

Some embodiments may determine a second vector subset by performing a search using the updated control parameters, as indicated by block 534. When determining the second vector subset, some embodiments may use one or more operations described for block 440 or block 450. For example, some embodiments may use a search subsystem after updating the control parameters of the search subsystem with a feedback-based protocol. Some embodiments may then use the updated search system to determine a new ranking of distances between content vectors and at least one of a first vector representing a user-provided text sequence or a second vector representing a data stream vector.

Some embodiments may obtain a second message by sending, to the language model, an updated input that includes a second set of content that is mapped to the second vector subset, as indicated by block 540. In some embodiments, the input to a language model may include the second set of content, the same user-provided text sequence or other user-provided prompt described for block 524 or data from the data stream described for block 524. For example, some embodiments may send an input that includes the second set of content to an API of the same language model used to perform operations described for block 454. In response to receiving this input, the API may output a message that is then sent to a client device used by the user.

Figure 6:
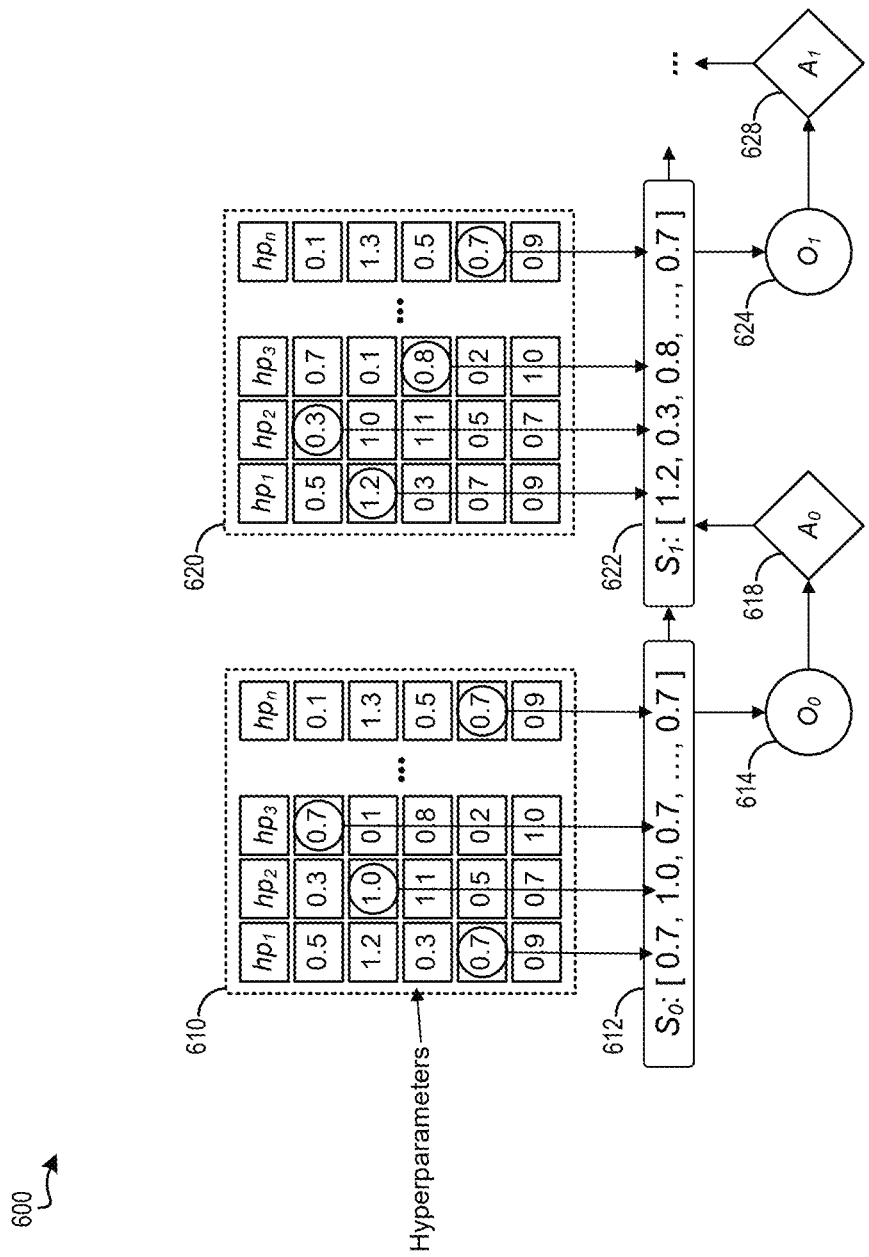
FIG. 6 illustrates a conceptual diagram of example changes in control parameters over multiple iterations, in accordance with an implementation.

FIG. 6 illustrates a conceptual diagram of example changes in control parameters over multiple iterations, in accordance with an implementation. As shown in FIG. 6, a reinforcement learning agent may create and change the control states of a search agent. During the example reinforcement learning operation, a first set of potential control parameters 610 may be collected, where a policy of a reinforcement learning agent may cause a computer system to select certain values of the first set of potential control parameters 610 to use as a first state 612.

Some embodiments may then obtain a first observation 614 that includes a set of feedback indicators. In some embodiments, the set of feedback indicators may trigger an action 618, where the action 618 may include updates represented by the second state 622. Based on the feedback provided by the first observation 614, some embodiments may update the console parameters of a context generation component to a second state 622 based on changes in selections of a second set of potential control parameters 620. In some embodiments, the values of the second state 622 are selected from the action 618. Such operations may then be continued in a loop-like fashion based on data provided by a client system and one or more data structures or algorithms described in this disclosure, such that an additional observation 624 may cause an additional action 628 to further update the second state 622 to a new state.

As previously mentioned, interfaces to manage transactions often require manual navigation through different menus and/or user interfaces to provide financial institutions with data regarding the transactions. While some applications implement chatbot technology to facilitate user communication and information retrieval, these applications often use predefined scripts or responses, limiting the flexibility and natural language capabilities of their interactions. Moreover, a need exists for an application that allows for seamless integration of transaction data and a chat interface, enabling real-time, accurate, and user-friendly handling of transactions.

A computer (e.g., a mobile electronic computing device) implementing the systems and methods described herein can overcome the aforementioned technical deficiencies. For example, the computer may store a chat application in memory that is configured to maintain a chat interface to communicate with a user of the computer. The computer can activate the chat application responsive to receiving a message indicating the user has completed a transaction (e.g., an online transaction or a transaction at a brick-and-mortar store). The user can communicate with the chat application by typing or speaking different inputs into the chat interface maintained by the chat application. The chat application can input the communication by the user into a large language model that has been trained to automatically generate output text based on such inputs. The chat application can execute the large language model with each input to request further data regarding the transaction, to request actions to perform, and/or to indicate a status of the transaction. The user and the large language model can communicate with each other in this manner until the chat application (e.g., through the large language model) determines the conversation is complete and/or that enough data has been collected by the chat application. The large language model can generate and present a text string indicating the conversation is complete at the chat interface to end the communication feed regarding the transaction with the user.

In one example, the chat application can execute the large language model to collect contextual information regarding a transaction performed by a user of the computer. For example, via the chat interface, the user can provide an input that indicates a category of the transaction and/or any other information regarding the transaction. The large language model can receive the input category and automatically determine a response to the user based on the category, such as a request for further information or an indication that the transaction data for the transaction will be stored under the category. The chat application, in some cases by executing the large language model, can operate to send a message to a remote computing device that includes an indication of the category for the transaction as input by the user. The user can input any such information into the chat interface. The chat application can send the input data to the remote computing device for storage with the transaction data for the transaction and/or the computer can store the input data with the transaction data in local memory. Accordingly, the large language model can enable the chat application to collect contextual information regarding a transaction to store with transaction data of the same transaction. Such contextual data can later be used for data analytics and/or retrieved for presentation to the user.

An embodiment of the technical solution described herein provides a method and a mobile electronic device that can use a chat application and a large language model to process, request, and present transaction data for different transactions. This system can enhance the user experience by offering a more interactive and natural communication interface, which can significantly streamline the transaction management process. The chat application can use a large language model to generate contextually relevant messages using transaction data and account data of the user, allowing for a more conversational interaction that can promptly handle user requests and present necessary information in a clear and easy-to-understand format.

Figure 7:
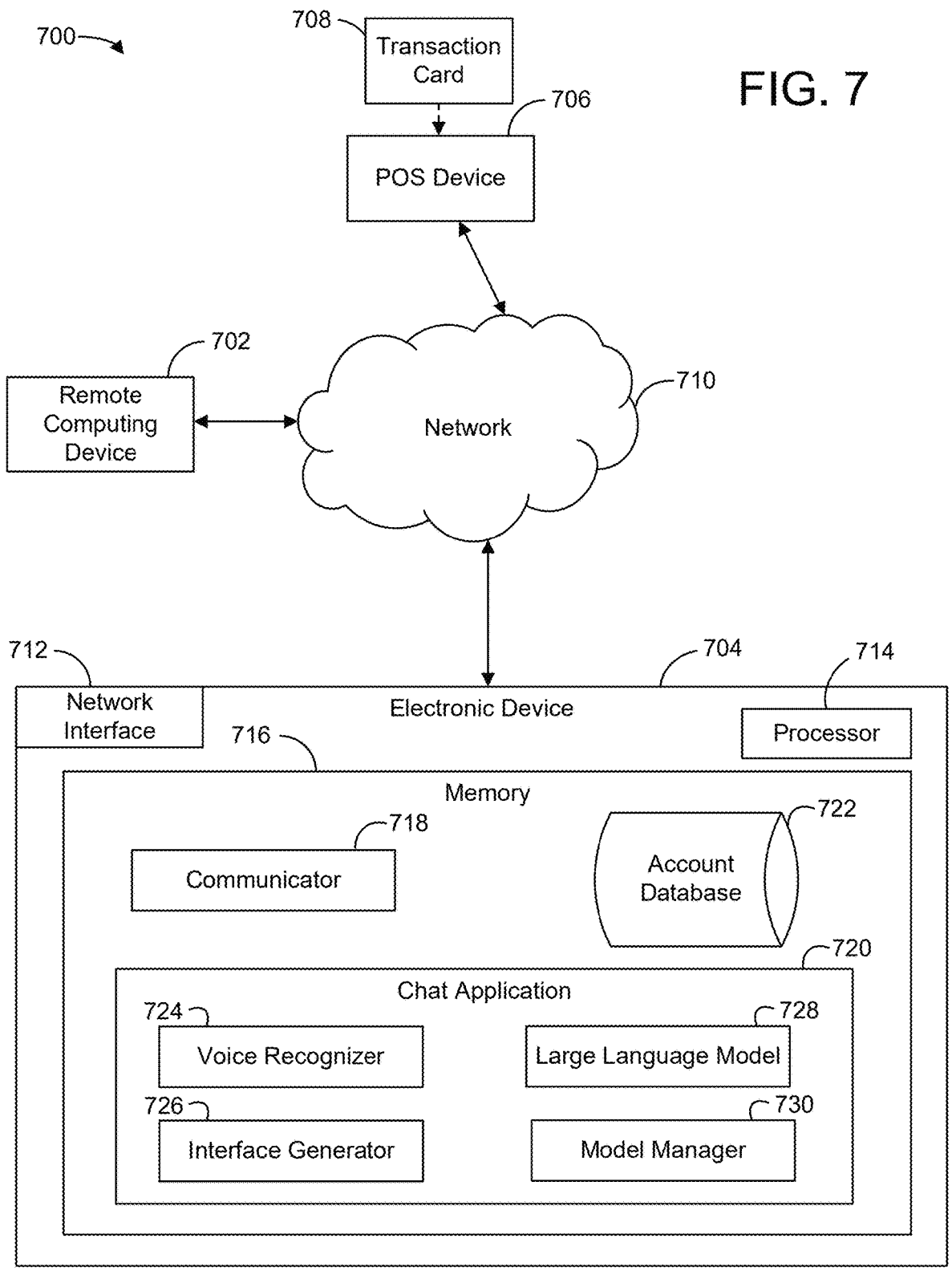
FIG. 7 is an illustration of an example system for using large language processing for contextual transaction data collection, in accordance with an implementation.

FIG. 7 illustrates an example system 700 for using large language processing for contextual transaction data collection, in some embodiments. In brief overview, the system 700 can include a remote computing device 702 and an electronic device 704. The remote computing device 702 can be configured to store transaction data regarding transactions performed by different individuals. The remote computing device 702 can receive an indication of a completed transaction and/or transaction data of the completed transaction from a point-of-sale (POS) device 706. The transaction may have been performed through a transaction card 708. The remote computing device 702 can transmit the transaction data for the transaction to the electronic device 704 and the electronic device 704 can execute a large language processing model to receive contextual information regarding the transaction from a user of the electronic device 704. The electronic device 704 can transmit the contextual information to the remote computing device 702 for storage. The remote computing device 702, the electronic device 704, and/or the POS device 706 can communicate over a network 710. The system 700 may include more, fewer, or different components than shown in FIG. 7.

The remote computing device 702, the electronic device 704, and/or the POS device 706 can include or execute on one or more processors or computing devices and/or communicate via the network 710. The network 710 can include computer networks such as the Internet, local, wide, metro, or other area networks, intranets, satellite networks, and other communication networks such as voice or data mobile telephone networks. The network 710 can be used to access information resources such as web pages, websites, domain names, or uniform resource locators that can be presented, output, rendered, or displayed on at least one computing device (e.g., the remote computing device 702, the electronic device 704, and/or the POS device 706), such as a laptop, desktop, tablet, personal digital assistant, smartphone, portable computers, or speaker.

The remote computing device 702, the electronic device 704, and/or the POS device 706 can include or utilize at least one processing unit or other logic devices such as a programmable logic array engine or a module configured to communicate with one another or other resources or databases. As described herein, computers can be described as computers, computing devices, or client devices. The remote computing device 702 and/or the POS device 706 may each contain a processor and a memory. The components of the remote computing device 702, the electronic device 704, and/or the POS device 706 can be separate components or a single component. The system 700 and its components can include hardware elements, such as one or more processors, logic devices, or circuits.

The POS device 706 can be a computing device that is associated with a particular location (e.g., an entity or merchant). For example, the POS device 706 can be a point-of-sale device that collects data (e.g., transaction data) regarding different transactions that are performed at the POS device 706 or can receive transaction data from other POS devices (e.g., the POS device 706 can operate in the cloud and process online transactions and/or transactions that are performed at local brick-and-mortar stores). The POS device 706 can be a computing device that operates at a financial institution or a brick-and-mortar building. For example, the POS device 706 can include a register at a brick-and-mortar store or a server in the cloud that facilitates transactions for online stores. The POS device 706 can be configured to receive a request for an item purchase in a transaction. In some cases, such transactions can be performed by the transaction card 708. The transaction card 708 can be a card that is connected to an account stored at the remote computing device 702 and can be configured to perform transactions (e.g., perform transactions using near-field communication technology or swiping technology). The POS device 706 can identify attributes of items (e.g., value, item type, number of items, etc.) and/or other attributes of transactions (e.g., time of the transaction, geographical location of the transaction, type of the transaction (e.g., online or at a brick-and-mortar store), the merchant of the transaction, the total value of the transaction, etc.). The POS device 706 can transmit the attributes (e.g., transaction attributes) of the transactions as transaction data and/or identifiers of accounts (e.g., an identifier of the transaction card that was used to initiate the transaction) to the remote computing device 702 or to another computing device that transmits or forwards the data to the remote computing device 702.

The remote computing device 702 can be a server or computer that is configured to store transaction data regarding transactions that are performed through different accounts. The remote computing device 702 can store ledgers (e.g., tables) for different accounts in memory (e.g., in a database in memory). Each ledger can be a data structure that stores data for transactions. Each account can include a general ledger in which all transaction data of all transactions performed through the account are stored and/or transaction category ledger in which only transaction data of transactions labeled under the same transaction category are stored. In some cases, the ledger can include sub-ledgers. For instance, a ledger can store ledger of a certain type (e.g., budgeting, business, personal, tax, etc.) that correspond to subledgers for different transaction categories. The remote computing device 702 can store any number of ledgers for any number of accounts in memory.

The accounts for which the remote computing device 702 stores ledgers and transaction data can include profile data. The profile data can include identifiers of electronic devices that correspond to the different accounts and/or identifiers of transaction cards that correspond to the different accounts. The remote computing device 702 can store transaction data for transactions in the accounts based on the identifiers of the transaction cards that performed the transaction matching identifiers in the respective accounts.

For example, an individual may use the transaction card 708 to perform a transaction through the POS device 706. The individual can do so, for instance, by swiping the transaction card 708 or by inputting a card identifier (e.g., a numerical or alphanumerical value) of the transaction card 708 into a browser to complete a transaction through the POS device 706. The POS device 706 can transmit any transaction data that the POS device 706 generates and/or detects for the transaction to the remote computing device 702 with the card identifier of the transaction card 708. The remote computing device 702 can compare the card identifier of the transaction card 708 with card identifiers of transaction cards of the accounts stored in memory (e.g., in the database). The remote computing device 702 can identify an account with a matching card identifier to the transaction card 708. The remote computing device 702 can retrieve an identifier (e.g., a phone number or email address) associated with the electronic device 704 from the identified account. The remote computing device 702 can transmit a message (e.g., a push notification or email) containing the transaction data for the transaction performed by the transaction card 708 to the electronic device 704 using the identifier associated with the electronic device.

The electronic device 704 can be a mobile electronic computing device (e.g., a cellular phone, a laptop, or a tablet or any other computing device that is configured to be transported and used at different locations). The electronic device 704 can include a display with a microphone, a speaker, a keyboard, a touchscreen and/or any other input/output device. A user can view applications that are executing on the electronic device 704 on the display and/or provide inputs via the input/output devices of the electronic device 704.

The electronic device 704 may comprise one or more processors that are configured to provide a chat interface that a user can use to add contextual data for a transaction to a record of transaction data that the remote computing device 702 stores for the transaction. The electronic device 704 may comprise a network interface 712, a processor 714, and/or memory 716. The electronic device 704 may communicate with the remote computing device 702 via the network interface 712, which may be or include an antenna or other network device that enables communication across a network and/or with other devices. The processor 714 may be or include an ASIC, one or more FPGAs, a DSP, circuits containing one or more processing components, circuitry for supporting a microprocessor, a group of processing components, or other suitable electronic processing components. In some embodiments, the processor 714 may execute computer code or modules (e.g., executable code, object code, source code, script code, machine code, etc.) stored in memory 716 to facilitate the activities described herein. The memory 716 may be any volatile or non-volatile computer-readable storage medium capable of storing data or computer code.

The memory 716 may include a communicator 718, a chat application 720, and/or an account database 722, in some embodiments. In brief overview, the chat application 720 may cooperate to generate and/or maintain a chat interface at a display of the electronic device and/or through which a user can provide voice data. Through the chat interface, a user of the electronic device 704 can input data regarding the transaction performed through the transaction card 708. The chat application 720 can use large language processing techniques to determine responses based on the transaction data of the transaction and, in some cases, account data of an account associated with the user. Upon completing the interaction with the user and collecting contextual information regarding the transaction through the chat interface, the electronic device 704 can transmit the contextual information to the remote computing device 702 to store in a record (e.g., a file, document, table, listing, message, notification, etc.) with the other transaction data of the transaction.

The communicator 718 may comprise programmable instructions that, upon execution, cause the processor 714 to communicate with the remote computing device 702 and/or any other computing device. The communicator 718 may be or include an application programming interface (API) that facilitates communication between the electronic device 704 (e.g., via the network interface 712) and other computing devices. The communicator 718 may communicate with the remote computing device 702 and/or any other computing device across the network 710.

The communicator 718 can establish a connection with the remote computing device 702. The communicator 718 can establish the connection with the remote computing device 702 over the network 710. To do so, the communicator 718 can communicate with the remote computing device 702 across the network 710. In one example, the communicator 718 can transmit a syn packet to the remote computing device 702 and establish the connection using a TLS handshaking protocol. The communicator 718 can use any handshaking protocol to establish a connection with the remote computing device 702.

The chat application 720 may comprise programmable instructions that, upon execution, cause the processor 714 to generate a chat interface and communicate with a user of the electronic device 704 through the chat interface. The chat application 720 can additionally communicate and/or control other applications stored in the memory 716 of the electronic device 704. For example, the chat application 720 can automatically activate a camera application stored in the memory 716 responsive to receiving a request at the chat interface to take a picture. The chat application 720 can operate or control any applications stored in the memory 716 of the electronic device 704.

The chat application 720 can include a voice recognizer 724, an interface generator 726, a large language model 728, and a model manager 730. The components 724-730 can operate to maintain a chat interface through which a user of the electronic device 704 can provide inputs and the components 724-730 can operate to provide outputs based on the inputs. The components 724-730 can automatically process the inputs to generate text string responses to images and/or text strings that are provided into the chat interface. In doing so, the components 724-730 can collect additional transaction data regarding transactions, store the additional transaction in the account database 722, and/or transmit the additional transaction data to the remote computing device 702. The components 724-730 can do so without relying on predefined templates or complicated user interfaces for the communication.

The processor 714 can activate the chat application 720. The processor 714 can activate the chat application 720 in response to receiving the message from the remote computing device 702 regarding the transaction performed by the transaction card 708. For example, the electronic device 704 can receive the message containing transaction data for the transaction through the communicator 718. In response to receiving the message, the processor 714 can activate (e.g., open) the chat application 720 to access a user interface provided by the chat application 720.

In some cases, the processor 714 activates the chat application 720 responsive to receiving a user input. For example, the electronic device 704 can receive the message from the remote computing device 702 and display the data (e.g., the transaction data) of the message in a push notification. A user accessing the electronic device 704 can select a button (e.g., a hyperlink) in the push notification. The processor 714 can receive the selection and automatically open or activate the chat application 720 responsive to receiving the selection.

Upon opening or activating the chat application 720, the interface generator 726 of the chat application 720 can generate and/or present a user interface of the chat application 720. The interface generator 726 can comprise programmable instructions that, upon execution, cause the processor 714 to generate a user interface of the chat application 720. The user interface can include a form or an input portion or the user can navigate the user interface to such a form or input portion. The form or input portion can be located on a chat interface of the chat application 720. The user can provide text, video, or image input into the form or input portion of the user interface. In some cases, the electronic device 704 can receive audio recordings and the chat application 720 can automatically translate the audio records into text. The chat application 720 can input the translated text into the chat interface.

The voice recognizer 724 may comprise programmable instructions that, upon execution, cause the processor 714 to convert audio into text. For example, the user of the electronic device 704 can speak into a microphone of the electronic device. The microphone can capture the speech as audio data and transmit the audio data to the chat application 720. The voice recognizer 724 can convert the speech into text, such as by using Fourier transforms. The voice recognizer 724 can cluster and classify words of the text to generate a prompt or input to insert into the large language model 728.

In some embodiments, the voice recognizer 724 only operates upon the user of the electronic device 704 choosing to provide inputs to the chat interface via a voice option. The message to the electronic device 704 from the remote computing device 702 may include a string of text asking whether the user wishes to use voice or text to provide input into the chat application 720. The user may respond to the message (e.g., send a message, such as a text message, back to the remote computing device 702) with an indication to use voice to provide input into the chat application 720. The indication may be, for example, the letter "v." The electronic device 704 can transmit the message containing the indication to the remote computing device 702. The remote computing device 702 can transmit a message back to the electronic device 704 that causes the processor 714 to activate the chat application 720 and generate a voice chat interface through which the chat application 720 can receive inputs from the user via the microphone of the electronic device 704.

In some embodiments, the electronic device 704 can generate the voice chat interface locally. For example, the electronic device 704 can display the contents of the message from the remote computing device 702 in a push notification. The user can select the push notification or an option within the push notification to access the chat application 720. Upon doing so the user can access the chat application 720 and select an option to use voice to provide an input into the chat application 720. Upon receiving the selection, the interface generator 726 can configure the chat application 720 to receive audio data from the microphone of the electronic device 704 through a chat interface. The voice recognizer 724 can convert the audio data into text and insert the text into the large language model 728.

The large language model 728 can be a machine learning model (e.g., neural network, a transformer, etc.) that has been trained to output conversational text to a chat interface of the chat application 720 in response to inputs at the chat interface. The large language model 728 can be trained using few-shot and/or zero-shot learning techniques.

In some embodiments, the large language model 728 can be trained to output responses to inputs regarding transactions. For example, the large language model 728 can receive a notification to generate an output based on a transaction. In response to the notification, the large language model 728 can automatically output a request for an action to perform, in some cases based on transaction data of a transaction (e.g., the time of the transaction, the location of the transaction, the amount of the transaction, etc.). The large language model 728 can output the request as a string of text to the chat interface for display on the electronic device 704. In some embodiments, the large language model 728 can output the request as a string of text to a text-to-speech converter (e.g., the voice recognizer 724). The text-to-speech converter can convert the text into audio data. The electronic device 704 can play audio data through speakers of the electronic device 704. The large language model 728 can receive a response to the request either as a text input into the chat interface or as audio input into the chat interface and automatically generate a new string of text based on the response. The large language model 728 can iteratively repeat this process to maintain a conversation with the user through the chat interface of the chat application 720.

In some embodiments, the large language model 728 is stored at the remote computing device 702. For example, the electronic device 704 can communicate or otherwise establish a communication session with the remote computing device 702. The electronic device 704 can receive inputs from a chat interface generated by the interface generator 726. The electronic device 704 can transmit the inputs as text in messages to the remote computing device 702. The remote computing device 702 can input the text into the large language model 728 stored in memory of the remote computing device 702 and execute the large language model 728. The large language model can generate responses to the inputs as text. The remote computing device 702 can transmit the responses to the electronic device 704. The electronic device 704 can present the responses to the user at the chat interface as text or audio data. The user can view or hear the responses and provide further input based on the responses. The electronic device 704 can iteratively repeat this process to maintain a conversation between the user and the large language model 728.

The model manager 730 may comprise programmable instructions that, upon execution, cause the processor 714 to provide inputs into the large language model 728, execute the large language model 728, and identify outputs of the large language model 728. For example, the user of the electronic device 704 can speak into a microphone of the electronic device 704. The microphone can capture the speech as audio data and transmit the audio data to the chat application 720. The voice recognizer 724 can convert the speech into text, such as by using Fourier transforms. The voice recognizer 724 can cluster and classify words of the text to generate a prompt (e.g., a feature vector of input data) or input to insert into the large language model 728. The model manager 730 can execute the large language model 728 based on such inputs to cause the large language model 728 to output responses to the prompts or inputs.

The model manager 730 can facilitate a conversation between the large language model 728 and a user accessing the electronic device 704 regarding the transaction performed by the transaction card 708. For example, the user can select an option in a push notification displayed on the display of the electronic device 704 (or send a text message response to the message from the remote computing device 702) to add additional transaction data for the transaction. In response to the selection by the user, the processor 714 of the electronic device 704 can activate or open the chat application 720. The interface generator 726 can generate a chat interface through which the user can provide text or voice input, in some cases based on a selection by the user. The model manager 730 can input the transaction of the transaction into the large language model 728. The model manager 730 can execute the large language model 728. The large language model 728 can output a text response requesting further data regarding the transaction based on the input transaction data. The model manager 730 can display or play the text response for the user through the chat interface.

The large language model 728 can generate the text response requesting further data regarding the transaction based on the transaction data for the transaction. For example, the large language model 728 may generate requests for certain types of data based on the time and/or day of the transaction. For instance, the large language model 728 may generate a text confirming that the transaction occurred at Store A when the transaction data does not include an identification of the location of the transaction but includes a time of the transaction and the large language model 728 may have previously received and/or been trained on transaction data indicating that the user shops at Store A at the time of the transaction or within a time range of the time of the transaction. In another example, the large language model 728 may request data that the user may have provided in one or more transactions with similar transaction data to the transaction performed by the transaction card 708. For instance, the user may have requested to store additional notes regarding transactions that the user performed on consecutive Tuesdays. The transaction data for the transaction may include an identification that the transaction was performed on a Tuesday. The large language model 728 may identify the identification that the transaction was performed on a Tuesday and automatically ask (e.g., generate a string of text with a question for) the user whether the user wishes to provide additional notes regarding the transaction. In another example, the large language model 728 may detect a change in purchasing behavior and request a reason for the change in behavior or request confirmation that the transactions are not fraudulent. In another example, the large language model 728 may determine that there is not a category (e.g., a budget category or a type of purchase category) for the transaction in the transaction data and request that the user provide a category for the transaction. The large language model 728 can generate the requests or responses as text strings and request any type of data.

In some cases, the large language model 728 can request actions that the user would like to be performed. For example, the large language model 728 can ask the user what action the user would like performed or ask the user if the user requires any other action. In some cases, the large language model 728 can ask the user whether the user would like specific actions performed, such as whether the user would like to capture and/or store an image of a receipt or if the user would like to generate a memorandum or notes regarding a transaction. The large language model 728 can request such actions based on transaction data of transactions and/or automatically responsive to an indication to initiate a conversation at the chat interface (e.g., the large language model 728 may automatically ask the user what action to perform responsive to activation of the chat application 720).

In some embodiments, the model manager 730 can input account data associated with the transaction card 708 with the transaction data for the transaction into the large language model 728. For example, the account database 722 can be a graph or relational database. The account database 722 can be a data structure that stores data regarding one or more accounts (e.g., financial accounts). The account database 722 can store ledgers with records of different transactions performed by the accounts. The accounts can include identifiers of different transaction cards that perform transactions for the respective accounts. The account database 722 can also store other data (e.g., account data) regarding the accounts, such as categories of transactions performed through the respective accounts, budgets for the respective accounts and/or for different categories of the respective accounts, timestamps of the respective transactions, any other transaction data of the respective transactions, etc. The account database 722 can store any type of data for respective accounts.

The account database 722 can be located at the electronic device 704 and/or the remote computing device 702. In cases in which the account database 722 is stored at the electronic device 704, the account database 722 can be configured to store data for an account associated with the transaction card 708 and data for no other account, in some cases. The electronic device 704 can update the account database 722 with transaction data for different transactions performed by the transaction card 708 or any other card associated with the account or another account of the account database 722 responsive to receiving the transaction data (e.g., receiving the transaction data from the remote computing device 702). In cases in which the account database 722 is stored at the remote computing device 702, the account database 722 can store data for any number of accounts. The remote computing device 702 can update the account database 722 with transaction data for different transactions performed through the accounts of the account database 722 as the remote computing device 702 receives and processes such transaction data.

The model manager 730 can use account data of an account associated with the transaction card 708 as input into the large language model 728. For example, the model manager 730 can retrieve account data, such as a remaining budget or a remaining budget for the same category of the transaction, from the account database 722 (e.g., from the account database 722 stored in memory 716 or the account database 722 stored in memory of the remote computing device 702). The model manager 730 can retrieve any type of account data regarding the account associated with the transaction card 708 from the account database 722. In cases in which the account database 722 is stored at the remote computing device, the model manager 730 can retrieve the account data by requesting the account data from the remote computing device 702 or the remote computing device 702 can automatically transmit the account data to the electronic device 704. The model manager 730 can generate an input including the transaction data for the transaction performed by the transaction card 708 and the account data and insert the generated input into the large language model 728. The model manager 730 can execute the large language model 728 to cause the large language model 728 to output a text string (e.g., a first text string) in a response to the input.

The text string output by the large language model 728 can be or include a request for further data regarding the transaction. In one example, the text string output by the large language model can be or include a request for a category of the transaction. For instance, the transaction data for the transaction may include data regarding a time, a location, and/or an amount of the transaction, but not a category of the transaction. Account data that may be included with the transaction data may indicate that the account has budgets for different categories (e.g., transaction categories) of transactions, such as recreational, automotive, groceries, etc. The large language model 728 may receive such transaction data and, in some cases, account data, and output a string asking for a category of the transaction. The model manager 730 can present the string of text at the chat interface (e.g., present the text at the user interface generated by the interface generator 726 and/or play audio of the string of text through a speaker of the electronic device 704.

The user accessing the electronic device 704 can view or hear the string of text (e.g., as audio data of the string of text). In response, the user can input (e.g., by typing or speaking) a category for the transaction into the chat interface as additional transaction data. The model manager 730 can receive and identify the transaction category for the transaction from the chat interface.

The model manager 730 can execute the large language model 728 using the transaction category for the transaction as input. The large language model 728 can determine the transaction category is a continuation of the previous input transaction data and/or account data for a transaction using internal rules. In response to receiving the transaction category for the transaction, in response to determining that the transaction category is a continuation of the previous input transaction, and/or in response to determining not to request any further transaction data, the large language model 728 can store the transaction category in the account database 722 (e.g., in the memory 716 and/or at the remote computing device 702) in a record with other transaction data of the same transaction. For example, the model manager 730 can transmit a message (e.g., a second message) to the remote computing device 702 that includes the additional transaction data (e.g., a category of the transaction), an identification of the transaction (e.g., a transaction number), and/or the identifier of the transaction card 708 to the remote computing device 702. The remote computing device 702 can receive the message and store the additional transaction data in a record with any other transaction data of the transaction on a ledger associated with the account of the transaction card 708. The ledger can include one or more other records of transactions performed by the transaction card. The large language model 728 can generate and output a string of text (e.g., a second string of text) indicating that the additional transaction data has been stored in a record. The model manager 730 can identify the string of text and present the string of text at the chat interface of the chat application.

In some cases, the computer (e.g., the remote computing device 702 or the electronic device 704) storing the account database 722 can store the transaction data in a ledger of the account of the transaction card 708 that corresponds to the transaction category of the transaction (e.g., the transaction category that the chat application 720 receives through the chat interface). For example, the remote computing device 702 can receive the transaction category for the transaction and/or transaction data for the transaction. The remote computing device 702 can identify the account of the transaction card 708 based on the account having a matching card identifier to the transaction card 708. The remote computing device 702 can compare the transaction category for the transaction to ledgers for different transaction categories that the account database 722 stores for the account using a look-up technique. Responsive to identifying a ledger associated with the transaction category (e.g., that contains a matching transaction category identification), the remote computing device 702 can store the transaction data for the transaction in the ledger of the account with the transaction category of the transaction.

In some cases, the account may not include a ledger for a transaction category that is included in data from the electronic device 704. For example, the remote computing device 702 can query the account database 722 for a ledger for the account of the transaction performed by the transaction card 708 that corresponds to a transaction category received from the electronic device 704. Based on the query, the remote computing device 702 can determine there is not a ledger for the account that corresponds to the transaction category. In response to the determination, the remote computing device 702 can generate a data structure (e.g., a table) comprising a ledger for transactions associated with the transaction category in the account database 722. The remote computing device 702 can store the transaction data for the transaction in the ledger of the generated data structure.

The model manager 730 can iteratively generate strings of text as the user provides inputs into the chat interface. For example, in some cases, the large language model 728 can request more transaction data regarding the transaction with the subsequently generated string of text instead of or in addition to indicating the additional transaction data has been stored in memory. Such transaction data can be a secondary category of the transaction, a time of the transaction, a location of the transaction, and/or any other data regarding the transaction (e.g., data that was not included in the transaction data and/or account data that was initially input into the large language model 728). The user can input the requested text and/or input any other data into the chat interface to cause the large language model 728 to generate a response. This process can repeat until the large language model 728 determines the conversation is over, such as based on the most recently received input (e.g., an input such as "nothing further" or "thank you"). The chat application 720 can store any transaction data regarding the transaction that the chat application 720 receives through the chat interface in the account database 722.

In some cases, the large language model 728 can be configured to operate other applications in the memory 716 of the electronic device 704. For example, the large language model 728 can receive a request to store an image of a document (e.g., a receipt) for the transaction performed by the transaction card 708. In response to receiving the request, the large language model 728 can automatically activate a camera application in memory of the electronic device 704. The camera application can include executable instructions that, upon execution, cause the processor 714 to operate a camera of the electronic device 704. The user accessing the electronic device 704 can provide an input into the camera application to cause the camera of the electronic device 704 to capture an image of the document. The chat application 720 can store the image of the document in the record for the transaction in the account database 722 and/or transmit the image of the document to the remote computing device 702 to store the image in the record for the transaction in the account database 722. The model manager 730 can execute the large language model 728 using the request to store the image as input. In response, the large language model 728 can output a string of text (e.g., a third string of text) indicating the image has been stored. The model manager 730 can present the string of text at the chat interface of the chat application.

In some embodiments, the model manager 730 can input data of the image of the document into the large language model 728. For example, the model manager 730 can input the image of the document into an object detection machine learning model (e.g., a neural network, such as a convolutional neural network) and execute the object detection machine learning model. In response to the execution, the object detection machine learning model can automatically identify text and/or objects in the image (e.g., the text in the receipt, such as the specific items that were purchased and/or the prices of such items). The object detection machine learning model can output text indicating or describing the text and/or objects. The model manager 730 can identify the output of the object detection machine learning model and input the output of the object detection machine learning model into the large language model 728. The model manager 730 can execute the large language model 728 and the large language model 728 can output a text string based on the input data of the image. In some cases, the text string can indicate the specific items that were purchased, amounts for the items, and/or any other characteristics for the items. The chat application 720 can store the output and/or any extracted data from the image with the transaction data in the record of the account database 722.

In one example of using account data to generate output text responses, at initiation, the chat application 720 may predict most probable next action(s) based on the prior receipt of a delivery notice for a store in the location proximity of the user or an indication that no real time transaction notice is pending. The chat application 720 may determine the probable initial action based on prior stores visited by the user of the account and the transaction history or the lack of prior data. The chat application 720 can perform categorization by predicting the most probable categories or new category suggestions based on location, date, time, stores in proximity, last transactions in the proximity, categories/types used and the recorded use of splitting and multi-association of transaction allocations. The chat application 720 determine when to request receipt capture based on location/store type and amount plus prior transaction info known for this location/store and recorded receipt categories/types used and the recorded use of splitting and multi-association of transaction allocations. The chat application 720 can determine when to request personal memos based on location/store type and amount plus prior transaction info known for this location/store and recorded receipt categories/types used and the recorded use of splitting and multi-association of transaction allocations as well as the use and content of prior memos. The chat application 720 can analyze free form, unstructured memos for key phrases and words so that content, importance, and potential additional actions can be tagged/labeled and extracted. The chat application 720 can analyze conversational instructions for potential needed next actions or to extract specific instructions to be taken so that the most probable action can be confirmed conversationally. The chat application 720 can perform one or more of such functions through the large language model 728 to generate output text prompts. In doing so, the chat application can use account data of the account through which the transaction was performed, transaction data of the transaction, and/or any user-provided input.

Figure 8:
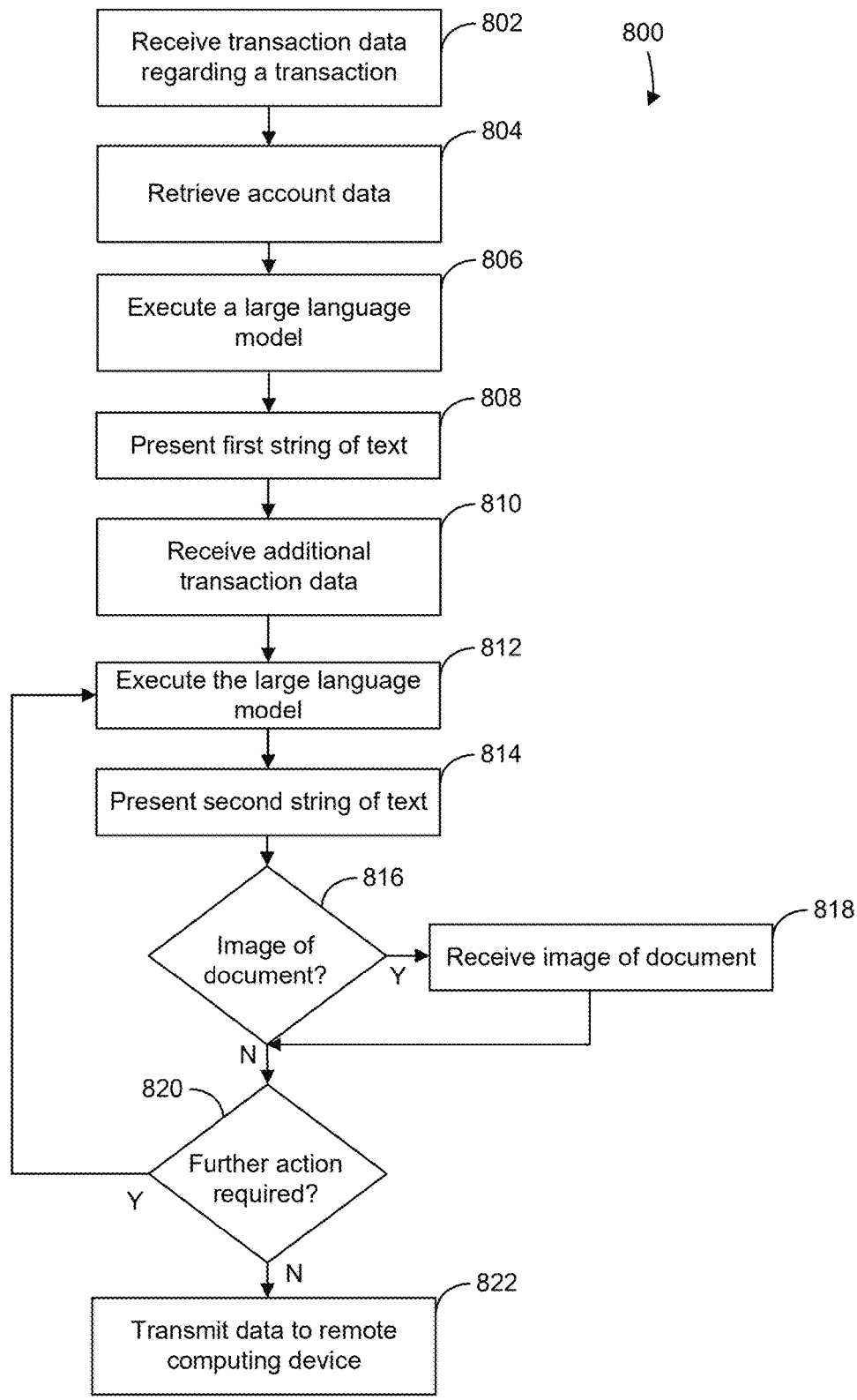
FIG. 8 is an illustration of an example method for using large language processing for contextual transaction data collection, in accordance with an implementation.

FIG. 8 is an illustration of an example method 800 for using large language processing for contextual transaction data collection, in accordance with an implementation. The method 800 can be performed by a data processing system (e.g., a client device or the electronic device 704, shown and described with reference to FIG. 7, a server system, etc.). The method 800 may include more or fewer operations and the operations may be performed in any order. Performance of the method 800 may enable the data processing system to provide an accessible user interface to collect contextual data for transactions. The method 800 can enable a large language model to collect such contextual data and integrate with other applications stored on the same computing device as the large language model. Using a large language learning model in this manner can enable the data processing system to enrich transaction data for transactions that the data processing system has stored in memory via an interactive and natural communication interface.

In the method 800, at operation 802, the data processing system receives transaction data regarding a transaction. The transaction can be performed by a transaction card. The transaction can be a transaction performed at a brick-and-mortar store such as at a point-of-sale device or can be an online transaction. The transaction data can include any data regarding the transaction, such as a time, location, and/or amount of the transaction. In some cases, the transaction data can include a card identifier of the transaction card that was used to perform the transaction and/or an identification of the transaction itself.

The data processing system can receive the transaction data in a message from a remote computing device (e.g., the remote computing device 702). The data processing system can receive the transaction data via a communications network such as via e-mail or via a text message. The data processing system can present the contents of the message (e.g., the transaction data) at a user interface of the data processing system. A user accessing the data processing system can provide an input indicating to add additional transaction data to the transaction data and, in some cases, a method of adding the additional transaction data (e.g., using voice or text).

At operation 804, the data processing system retrieves account data. The account data can be data of an account that corresponds to the transaction card that performed the transaction. The account data can include historical transaction data of previous transactions that the transaction card or the account was used to perform, a remaining budget or a remaining budget for the transaction category of the transaction, or any other data of an account. The data processing system can retrieve the account data by querying a local database or by requesting the account data from the remote computing device that transmitted the initial message to the data processing system for the transaction. The data processing system can query the database and/or include the identifier of the transaction card that performed the transaction in the message to the remote computing device to retrieve the account data. The remote computing device can transmit the account data back to the data processing system or the data processing system can retrieve the account data from the database.

At operation 806, the data processing system executes a large language model. The large language model can be a language processing model that is configured to automatically generate text output based on text input that the large language model receives. The data processing system can input the transaction data for the transaction performed by the transaction card with the account data into the large language model. The large language model can generate and/or output a first string of text based on the input and the execution. The first string of text can be a request for further data regarding the transaction (e.g., a request for a transaction category of the transaction or any other data regarding the transaction that is not included in the transaction data (e.g., time, location, and/or amount)).

At operation 808, the data processing system presents the first string of text. The data processing system can present the first string of text at a chat interface. The data processing system can do so, for example, by presenting the text on a display or playing audio of the first string of text after the data processing system converts the first string of text into audio. The data processing system can select the method of presenting the first string of text based on an option selected by the user of the data processing system. The user accessing the data processing system can view or hear the content of the first string of text.

At operation 810, the data processing system receives additional transaction data. The additional transaction data can be any transaction data regarding the transaction performed by the transaction card. The additional transaction data can be or include a transaction category for the transaction, an image of a receipt for the transaction, or any other data for the transaction that the user provides as input. The data processing system can receive the additional transaction data as a text input into the data processing system via an input/output device or based on the user speaking into a speaker of the data processing system.

At operation 812, the data processing system executes the large language model. The data processing system can execute the large language model using the additional transaction data as input. The large language model can determine the additional transaction data is a continuation of the initial input transaction data and account data using a set of internal rules. The data processing system can execute the large language model based on the additional transaction data and the large language model can generate a second string of text. In some cases, the data processing system can store the transaction data and additional transaction data in a record in memory or transmit the transaction data and additional transaction data to the remote computing device for storage. In some cases, the second string of text can ask the user if there is any further data to include with the transaction data or if any further action is required. At operation 814, the data processing system presents the second string of text at the chat interface.

At operation 816, the data processing system determines the user has provided an input requesting to include an image of a document (e.g., a receipt) for the transaction. For example, the user can provide one or more further inputs into the chat interface to use as input into the machine learning model. The data processing system can execute the large language model using each of the inputs from the user as inputs into the large language model to generate text responses. The data processing system can repeat this process any number of times.

In one example, the user may input text indicating to include an image of a document (e.g., a receipt) for the transaction. The data processing system can input the request to include the image into the large language model and execute the large language model. In response to execution, the large language model can activate a camera application on the data processing system. The user can capture an image of the document using the camera application through a camera of the data processing system. At operation 818, the data processing system can receive the image from the camera application. The data processing system can receive an input into the chat interface indicating that the image is good and/or to store the image. In response to such an input, the data processing system can store the image within the record with the transaction data and/or transmit the image to the remote computing device and the remote computing device can store (e.g., attach) the image with a record of the transaction data.

At operation 820, the data processing system can determine whether further action is required. The data processing system can do so based on a user input at the chat interface. For example, the large language model can generate a text output asking if any other further action is required. Responsive to receiving an input at the chat interface indicating that further action is required and/or a type of the action, the data processing system can return to the operation 812 and repeat the operations 812-820. The data processing system can repeat the operations 812-820 any number of times such that the data processing system can collect any amount of data regarding the transaction and/or perform any action regarding the transaction.

Responsive to receiving an input at the chat interface indicating further action is not required, at operation 822, the data processing system transmits data to the remote computing device. The data processing system can transmit any data regarding the transaction to the remote computing device in a message. The data processing system can include the identification of the transaction in the message and/or the card identifier of the transaction card that was used to perform the transaction in the message. The data processing system can include any images that were input regarding the transaction in the message. The remote computing device can receive the message and identify or extract any data from the message. The remote computing device can generate a record from the extracted data including any other transaction data that the remote computing device had stored for the transaction (which the remote computing device may identify based on the transaction identification and/or the card identifier of the transaction card). The remote computing device can store the record in memory.

In some cases, the data received through the chat interface can include a category of the transaction. In such cases, the remote computing device can identify a ledger in memory for the account associated with the transaction card that corresponds with the category of the transaction. The data processing system can store the record in the identified ledger.

In some embodiments, the data processing system can additionally or instead generate and/or store a record in memory for the transaction data. The data processing system do so in the same or a similar manner to the manner described above with respect to the remote computing device. In such embodiments, the data processing system may store records of transactions performed by the transaction card.

Figure 9:
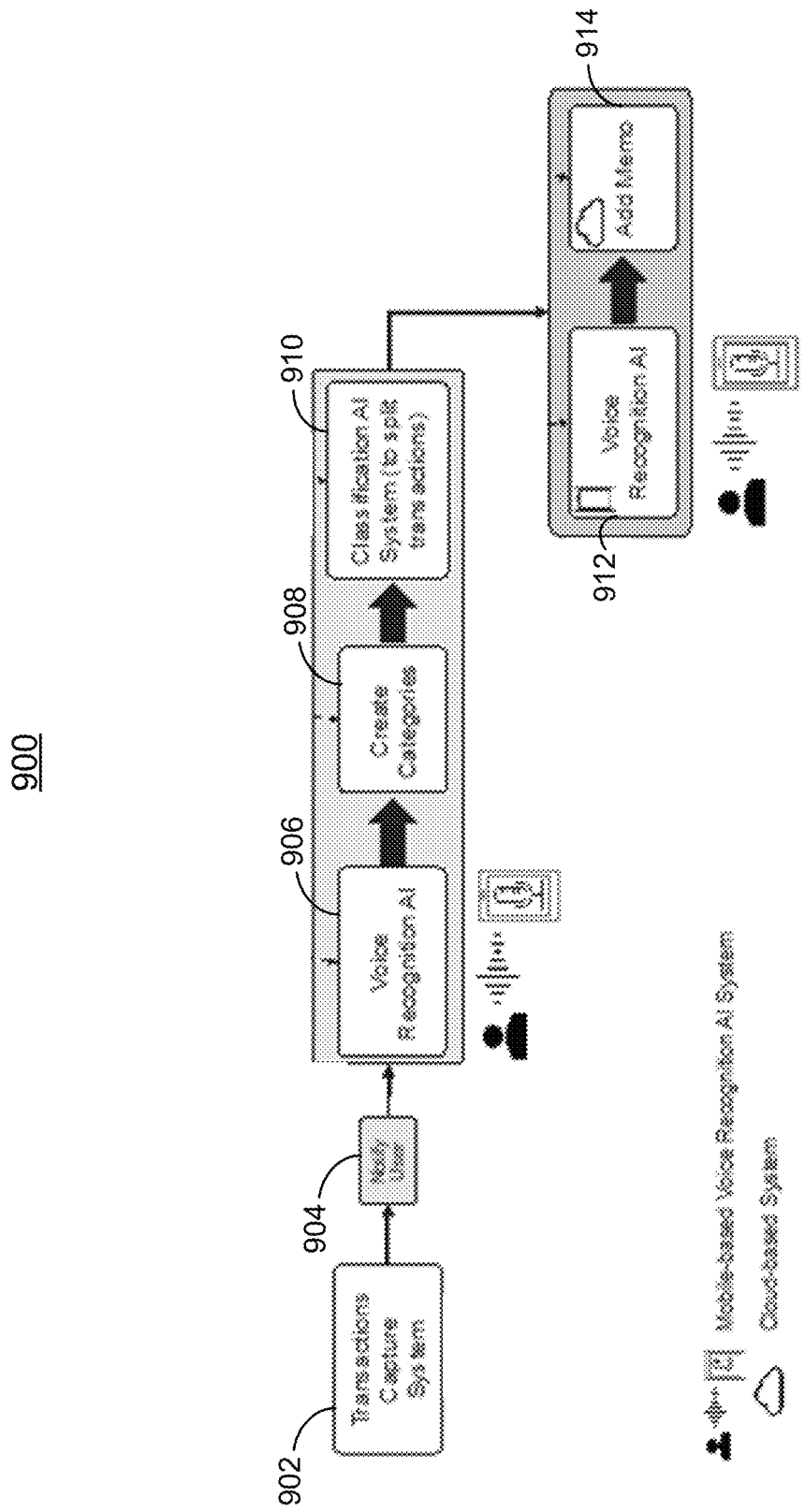
FIG. 9 is an illustration of an example sequence for using large language processing for contextual transaction data collection, in accordance with an implementation.

FIG. 9 is an illustration of an example sequence 900 for using large language processing for contextual transaction data collection, in accordance with an implementation. The sequence 900 can be performed by one or more components of the system 700. For example, different operations of the sequence 900 can be performed by one or more of a remote computing device (e.g., the remote computing device 702) or an electronic device (e.g., the electronic device 704). The sequence 900 can be performed to facilitate a user using voice inputs to add contextual data to a transaction.

At operation 902, the remote computing device can identify a transaction performed by a transaction card. The remote computing device can be a transaction capture system that is configured to identify and/or store transaction data for transactions upon completion of the transactions. The remote computing device can be or include an artificial intelligence system that uses a machine learning model (e.g., a neural network, a random forest, a support vector machine, etc.) that has been trained to automatically detect transactions that are performed at brick-and-mortar stores and/or online. The remote computing device can communicate with a data warehouse to retrieve data related to such transactions. In some embodiments, the machine learning model can be a deep learning system that includes one or more neural networks that cooperate to recognize, capture, and categorize the transactions. The machine learning model can categorize transactions into the types of stores or websites at which the transactions are performed. The machine learning model may not be able to extract or determine the category of the transaction without any user input.

The remote computing device can identify a transaction (e.g., the remote computing device can receive an indication of a transaction from a point-of-sale device and/or the data warehouse with any transaction data for the transaction and/or the remote computing device can retrieve transaction from the data warehouse responsive to receiving an indication of the transaction). The remote computing device can execute the machine learning model to determine a category of the type of store or website at which the transaction was performed from the transaction data of the transaction.

At operation 904, the remote computing device can transmit a notification of the transaction to an electronic computing device. The remote computing device can transmit the notification of the transaction to the electronic computing device in a message. The remote computing device can include the transaction data for the transaction in the message. The message can include the transaction data in a text format. The text can indicate to the user of the electronic device that the remote computing device is ready to receive additional transaction data (e.g., purchase details) regarding the transaction and assist the user in organizing spending for future purchases. The electronic device can display the text at a user interface to the user. The user can select an option to provide additional transaction data. In some cases, the user can provide an input indicating to provide the additional data via a voice input.

At operation 906, the electronic device can execute a voice recognition artificial intelligence system to process data received from the user. The electronic device can do so responsive to the user providing an input at the electronic device to provide additional transaction data for the transaction. The voice recognition artificial intelligence system can use deep learning techniques for voice recognition. The voice recognition artificial intelligence system can convert the user's voice into text and execute a natural language model procedure to cluster the text (e.g., words) and classify the clusters of text (e.g., classify the clusters based on or more characteristics based on which the words of the text were clustered).

At operation 908, the electronic device can execute a categorizer machine learning model. The categorizer machine learning model can be a neural network, support vector machine, random forest, etc., that is configured to categorize text generated by the voice recognition artificial intelligence system or otherwise received as input by the electronic device. The categorizer machine learning model can be trained to classify user commands, such as assigning a transaction category to a transaction. For example, when a user command is to create a transaction category of grocery for a transaction, the categorizer machine learning model can create a data object or tag identifying the transaction category of grocery for the transaction.

At operation 910, the electronic device can execute a classification model to assign the transaction category (e.g., the data object or tag) to the transaction. The classification model can combine the transaction data for the transaction with the transaction category to identify and classify the transaction category of the transaction. The classification model can combine the transaction data and the transaction category into a common data file. The data file can be a memorandum (memo). The electronic device can collect and combine any type or amount of additional transaction data for the transaction.

The electronic device can execute a large language model based on the transaction data and the input additional transaction data. The large language model can include or be in communication with one or more of the categorizer machine learning model and/or the classification model. The large language model can generate text indicating the additional transaction data has been successfully combined (e.g., combined into the common data file). The large language model can display the text at a user interface displayed at the electronic device or the electronic device can convert the text into audio and play the audio to the user. The user can provide an input (e.g., text or voice input) indicating confirmation that no further action is needed. If the user provides the input as voice data, at operation 912, the voice recognition artificial intelligence system can convert the voice data to text data and the categorizer machine learning model and classification model can operate to determine no further action is needed.

At operation 914, the electronic device can transmit the combined file to the remote computing device to store in memory in a record. The remote computing device can include an identifier of the transaction in the record that can be used to look up the transaction data and/or additional transaction data of the transaction.

Figure 10:
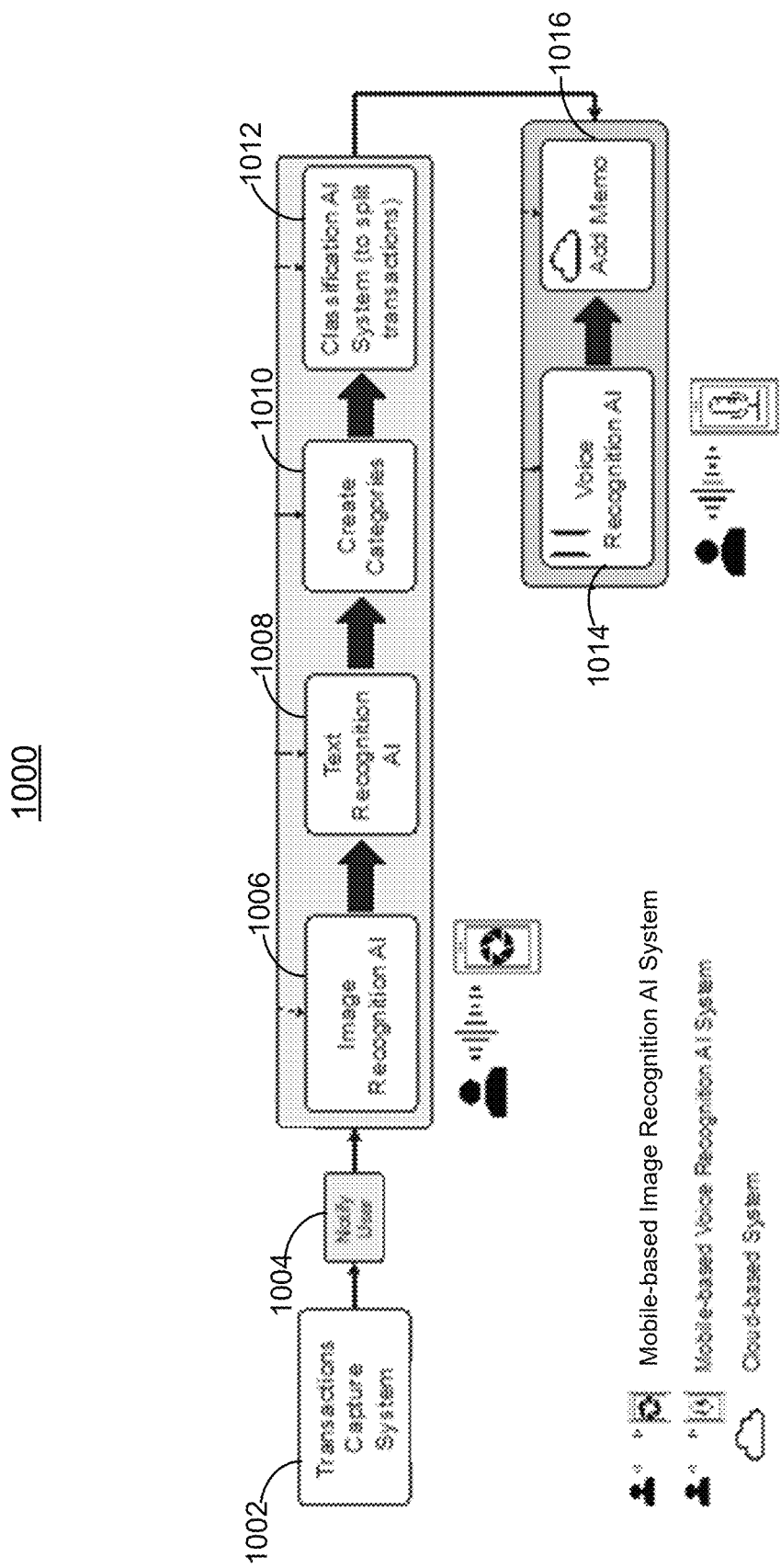
FIG. 10 is an illustration of an example sequence for using large language processing for contextual transaction data collection, in accordance with an implementation.

FIG. 10 is an illustration of an example sequence 1000 for using large language processing for contextual transaction data collection, in accordance with an implementation. The sequence 1000 can be performed by one or more components of the system 700 or the system 700. For example, different operations of the sequence 1000 can be performed by one or more of a remote computing device (e.g., the remote computing device 702) or an electronic device (e.g., the electronic device 704). The sequence 1000 can be performed to facilitate a user using image inputs to add contextual data to a transaction.

At operation 1002, the remote computing device can identify a transaction performed by a transaction card. At operation 1004, the remote computing device can transmit a notification of the transaction to an electronic computing device. The remote computing device can perform the operations 1002 and 1004 in the same manner as described above with respect to the operations 902 and 904.

At operation 1006, the electronic device can execute an image recognition artificial intelligence system (e.g., an object detection machine learning model configured to extract or identify objects in images) to process an image received from the user. The image can be an image received of a document (e.g., a receipt) associated with the transaction. The electronic device can execute the image recognition artificial intelligence system responsive to the user providing an input at the electronic device to add an image as additional transaction data for the transaction and capturing and/or otherwise providing the image as input into the object detection machine learning model. The electronic device can capture the image using a camera of the electronic device or the user can otherwise upload the image to the electronic device. The electronic device can execute the image recognition artificial intelligence system and the image recognition artificial intelligence system can output text or other objects that the image recognition artificial intelligence system identifies or otherwise classifies from the image.

In some cases, instead of extracting data from an image of the document, the electronic device can receive data of a receipt or a similar document for the transaction in a text message or an email from a computer of the merchant at which the transaction was performed. The electronic device can match the data of the transaction from the merchant based on the message containing a matching transaction identifier to the transaction for which the electronic device is adding data (e.g., a matching transaction identifier to the transaction identifier the electronic device received from the remote computing device).

At operation 1008, the electronic computing device can execute a text recognition artificial intelligence system. The text recognition artificial intelligence system can execute a natural language model procedure to cluster the text (e.g., words) and classify the clusters of text (e.g., classify the clusters based on or more characteristics based on which the words of the text were clustered).

At operation 1010, the electronic device can execute a categorizer machine learning model. The categorizer machine learning model can be the same categorizer machine learning model as is described above with respect to the operation 908. The categorizer machine learning model can execute the categorizer machine learning model using text (e.g., the clustered text) from the document for the transaction and/or voice or text from the user as input. In some cases, the categorizer machine learning model can be configured or trained to automatically determine (e.g., based on internal weights or parameters of the machine learning model) a transaction category for the transaction from the text of the document. The categorizer machine learning model can output a transaction category for the transaction based on the user input text or voice data and/or data of the image of the document for the transaction.

At operation 1012, the electronic device can execute a classification model to assign the transaction category (e.g., the data object or tag) to the transaction. The classification model can combine the transaction data for the transaction with the transaction category and/or image of the document. The transaction category and/or image can be additional transaction data. The classification model can combine the transaction data, the transaction category, and/or the image of the document into a common data file. The data file can be a memorandum. The electronic device can collect and combine any type or amount of additional transaction data for the transaction.

If the user provides an input as voice data, at operation 1014, a voice recognition artificial intelligence system (e.g., the same or a similar voice recognition artificial intelligence system as described above) can convert the voice data to text data and the categorizer machine learning model and classification model can operate to determine no further action is needed.

At operation 1016, the electronic device can transmit the combined file to the remote computing device to store in memory in a record. The remote computing device can include an identifier of the transaction in the record that can be used to look up the transaction data and/or additional transaction data of the transaction.

FIGS. 11-16 are example scenarios 1100-1600 of communication between a user and one or more computing devices regarding a transaction, in accordance with an implementation. Each of the scenarios 1100-1600 can be performed, for example, by a user accessing an electronic device (e.g., a mobile electronic device) subsequent to performing a transaction and/or while the user is walking back to their vehicle from the store through which the transaction was performed. The electronic device can store and execute a chat application containing a large language model to communicate with the user.

In the scenario 1100, an electronic device (e.g., a cellular phone) of a user can receive a text (or a message through another communication protocol) indicating a transaction was performed and transaction data of the transaction. The user can respond to the text with a message to add additional context data for the transaction and the method of adding the context data. The message can include an indication of a method (e.g., voice or text) of adding the additional context data. In response to selecting the method of "voice," the electronic device can activate a chat application and the chat application can output audio data asking the user for an action to perform. The chat application can generate the request of the output audio data using a large language model such as by using the transaction data of the transaction and/or account data of an account through which the transaction was performed as input. In some embodiments, the electronic device can select the text to output as audio or text data from a stored set of text that the electronic device retrieves upon activation of the chat application.

The user can provide an input (e.g., by speaking per the selected method) to set the transaction category of the transaction to "Home Office Supplies." The electronic device can determine (e.g., through the large language model of the electronic device using an adapter) the account of the user or transaction does not currently have a ledger or any indication for the input category, such as by querying the remote device or by querying a database stored in memory and determining the account does not have any data regarding the transaction category. In response to the determination, the large language model can generate text indicating the transaction category does not exist and ask the user if the user would like to create a ledger for the transaction category. The electronic device can ask the user if the user would like to add any further additional transaction data for the transaction, such as by asking if the user would like to add a personal memo. The user can reply with a "yes" input and the electronic device can output instructions for the user to add the additional transaction data. The user can input the additional data. The electronic device can request if the user would like any further action to be performed or to add further additional transaction data. The user can respond in the negative.

The electronic device can transmit the additional transaction data (e.g., the transaction category and the personal memo) to the remote computing device in a message, and the remote computing device can store the data of the message in a record in a ledger with any other transaction data of the transaction. The remote computing device can generate a new ledger for the new transaction category and store the record in the new ledger. The remote computing device can transmit a message to the electronic computing device that the storage was a success. The electronic computing device can generate and present a text output indicating the transaction data and additional transaction data have been stored and a location of the storage (e.g., the ledger in which the transaction data was stored), in some embodiments in response to the confirmation message from the remote computing device. Any or all the actions performed by the electronic device can be performed by the large language model of the device (e.g., such as by executing various adapters of the large language model when necessary).

In the scenario 1200, an electronic device (e.g., a cellular phone) of a user can receive a text (or a message through another communication protocol) indicating a transaction was performed and transaction data of the transaction. The user can respond to the text with a message to add additional context data for the transaction and the method of adding the context data. The message can include an indication of a method (e.g., voice or text) of adding the additional context data. In response to selecting the method of "voice," the electronic device can activate a chat application and the chat application can output audio data asking the user for an action to perform. The chat application can generate the request of the output audio data using a large language model such as by using the transaction data of the transaction and/or account data of an account through which the transaction was performed as input. In some embodiments, the electronic device can select the text to output as audio or text data from a stored set of text that the electronic device retrieves upon activation of the chat application.

The user can provide an input (e.g., by speaking per the selected method) to record the full amount for the transaction. The electronic device can respond with a question as to which transaction category to use. The user can respond with a transaction category of "Home office equipment." Responsive to the request to set the transaction category for the transaction to Home office equipment," the electronic device can record the transaction data for the transaction in a ledger for the home office equipment category, such as by storing a record of the transaction data locally in memory or by transmitting an indication of the home office equipment transaction category to the remote computing device, in some cases with the transaction or an identification of the transaction, for the remote computing device to store in a ledger for the home office equipment transaction category for the account of the transaction. The electronic device can output a request as to whether the user wishes to store additional transaction data regarding the transaction and whether the user would like to attach an image of a document (e.g., a receipt) for the transaction. The electronic device may determine to ask whether the user would like to input a receipt based on previous transactions, such as previous transactions with similar transaction data (e.g., that were performed at times within a threshold of the time of the transaction, for amounts within a threshold of the amount of the transaction, and/or at the same location), for which the user requested to input an image of a document. The previous transactions can be historical transactions, or the transaction data of the previous transactions can be historical transaction data. The historical transaction data can be account data of the account associated with the user. The electronic device can retrieve the account data from memory, query the remote computing device for account data for the account of the user, and/or query the message from the remote computing device. The user can provide an input indicating not to attach an image of the document and a description of the item purchased in the transaction.

The electronic device can transmit the additional transaction data (e.g., the transaction category and the personal memo) to the remote computing device in a message, and the remote computing device can store the data of the message in a record in a ledger (e.g., the ledger for the transaction category or a general ledger). The remote computing device can transmit a message to the electronic computing device that the storage was a success. The electronic computing device can generate and present a text output indicating the transaction data and additional transaction data have been stored and a location of the storage (e.g., the ledger in which the transaction data was stored), in some embodiments in response to the confirmation message from the remote computing device. The user can later upload an image of the receipt to the record for the transaction at the remote computing device and/or the electronic device. Any or all of the actions performed by the electronic device can be performed by the large language model of the device (e.g., such as by executing various adapters of the large language model when necessary).

In the scenario 1300, an electronic device (e.g., a cellular phone) of a user can receive a text (or a message through another communication protocol) indicating a transaction was performed and transaction data of the transaction. The user can respond to the text with a message to add additional context data for the transaction and the method of adding the context data. The message can include an indication of a method (e.g., voice or text) of adding the additional context data. In response to selecting the method of "voice," the electronic device can activate a chat application and the chat application can output audio data asking the user for an action to perform. The chat application can generate the request of the output audio data using a large language model such as by using the transaction data of the transaction and/or account data of an account through which the transaction was performed as input. In some embodiments, the electronic device can select the text to output as audio or text data from a stored set of text that the electronic device retrieves upon activation of the chat application.

The user and the electronic device can follow a similar script to the scenario 600 until the electronic device asks the user whether the user would like to provide an image of the receipt for the transaction. In the scenario 1300, the user can respond in the affirmative and indicate that the receipt is multiple pages. Responsive to receiving the input from the user indicating to store images of a receipt with multiple pages, the electronic device can automatically open (e.g., via the large language model) a camera application on the electronic device and the user can use the camera application to capture images of the receipt. The electronic device can output instructions on how to capture the images. The electronic device can capture each image of the receipt (e.g., covering multiple pages of the receipt). The user can input instructions to store the images of the receipt with the transaction data of the transaction in a transaction category of Warranties (e.g., in addition to the home office equipment transaction category the user previously selected).

The electronic device can transmit the additional transaction data (e.g., the transaction categories of warranty and/or home office equipment, the personal memo, and/or the images of the receipt) to the remote computing device in a message, and the remote computing device can store the data of the message in a record in a ledger (e.g., the ledger for the one or more both of the transaction categories or a general ledger). The remote computing device can transmit a message to the electronic computing device that the storage was a success. The electronic computing device can generate and present a text output indicating the transaction data and additional transaction data have been stored and a location of the storage (e.g., the ledger or ledgers in which the transaction data was stored), in some embodiments in response to the confirmation message from the remote computing device. Any or all of the actions performed by the electronic device can be performed by the large language model of the device (e.g., such as by executing various adapters of the large language model when necessary).

In the scenario 1400, an electronic device (e.g., a cellular phone) of a user can receive a text (or a message through another communication protocol) indicating a transaction was performed and transaction data of the transaction. The user can respond to the text with a message to add additional context data for the transaction and the method of adding the context data. The message can include an indication of a method (e.g., voice or text) of adding the additional context data. In response to selecting the method of "voice," the electronic device can activate a chat application and the chat application can output audio data asking the user for an action to perform. The chat application can generate the request of the output audio data using a large language model such as by using the transaction data of the transaction and/or account data of an account through which the transaction was performed as input. In some embodiments, the electronic device can select the text to output as audio or text data from a stored set of text that the electronic device retrieves upon activation of the chat application.

The user can provide an input (e.g., by speaking per the selected method) to record the amount for the transaction in multiple transaction categories. The electronic device can respond with a question as to which transaction categories to use and a list of transaction categories from which to choose. The electronic device can select the list of transaction categories based on account data of the account through which the transaction was performed. For example, the electronic device can identify historical transactions with similar transaction data (e.g., that were performed at times within a threshold of the time of the transaction, for amounts within a threshold of the amount of the transaction, at the same location, etc.) for which the user requested to record the amount for the transaction in multiple transaction categories. In another example, the electronic device can identify the most common transaction categories (e.g., the transaction categories with the highest counts of transactions in the respective ledgers of the transaction categories) that the user assigns to transactions. The electronic device can retrieve or determine such data by querying memory or the remote computing device for the account data. In some cases, the electronic device can determine the transaction categories to present using machine learning techniques on transaction data of the account of the user. The electronic device can present the selected list of transaction categories or at a user interface of the electronic device or otherwise play audio listing the transaction categories.

The user can provide an input indicating a transaction category from the list or another category not on the list and an amount or portion of the amount of the transaction to assign to the transaction category. The remote device can ask the user for another transaction category and an amount remaining for the transaction (e.g., the total amount for the transaction and the amount the user assigned to the transaction category). The user can respond with an indication to create a new transaction category for the remaining amount. The electronic device can request a name for the new transaction category and the user can input a name of "Charitable contributions with a receipt." In response, the electronic device can automatically assign the remaining balance to the new transaction category (e.g., store an indication that the remaining balance, or the value of the remaining balance, is assigned to the new transaction category). The electronic device can generate and present a response indicating the allocation was successful and ask the user if the user wishes to allocate any further additional transaction data (e.g., a personal memo). The user can affirmatively respond. The electronic device can generate a response requesting the additional transaction data. The user can provide the additional transaction data as input and indicate to include an image of a receipt for the transaction. The electronic device can activate the camera application on the electronic device and the user can capture an image of the receipt. The user can provide an input indicating the image is good and no further action is needed.

The electronic device can transmit the additional transaction data (e.g., the transaction categories and/or allocations of the transaction and/or the image of the receipt) to the remote computing device in a message, and the remote computing device can store the data of the message in a record in a ledger (e.g., the ledger for the one or both of the transaction categories or a general ledger). In some cases, the remote computing device can update the ledger of each transaction category indicating the allocation of the amount for the transaction. The remote computing device can create the ledger for the newly created transaction category, charitable contributions with a receipt, and update the new ledger with an amount of the transaction allocated to the new ledger (e.g., store a record in the new ledger indicating the allocated amount of the transaction to the transaction category of the ledger). The remote computing device can transmit a message to the electronic computing device that the storage was a success. The electronic computing device can generate and present a text output indicating the transaction data and additional transaction data have been stored and a location of the storage (e.g., the ledger or ledgers in which the transaction data was stored), in some embodiments in response to the confirmation message from the remote computing device. Any or all the actions performed by the electronic device can be performed by the large language model of the device (e.g., such as by executing various adapters of the large language model when necessary).

In the scenario 1500, an electronic device (e.g., a cellular phone) of a user can receive a text (or a message through another communication protocol) indicating a transaction was performed and transaction data of the transaction. The user can respond to the text with a message to add additional context data for the transaction and the method of adding the context data. The message can include an indication of a method (e.g., voice or text) of adding the additional context data. In response to selecting the method of "voice," the electronic device can activate a chat application and the chat application can output audio data asking the user for an action to perform. The chat application can generate the request of the output audio data using a large language model such as by using the transaction data of the transaction and/or account data of an account through which the transaction was performed as input. In some embodiments, the electronic device can select the text to output as audio or text data from a stored set of text that the electronic device retrieves upon activation of the chat application.

The user can provide an input (e.g., by speaking per the selected method) to record the amount for the transaction in multiple transaction categories. The electronic device can respond with a question as to which transaction categories to use and a list of transaction categories from which to choose. The electronic device can select the transaction categories of the list as described above. The user can select a transaction category and an amount via an input. The user can also indicate to add further additional transaction data (e.g., a memo) with a description of the transaction for the transaction category. The user can also indicate to store the same amount in a second transaction category. The electronic device can store the transaction data or transmit the transaction data to the remote computing device in a record according to the input instructions from the user (e.g., store the data in the ledgers of the respective transaction categories).

The electronic device can generate and present a response requesting another transaction category with the remaining balance of the transaction and a list of the transaction categories. The list can include a custom option that the user can select to create a new transaction category. The user can provide an input indicating another transaction category, an amount to allocate to the transaction category, and further additional transaction data (e.g., a memo) with a description of the transaction for the transaction category. The electronic device can store the transaction data or transmit the transaction data to the remote computing device in a record according to the input instructions from the user (e.g., store the data in the ledgers of the respective transaction categories). The electronic device can generate and present a response asking whether the user would like to attach an image of the receipt for the transaction. The user may respond in the affirmative. The electronic device can activate a camera application on the electronic device and the user can capture an image of the receipt with the camera application. The user can input instructions to store the images of the receipt with the transaction data of the transaction and any additional transaction data the user provided.

The electronic device can transmit the additional transaction data (e.g., the transaction categories and/or allocations of the transaction and/or the image of the receipt) to the remote computing device in a message, and the remote computing device can store the data of the message in a record in a ledger (e.g., the ledger for the one or both transaction categories or a general ledger). In some cases, the remote computing device can update the ledger of each transaction category indicating the allocation of the amount for the transaction. The remote computing device can transmit a message to the electronic computing device that the storage was a success. The electronic computing device can generate and present a text output indicating the transaction data and additional transaction data have been stored and a location of the storage (e.g., the ledger or ledgers in which the transaction data was stored), in some embodiments in response to the confirmation message from the remote computing device. Any or all the actions performed by the electronic device can be performed by the large language model of the device (e.g., such as by executing various adapters of the large language model when necessary).

In the scenario 1600, a user can record a record of a cash payment the user made to another entity (e.g., Charity A). The user can do so through a chat application on an electronic device (e.g., a cellular phone). For example, the user can open or activate the chat application on the electronic device. The chat application can output a request for an action the user would like to perform. The user can respond with an indication of a cash payment. The chat application can ask the user who the user paid and an amount and transaction category for the payment. The user can indicate the entity that the user paid, an amount of the payment (e.g., transaction), and a transaction category of category contribution-cash out of pocket." The chat application can repeat the user's input to the user and ask the user if the user would like to add further additional transaction data (e.g., a personal memo). The user can reply in the negative. The chat application can ask the user if any further action is to be performed. The user can respond with a request to record (e.g., store) the transaction in a personal taxes folder and that is all that needs to be done.

The electronic device can transmit the transaction data (e.g., the transaction or payment amount, the transaction categories) with instructions to record the transaction in multiple ledgers (e.g., the budgeting and personal taxes folders) to the remote computing device in a message, and the remote computing device can store the data of the message according to the instructions. In some cases, the remote computing device can update the ledger of each transaction category indicating the allocation of the amount for the transaction. The remote computing device can transmit a message to the electronic computing device that the storage was a success. The electronic computing device can generate and present a text output indicating the transaction data and additional transaction data have been stored and a location of the storage (e.g., the ledger or ledgers in which the transaction data was stored), in some embodiments in response to the confirmation message from the remote computing device. Any or all the actions performed by the electronic device can be performed by the large language model of the device (e.g., such as by executing various adapters of the large language model when necessary).

Information that a user can include in an input memo (e.g., a personal memo) can include, for example, budget category selections, sharing receipt info with multiple categories, receipt image capture, digital receipt import, allocating partial receipt amounts across multiple categories, allocating transactions to individual business clients, splitting personal and business entries with separate categories for personal and business, entry "off bank" transaction info (transactions conducted via another institution or in person via cash) or personalized memos to help user remember context unique to their experience about the transaction (gifts to family members, sizes, colors, styles, etc.).

In some embodiments, a chat application as described herein can generate recommendations. For example, a user can use a computer implementing the systems and methods described herein to initiate a conversational with a chat application hosting a large language model to get real time status of their financial picture using graphs, tables, charts, and text to highlight savings levels versus goals, projections of income and fixed expenses over time, highlighting gaps where short term loans or money movement may be needed. Based on the conversational capture with personal context, the chat application and/or the remote computing device in communication with the chat application can track and predict funds needed for recurring items like subscription renewals, recurring item purchases, membership renewals, loyalty card renewal fees, tax payments, etc. The collection of this information can enable the chat application and/or the remote computing device to use category totals to be tracked over time so that real time financial projections of category impact can be made for current and future months.

In some embodiments, chat application features as described herein can be combined with real time merchant feeds to provide highly personalized push notices with purchase suggestions (e.g., with a savings benefit noted) based on their current proximity to stores, and the use of user behavior and purchase history matched to the relevant store saving promotions-enabled by personal context from the user. The chat application or the remote computing device can provide predictions each month as to how much is safe to save. The chat application or the remote computing device can also make (e.g., using machine learning techniques) predictions at a given point in time how much discretionary funds are available for a needed non-recurring purchase. The chat application or the remote computing device can provide projections for the impact of a new purchase that has an on-going term payment. The digital tracking of income and spending which is enhanced with user context, coupled with specific artificial intelligence or machine learning modules and stages of execution can enable different real time projections of financial health and recommendations for the least cost/impact options for covering any projected short fall.

In one example, prior to executing a transaction, at initiation, the chat application can generate insights regarding a general safe to spend request without impact to goals or credit, a safe to save request without impact to future required funds, or a request for a current financial position summary. These would be very specific insights based on historical and real time transactional history (including captured user unique context). In another example, the chat application can respond to a request for emergency spending of a specific amount. In response to such a request, the chat application can compare a safe to spend amount with an emergency needed amount. If there is a short fall, the chat application can initiate a second flow to determine the options for covering the shortage based on accessible savings amounts, accessible credit options and their cost, plus an analyzed impact to short- and long-term savings goals. In another example, the chat application can determine the optimum actions needed to allocate the requested funds that minimizes the cost of credit, impact to credit worthiness and impact to short- and long-term goals.

In another example, the chat application can use location, time, date, store proximity, past transactional behavior (including captured user unique context) at this proximity and a users' current financial summary to trigger personalized financial recommendations. For instance, prior to entering or while in a store. The chat application can generate recommendations based on current merchant data relative to sales and promotions. The chat application could receive and/or retrieve merchant provided information, the users current financial summary and past transactional activity at this proximity (leveraging captured user contextual data appended to prior transactions) to generate relevant personalized recommendations for taking advantage of sales and promotions of specific products and services without impacting their financial health. If there is a short fall, the chat application can generate a recommendation that includes financial products that minimize impact to financial health such as a low interest short term personal loan.

In some embodiments, a computer can use the systems and methods described herein to predict/project how 'spending' will affect the long-term budgeting goals. For example, to calculate the least financing cost and future impact on credit, the computer may need to 'know' and 'produce' features and variables that will help the computer to make accurate predictions. A prediction system that can know and produce features to make predictions is described below.

The system can include one or more artificial intelligence modules and stages. In a first stage, one or more artificial intelligence modules can predict and forecast the daily, weekly, monthly, and annual 'spending'. Stage one can provide insights on 'saving' by providing several artificial intelligence optimized routes of spending that will lead to better saving practices. As an example of these artificial intelligence optimized routes, the artificial intelligence modules can recommend and advise the user to spend less on some products or consumables. For example, based on predictions, the artificial intelligence modules can recommend the need to reduce the coffee or gas weekly spending during certain periods of time, a route to follow, that reallocates funds to support other financial areas that have a higher future need. Examples of input parameters for the stage one artificial intelligence modules can include Daily, weekly, monthly, and/or annual records for one or more of the following: Transactional data, balances and their types (checks, ATM, bill pay, cards, mobile, and/or websites), credit transaction and score, savings account(s) data, lines of credit balances and limits, user context info linked to transaction activity, added transaction activity from external aggregated sources or from conversational-smart guided input, and budget category detail and balances. Examples of an output of the stage one artificial intelligence modules can include a forecast/prediction of budget spending by category within some future time period (visualized as a table/chart/graph).

In a second stage, one or more artificial intelligence modules can predict how "desired" or "emergency spending" will impact users saving in the short and long-terms as well as the cost and options to cover short falls. The predicted impact could be generalized to measure the impact on other financial areas, such as credit scores or spending limits. The artificial intelligence modules of stage two can use the output of the artificial intelligence modules of stage one to create these impact scenarios and produce optimized spending and saving proposals.

In some embodiments, a computer can use the systems and methods described herein to generate recommendations by leveraging users' behavioral data, actions, and modelling of pattern recognition to recommend/suggest spending across budget categories to maximize savings and minimize the cost of credit. The computer can personalize and guide a user through the capture of user provided contextual data, category definitions and system interactions. In doing so, the computer can facilitate the labeling and tagging of data for use by the AI/ML system. Such methods can be directly applied to the user or be indirectly used by the business-line to enhance the user experience. Internally, business lines can provide personalized financial help in the way of specialized pre-approved loans as the recommendation system triggers real time needs.

In one example, the computer can (e.g., via the stage two artificial intelligence modules) generate a recommended tailored budget based on the outputs of the stage one artificial intelligence modules described above and the input parameters to generate the stage one artificial intelligence modules output. When emergency unplanned needs arise, using the systems and methods described herein, the computer can propose for the user money on hand that can be used, plus the optimum credit loan and payment terms that the user can afford, which may have minimum impact to the user's long-term savings and purchase goals.

In another example, the computer can provide the user with several emergency budget options and artificial intelligence optimized routes to spend the emergency budget (as well as how to pay the emergency budget off if the emergency budget was borrowed from the bank). In another example, the computer can predict the amount of emergency budget that can be available in the near future for a user and how to avoid delays in the user's long-term purchases. The computer can generate the outcome as a long-term projectile for the user's saving goals.

The computer can use the user interactions as described herein to use feedback from the user to automatically adjust the type of recommendations that the user receives (e.g., the computer can execute a large language model that has communicated with the user and/or other users to generate personalized recommendations for the user). Feedback crowd sourcing can be used to address community (e.g., a group of users) recommendations, such as via pattern recognition and similarity in which certain groups will share similar habits and interactions with the chat application hosting the large language model.

At least one aspect of a technical solution to the problems described herein is directed to a mobile electronic device. The mobile electronic device can include a network interface; and one or more processors coupled to memory. The one or more processors can be configured by machine-readable instructions to receive, from a remote computing device and via the network interface, a message comprising transaction data regarding a transaction and a request regarding activating a chat application stored in the memory, the transaction performed by a transaction card associated with an account; responsive to a user input at the electronic device, activate the chat application, wherein the chat application is configured to, upon activation: execute a large language model using the transaction data and account data associated with the account as input to generate a first string of text requesting further data regarding the transaction; present the first string of text at a chat interface of the chat application; receive, at the chat interface via a first user input, additional transaction data regarding the transaction; execute the large language model using the additional transaction data as input to generate a second string of text indicating storage of the additional data in a record at the remote computing device; and present the second string of text at the chat interface of the chat application.

In some embodiments, the one or more processors are further configured to transmit, to the remote computing device, a second message comprising the additional transaction data to the remote computing device, wherein the remote computing device stores the additional transaction data in a record of a ledger comprising one or more records of transactions performed by the transaction card. In some embodiments, the one or more processors are further configured to retrieve the account data from a database in the memory. In some embodiments, the one or more processors are further configured to receive the account data from the remote computing device. In some embodiments, the transaction data comprises a time of the transaction, a location of the transaction, and an amount of the transaction. In some embodiments, the additional transaction data of the transaction comprises a transaction category of the transaction; and wherein the one or more processors are configured to transmit a second message comprising an identification of the transaction category and an identification of the transaction to the remote computing device.

In some embodiments, the remote computing device is configured to determine the account associated with the transaction card is not associated with the transaction category from the second message; in response to the determination, generate a data structure comprising a ledger for transactions associated with the transaction category performed by the transaction card under the account; and store the transaction data of the transaction in the ledger. In some embodiments, the transaction is performed by a transaction card, and wherein the remote computing device is configured to identify the account associated with the transaction card; identify a data structure comprising a ledger for transactions associated with the transaction category performed by the transaction card under the account; and store the transaction data of the transaction in the ledger.

In some embodiments, the chat application is configured to receive the additional transaction data regarding the transaction as audio data; and execute one or more machine learning models to convert the additional transaction data into text, wherein the chat application is configured to execute the large language model using the additional transaction data as input by using the converted text of the additional transaction data as input. In some embodiments, the chat application is configured to activate a camera application stored in the memory of the mobile electronic device; receive an image of a document associated with the transaction from the camera application; receive a third user input at the chat interface indicating to store the image; execute the large language model using the third user input as input to generate a third string of text indicating the image has been stored; and present the third string of text at the chat interface of the chat application. In some embodiments, the one or more processors are further configured to transmit the image of the document to the remote computing device.

At least one aspect of a technical solution to the problems described herein is directed to a method. The method may include receiving, by one or more processors from a remote computing device, a message comprising transaction data regarding a transaction and a request regarding activating a chat application stored in memory, the transaction performed by a transaction card associated with an account; responsive to a user input, activating, by the one or more processors, the chat application; upon activation of the chat application, executing, by the one or more processors via the chat application, a large language model using the transaction data and account data associated with the account as input to generate a first string of text requesting further data regarding the transaction; presenting, by the one or more processors via the chat application, the first string of text at a chat interface of the chat application; receiving, by the one or more processors via the chat application and at the chat interface via a first user input, additional transaction data regarding the transaction; executing, by the one or more processors via the chat application, the large language model using the additional transaction data as input to generate a second string of text indicating storage of the additional data in a record at the remote computing device; and presenting, by the one or more processors via the chat application, the second string of text at the chat interface of the chat application.

In some embodiments, method further comprises transmitting, by the one or more processors to the remote computing device, a second message comprising the additional transaction data to the remote computing device, wherein the remote computing device stores the additional transaction data in a record of a ledger comprising one or more records of transactions performed by the transaction card.

The functionality described herein can be used for budgeting, goal tracking, saving, investing and personalized guidance to safely making financial purchases or investments without impacting the ability to cover their necessities or long-term savings goals.

At least one aspect of a technical solution to the problems described herein is directed to non-transitory computer-readable storage media. The non-transitory computer-readable storage media storing executable instructions that, when executed by one or more processors, cause the one or more processors to receive, from a remote computing device, a message comprising transaction data regarding a transaction and a request regarding activating a chat application, the transaction performed by a transaction card associated with an account; responsive to a user input, activate the chat application, wherein the chat application is configured to, upon activation: execute a large language model using the transaction data and account data associated with the account as input to generate a first string of text requesting further data regarding the transaction; present the first string of text at a chat interface of the chat application; receive, at the chat interface via a first user input, additional transaction data regarding the transaction; execute the large language model using the additional transaction data as input to generate a second string of text indicating storage of the additional data in a record at the remote computing device; and present the second string of text at the chat interface of the chat application.

In some embodiments, the transaction is performed by a transaction card, and wherein execution of the instructions further causes the one or more processors to transmit, to the remote computing device, a second message comprising the additional transaction data to the remote computing device, wherein the remote computing device stores the additional transaction data in a record of a ledger comprising one or more records of transactions performed by the transaction card. In some embodiments, execution of the instructions further causes the one or more processors to retrieve the account data from a database. In some embodiments, execution of the instructions further causes the one or more processors to receive the account data from the remote computing device. In some embodiments, the transaction data comprises a time of the transaction, a location of the transaction, and an amount of the transaction.

In some embodiments, the additional transaction data of the transaction comprises a transaction category of the transaction; and wherein execution of the instructions further causes the one or more processors to transmit a second message comprising an identification of the transaction category and an identification of the transaction to the remote computing device. In some embodiments, the transaction is performed by a transaction card, and wherein the remote computing device is configured to determine the account associated with the transaction card is not associated with the transaction category from the second message; in response to the determination, generate a data structure comprising a ledger for transactions associated with the transaction category performed by the transaction card under the account; and store the transaction data of the transaction in the ledger.

Computing Environment

Figure 17:
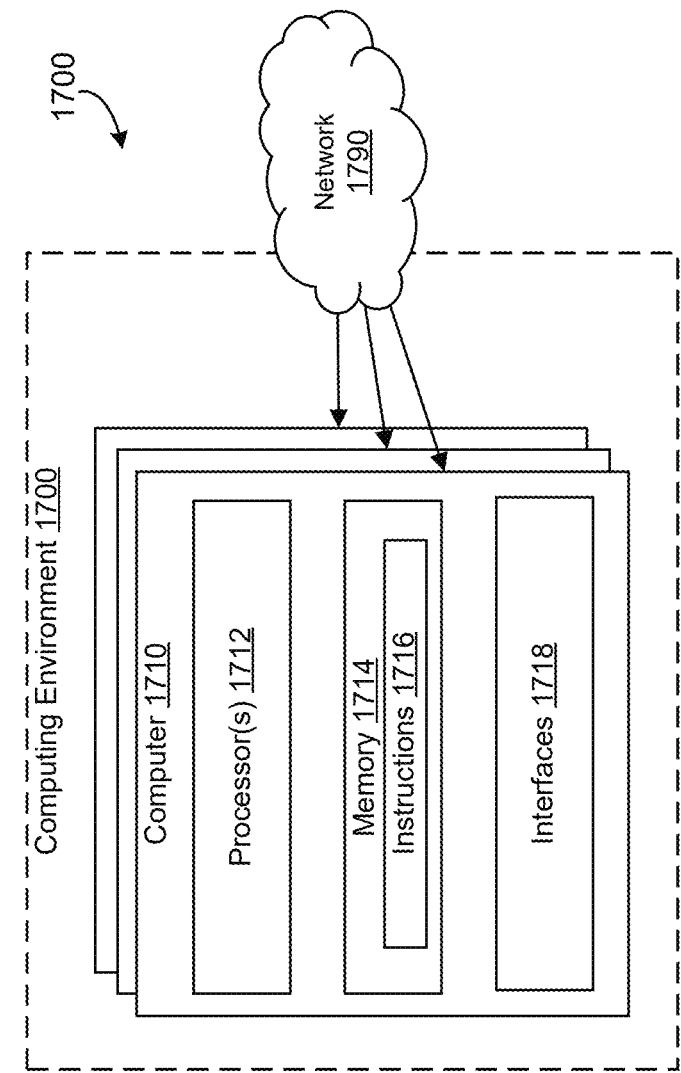
FIG. 17 discloses a computing environment in which aspects of the present disclosure may be implemented.

FIG. 17 discloses a computing environment 1700 in which aspects of the present disclosure may be implemented. A computing environment 1700 includes a set of computers 1710, where the set of computers 1710 may include of one or more virtual or physical computers that individually or in cooperation achieve tasks, such as implementing one or more aspects described herein. The set of computers 1710 have components that cooperate to cause output based on input. The set of computers 1710 include desktops, servers, mobile devices (e.g., smart phones and laptops), payment terminals, wearables, virtual/augmented/ expanded reality devices, spatial computing devices, virtualized devices, other computers, or combinations thereof. In particular example implementations, the computing environment 1700 includes at least one physical computer.

The computing environment 1700 may specifically be used to implement one or more aspects described herein. In some examples, one or more of the set of computers 1710 may be implemented as a user device, such as a mobile device, and others of the set of computers 1710 may be used to implement aspects of a machine learning framework usable to train and deploy models exposed to the mobile device or provide other functionality, such as through exposed application programming interfaces.

The computing environment 1700 can be arranged in any of a variety of ways. In some embodiments, one or more computers of the set of computers 1710 can be local to or remote from other computers of the set of computers 1710 of the computing environment 1700. In some embodiments, the set of computers 1710 may be arranged according to client-server models, peer-to-peer models, edge computing models, other models, or combinations thereof.

In many examples, the set of computers 1710 are communicatively coupled with devices internal or external to the computing environment 1700 via a network 1790. The network 1790 is a set of devices that facilitate communication from a sender to a destination, such as by implementing communication protocols. Example network 1790 include local area networks, wide area networks, intranets, or the Internet.

In some implementations, the set of computers 1710 can be general-purpose computing devices (e.g., consumer computing devices). In some instances, via hardware or software configuration, the set of computers 1710 can be special purpose computing devices, such as servers able to practically handle large amounts of client traffic, machine learning devices able to practically train machine learning models, data stores able to practically store and respond to requests for large amounts of data, other special purpose computers, or combinations thereof. The relative differences in capabilities of different kinds of computing devices can result in certain devices specializing in certain tasks. For instance, a machine learning model may be trained on a powerful computing device and then stored on a relatively lower powered device for use.

In some embodiments, one or more computers of the set of computers 1710 include one or more processors 1712, memory 1714, and one or more interfaces 1718. Such components can be virtual, physical, or combinations thereof.

The one or more processors 1712 are components that execute instructions, such as instructions that obtain data, process the data, and provide output based on the processing. The one or more processors 1712 often obtain instructions and data stored in the memory 1714. The one or more processors 1712 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1712 include at least one physical processor implemented as an electrical circuit. Examples of one or more processors 1712 may include INTEL, AMD, QUALCOMM, TEXAS INSTRUMENTS, and APPLE processors.

The memory 1714 is a collection of components configured to store instructions 1716 and data for later retrieval and use. The instructions 1716 can, when executed by the one or more processors 1712, cause the execution of one or more operations that implement aspects described herein. In many examples, the memory 1714 may be one or more non-transitory, machine-readable media, such as random-access memory, read-only memory, cache memory, registers, portable memory (e.g., enclosed drives or optical disks), mass storage devices, hard drives, solid state drives, other kinds of memory, or combinations thereof. In certain circumstances, memory may be transitory and may store information encoded in transient signals.

The one or more interfaces 1718 are components that facilitate receiving input from and providing output to something external to the set of computers 1710, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors, such as those using the Global Positioning System), other input components, or combinations thereof (e.g., a touch sensitive display). The one or more interfaces 1718 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as WI-FI, cellular, BLUETOOTH, ZIGBEE, or other protocols). One or more of the one or more interfaces 1718 can facilitate connection of the computing environment 1700 to a network 1790.

The set of computers 1710 can include any of a variety of other components to facilitate the performance of operations described herein. Example components include one or more power units (e.g., batteries, capacitors, power harvesters, or power supplies) that provide operational power, one or more buses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions), among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 18:
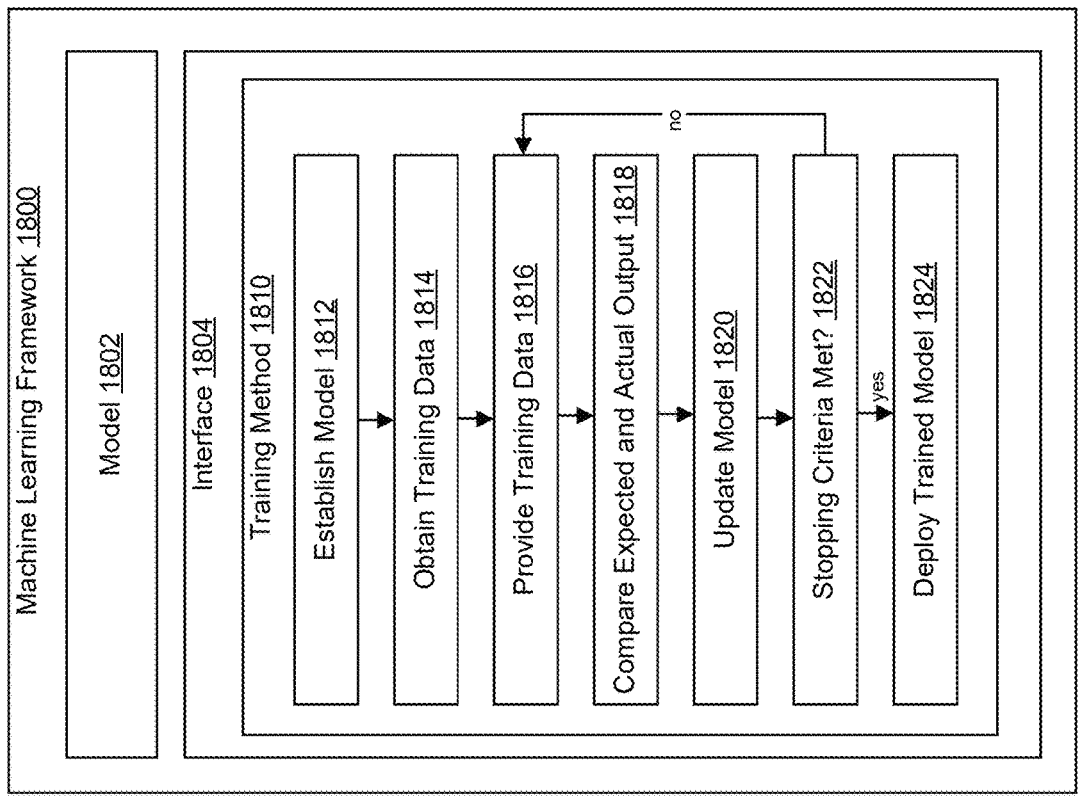

FIG. 18 illustrates an example machine learning framework 1800 that techniques described herein may benefit from. A machine learning framework 1800 is a collection of software and data that implements artificial intelligence trained to provide output, such as predictive data, based on input. Examples of artificial intelligence that can be implemented with machine learning ways include neural networks (e.g., graph neural networks), language models (including so-called "large language models"), generative models, natural language processing models, adversarial networks, decision trees, Markov models, support vector machines, genetic algorithms, others, or combinations thereof. A person of skill in the art, having the benefit of this disclosure, will understand that these artificial intelligence implementations need not be equivalent to each other and may instead select from among them based on the context in which they will be used. A machine learning framework 1800 or components thereof are often built or refined from existing frameworks, such as TENSORFLOW by GOOGLE, INC. or PYTORCH by the PYTORCH community.

The machine learning framework 1800 can include one or more versions of the model 1802 that are the structured representation of learning and an interface 1804 that supports use of the model 1802. The model 1802 can take any of a variety of forms. In many examples, the model 1802 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1802 can include a representation of memory (e.g., providing long short-term memory functionality). Where the set includes multiple versions of the model 1802, the multiple versions of the model 1802 can be linked, cooperate, or compete to provide output.

The interface 1804 can include software procedures (e.g., defined in a library) that facilitate the use of the model 1802, such as by providing a way to establish and interact with the model 1802. For instance, the software procedures can include software for receiving input, preparing input for use (e.g., by performing vector embedding, such as using Word2Vec, BERT, or another technique), processing the input with the model 1802, providing output, training the model 1802, performing inference with the model 1802, fine-tuning the model 1802, other procedures, or combinations thereof.

In an example implementation, interface 1804 can be used to facilitate a training method 1810 that can include operation 1812. Operation 1812 includes establishing a model 1802, such as initializing a model 1802. The establishing can include setting up the model 1802 for further use (e.g., by training or fine tuning). The model 1802 can be initialized with values. In examples, the model 1802 can be pretrained. Operation 1814 can follow operation 1812. Operation 1814 includes obtaining training data. In many examples, the training data includes pairs of input and desired output given the input. In supervised or semi-supervised training, the data can be prelabeled, such as by human or automated labelers. In unsupervised learning, the training data can be unlabeled. The training data can include validation data used to validate the model 1802 after the model 1802 is trained. Operation 1816 can follow operation 1814. Operation 1816 includes providing a portion of the training data to the model 1802. This can include providing the training data in a format usable by the model 1802. The machine learning framework 1800 (e.g., via the interface 1804) can cause the model 1802 to produce an output based on the input. Operation 1818 can follow operation 1816. Operation 1818 includes comparing the expected output with the actual output. In an example, this can include applying a loss function to determine the difference between expected and actual. This value can be used to determine how training is progressing. Operation 1820 can follow operation 1818. Operation 1820 includes updating the model 1802 based on the result of the comparison. This can take any of a variety of forms depending on the nature of the model 1802. Where the model 1802 includes weights, the weights can be modified to increase the likelihood that the model 1802 will produce the correct output given an input. Depending on the model 1802, backpropagation or other techniques can be used to update the model 1802. Operation 1822 can follow operation 1820. Operation 1822 includes determining whether a stopping criterion has been reached, such as based on the output of the loss function (e.g., actual value or change in value over time). In addition to, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1814. If the stopping criterion has been satisfied, the flow can move to operation 1824. Operation 1824 includes deploying the model 1802 for use in production, such as providing the model 1802 with real-world input data and producing output data used in a real-world process. The model 1802 can be stored in memory 1714 of the set of computers 1710 or distributed across memories of two or more computers of the set of computers 1710 for production of output data (e.g., predictive data).

Application of Techniques

Techniques herein may be applicable to improving technological processes of a financial institution, such as technological aspects of actions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more. As used in this disclosure, a random process may include a pseudorandom process that involves the use of one or more algorithms to generate pseudorandom values. A random process may also include a physics-based random process that involves the use of a physical measurement to generate a random value.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage the training of a machine learning model with a diverse set of training data. Further, the policy can encourage testing for, and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. In addition, the systems and methods described herein may be performed in real time. It should also be noted that the systems and/or methods described above may be applied to, or used in accordance with, other systems and/or methods.

In some embodiments, the various computer systems and subsystems illustrated in the figures may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some, or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the words "can" or "may" are used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

These and other aspects and implementations are discussed in detail herein. The detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computer device," "computing device," or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the remote computing device, the electronic device 704, or the POS device 706) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

EMBODIMENTS

The present techniques will be better understood with reference to the following enumerated embodiments
Embodiment A.1. A method comprising: generating a first content sequence by using a context generation component to: determine distances between a set of content feature vectors and a client feature vector generated based on client-provided data, wherein control parameters of the context generation component are set to a first state; and determining the first content sequence based on the distances; sending, to a client device, a first message generated by sending, to a language model, the client-provided data and the first content sequence; obtaining an accuracy feedback indicator associated with the first message; determining an updated context generation component by applying a feedback-based protocol to the first state to set the control parameters to a second state based on the accuracy feedback indicator; generating a second content sequence by using the updated context generation component based on the set of content feature vectors and the client feature vector; and sending, to the client device, a second message generated by sending, to the language model, a second input comprising the client-provided data and the second content sequence.
Embodiment A.2. A method comprising: obtaining a client feature vector that is generated based on data stream data provided by a client device; generating a first content sequence representing relevant content for the data stream data by using a context generation component to (1) determine distances between a set of content feature vectors stored in a vector database and the client feature vector and (2) determine the first content sequence based on the distances, wherein control parameters of the context generation component are set to a first state to control a selection and an order of the first content sequence; sending, to the client device, a first message generated by sending, to a language model, the data stream data and the first content sequence; obtaining, from the client device, an accuracy feedback indicator associated with the first message after the first message is presented on a visual display of the client device; in response to obtaining the accuracy feedback indicator, updating the context generation component by applying a feedback-based protocol to the first state to set the control parameters to a second state based on the accuracy feedback indicator; generating a second content sequence by using the updated context generation component based on the set of content feature vectors and the client feature vector; and sending, to the client device, a second message generated by sending, to the language model, a second input comprising the data stream data and the second content sequence.
Embodiment A.3. A method comprising: generating a first content sequence by using a context generation component to (1) determine distances between a set of content feature vectors and a client feature vector generated based on client-provided data and (2) determine the first content sequence based on the distances, wherein control parameters of the context generation component are set to a first state; sending, to a client device, a first message generated by sending, to a language model, the client-provided data and the first content sequence; obtaining an accuracy feedback indicator associated with the first message; determining an updated context generation component by applying a feedback-based protocol to the first state to set the control parameters to a second state based on the accuracy feedback indicator; generating a second content sequence by using the updated context generation component based on the set of content feature vectors and the client feature vector; and sending, to the client device, a second message generated by sending, to the language model, a second input comprising the client-provided data and the second content sequence.
Embodiment A.4. The method of any of the embodiments above, wherein: the set of content feature vectors is associated with a first set of document weights; determining the first content sequence based on the distances comprises: determining a first set of modified weights based on the first set of document weights and the distances; determining a content order of the first content sequence by sorting the content of the first content sequence by the first set of modified weights; setting the control parameters to the second state comprises modifying the first set of document weights to determine a second set of document weights; and generating the second content sequence comprises: determining a second set of modified weights based on the second set of document weights and the distances; and determining a new content order of the second content sequence by sorting the content of the second content sequence based on the second set of modified weights.
Embodiment A.5. Embodiment 4. The method of any of the embodiments above, further comprising: determining the first set of document weights based on document categories assigned to the set of content feature vectors, wherein each respective vector of the set of content feature vectors is associated one or more categories of the document categories; and updating at least one association between a category of the document categories and a vector of the set of content feature vectors based a difference between the first set of document weights and the second set of document weights.
Embodiment A.6. The method of any of the embodiments above, wherein the accuracy feedback indicator comprises an indication of at least one of a loss function output, a recall output, or a precision score.
Embodiment A.7. The method of any of the embodiments above, wherein obtaining the accuracy feedback indicator comprises: generating a response vector by providing the first message to an encoder; and determining the accuracy feedback indicator based on a difference between the response vector and the client feature vector.
Embodiment A.8. The method of any of the embodiments above, wherein applying the feedback-based protocol comprises: retrieving a previous parameter update gradient associated with a previous iteration; determining a result indicating that the accuracy feedback indicator indicates an improvement in accuracy; determining a next parameter update gradient based on the previous parameter update gradient, wherein the feedback-based protocol determines a next vector direction of the next parameter update gradient based on a previous vector direction of the previous parameter update gradient; and determining the second state by adding a second vector determined based on the next parameter update gradient to the first state.
Embodiment A.9. The method of any of the embodiments above, further comprising determining a result indicating that the accuracy feedback indicator satisfies an accuracy threshold, wherein updating the context generation component comprises updating the context generation component in response to the result.

Embodiment A.10. The method of any of the embodiments above, further comprising: generating a set of random values using a random or pseudorandom process; and setting the first state based on the set of random values.

Embodiment A.11. The method of any of the embodiments above, wherein the feedback-based protocol comprises an exploration parameter and a reward parameter, wherein applying the feedback-based protocol comprises: determining a first random value; determining a function output based on the first random value, the exploration parameter, and the reward parameter; and based on the function output, determining the second state by updating the first state with a set of random values.

Embodiment A.12. The method of any of the embodiments above, wherein the control parameters comprise a set of search parameters, and wherein applying the feedback-based protocol comprises setting the set of search parameters to search for a greater number of neighbors of the client feature vector.

Embodiment A.13. The method of any of the embodiments above, the operations comprising determining a value k based on an input window size of the language model, wherein determining the first content sequence comprises updating the first content sequence to comprise a first k relevant document.

Embodiment A.14. The method of any of the embodiments above, wherein the feedback-based protocol is a first feedback-based protocol, the operations further selecting the first feedback-based protocol from a plurality of feedback-based protocol.

Embodiment A.15. The method of any of the embodiments above, wherein: the set of content feature vectors is associated with a first set of document weights; determining the first content sequence based on the distances comprises: determining a first set of modified weights based on the first set of document weights and the distances; determining a content order of the first content sequence by sorting the first content sequence based on the first set of modified weights; setting the control parameters to the second state comprises modifying the first set of document weights to determine a second set of document weights; and generating the second content sequence comprises: determining a second set of modified weights based on the second set of document weights and the distances; and determining a new content order of the second content sequence by sorting the second content sequence based on the second set of modified weights.

Embodiment A.16. The method of any of the embodiments above, wherein the accuracy feedback indicator comprises an indication of at least one of a loss function output, a recall output, or a precision score.

Embodiment A.17. The method of any of the embodiments above, wherein obtaining the accuracy feedback indicator comprises: generating a response vector by providing the first message to an encoder; and determining the accuracy feedback indicator based on a difference between the response vector and the client feature vector.

Embodiment A.18. The method of any of the embodiments above, wherein applying the feedback-based protocol comprises: retrieving a previous parameter update gradient associated with a previous iteration; determining a result indicating that the accuracy feedback indicator indicates an improvement in accuracy; determining a next parameter update gradient based on the previous parameter update gradient, wherein the feedback-based protocol determines a next vector direction of the next parameter update gradient based on a previous vector direction of the previous parameter update gradient; and determining the second state by adding a second vector determined based on the next parameter update gradient to the first state.

Embodiment A.19. The method of any of the embodiments above, the operations further comprising determining a result indicating that the accuracy feedback indicator satisfies an accuracy threshold, wherein updating the context generation component comprises updating the context generation component in response to the result.

Embodiment A.20. The method of any of the embodiments above, the operations further comprising: generating a set of random values using a random or pseudorandom process; and setting the first state based on the set of random values.

Embodiment B.1. One or more non-transitory, machine-readable media storing program code that, when executed by one or more processors, causes the one or more processors to perform operations comprising: obtaining a first vector associated with a text sequence and a second vector associated with data stream data; selecting a first vector subset by determining a ranking of first distances between content vectors and at least one of the first vector or the second vector using control parameters configured to a first state; obtaining a first message by sending, to a language model, a prompt comprising the text sequence and a first input context, the first input context comprising the data stream data and first content associated with the first vector subset; updating the control parameters to a second state by using a feedback-based protocol based on the first state and a feedback indicator; selecting a second vector subset by determining a ranking of second distances between the content vectors and at least one of the first vector and the second vector using the control parameters after updating the control parameters to the second state; and obtaining a second message by sending, to the language model, the data stream data, second content mapped to the second vector subset, and the text sequence.

Embodiment B.2. A system for providing adaptive responses to multiple client devices by varying control parameters based on feedback from one or more of the multiple client devices, the system comprising one or more processors and one or more machine-readable media storing program instructions that, when executed by the one or more processors, causes the one or more processors to perform operations comprising: generating a text sequence vector based on a text sequence entered into a first client device and a feature vector based on data stream data provided by a second client device; selecting a first vector subset by (1) determining first distances between content vectors and at least one of the text sequence vector or the feature vector using control parameters configured to a first state and (2) filtering the first distances based on a ranking of the first distances; selecting a first vector subset by (1) determining first distances between content vectors and at least one of the text sequence vector or the feature vector using control parameters configured to a first state and (2) filtering the first distances based on a ranking of the first distances; obtaining a first message by sending, to a language model, a first input comprising the text sequence and a first input context, the first input context comprising the data stream data and first content mapped to the first vector subset; updating the control parameters to a second state by using a feedback-based protocol based on the first state and a feedback indicator obtained from the first client device; selecting a second vector subset by (1) determining second distances between the content vectors and at least one of the text sequence vector and the feature vector using the control parameters after updating the control parameters to the second state and (2) filtering the second distances based on a ranking of the second distances; and obtaining a second message by sending, to the language model, a second input comprising the text sequence and a second input context, the second input context comprising the data stream data and second content mapped to the second vector subset; and sending the second message to the first client device.

Embodiment B.3. A method comprising: obtaining a first vector associated with a text sequence entered into a first client device and a second vector associated with data stream data provided by a second client device; selecting a first vector subset by determining a ranking of first distances between content vectors and at least one of the first vector or the second vector using control parameters configured to a first state; obtaining a first message by sending, to a language model, a prompt comprising the text sequence and a first input context, the first input context comprising the data stream data and first content associated with the first vector subset; updating the control parameters to a second state by using a feedback-based protocol based on the first state and a feedback indicator; selecting a second vector subset by determining a ranking of second distances between the content vectors and at least one of the first vector and the second vector using the control parameters after updating the control parameters to the second state; and obtaining a second message by sending, to the language model, the data stream data, second content mapped to the second vector subset, and the text sequence.

Embodiment B.4. The method of any of the embodiments above, wherein determining the ranking of the first distances comprises determining the first distances, and wherein determining the first distances comprises determining distances between content vectors and the second vector associated with the data stream data.

Embodiment B.5. The method of any of the embodiments above, wherein: the feedback-based protocol comprises a neural network, using the feedback-based protocol comprises providing, as inputs to the neural network, a parameter set and the feedback indicator, and the parameter set comprises a parameter controlling a limit on a count of nearest neighbors, a parameter controlling a number of clusters to search, a parameter controlling a search radius, or a parameter controlling a search time.

Embodiment B.6. The method of any of the embodiments above, wherein the data stream data comprises voice data, and wherein obtaining the second vector comprises generating tokens based on the voice data.

Embodiment B.7. The method of any of the embodiments above, wherein the data stream data comprises visual data, and wherein obtaining the second vector comprises: applying a convolutional neural network to the visual data to recognize a set of object categories; and generating the second vector based on the set of object categories.

Embodiment B.8. The method of any of the embodiments above, further comprising determining a domain category associated with the text sequence, wherein determining the first distances between the content vectors and the second vector comprises selecting a set of databases comprising the content vectors based on the domain category.

Embodiment B.9. The method of any of the embodiments above, wherein determining the domain category comprises determining the domain category by determining domain space vector distances between the text sequence and a set of domain category vectors representing different domain categories.

Embodiment B.10. The method of any of the embodiments above, wherein the feedback indicator indicates a failed outcome or a negative reward, and wherein applying the feedback-based protocol comprises: determining a set of parameter space directions of a previous update to the control parameters; selecting an opposite direction of the set of parameter space directions; and setting a parameter value of the second state based on the opposite direction.

Embodiment B.11. The method of any of the embodiments above, further comprising obtaining the feedback indicator, wherein obtaining the feedback indicator comprises: determining a result indicating that the first message comprises an output value that exceeds a set of numeric boundaries; and generating the feedback indicator based on the result, wherein the feedback indicator indicates a failed outcome.

Embodiment B.12. The method of any of the embodiments above, further comprising obtaining the feedback indicator, wherein obtaining the feedback indicator comprises: retrieving a set of target tokens based on the text sequence or the data stream data; determining a count of matches between the set of target tokens and the first message; determining a result indicating that the count of matches does not satisfy a threshold; and generating the feedback indicator based on the result, wherein the feedback indicator indicates a failed outcome.

Embodiment B.13. The one or more non-transitory, machine-readable media of any of the embodiments above, wherein updating the control parameters to the second state comprises: obtaining a set of tolerance boundaries; determining a result indicating that a candidate new state satisfies the set of tolerance boundaries; and setting the control parameters to the candidate new state based on the result.

Embodiment B.14. The one or more non-transitory, machine-readable media of any of the embodiments above, wherein updating the control parameters comprises modifying a parameter controlling an order of an input context.

Embodiment B.15. The one or more non-transitory, machine-readable media of any of the embodiments above, wherein determining the ranking of the first distances comprises: determining the first distances between the content vectors and at least one of the first vector or the second vector using the control parameters; and ranking the first distances.

Embodiment B.16. The one or more non-transitory, machine-readable media of any of the embodiments above, wherein determining the ranking of the first distances comprises determining the first distances, and wherein determining the first distances comprises between the content vectors and the second vector associated with the data stream data.

Embodiment B.17. The one or more non-transitory, machine-readable media of any of the embodiments above, wherein: the feedback-based protocol comprises a neural network, using the feedback-based protocol comprises providing, as inputs to the neural network, a parameter set and the feedback indicator, and the parameter set comprises a parameter controlling a limit on a count of nearest neighbors, a parameter controlling a number of clusters to search, a parameter controlling a search radius, or a parameter controlling a search time.

Embodiment B.18. The one or more non-transitory, machine-readable media of any of the embodiments above, the operations further comprising: obtaining text data in an image; applying a convolutional neural network the image to obtain text data; generating the second vector based on the text data.

Embodiment B.19. The one or more non-transitory, machine-readable media of any of the embodiments above, the operations further comprising determining a domain category associated with the text sequence, wherein determining the first distances between the content vectors and the second vector comprises selecting a set of databases comprising the content vectors based on the domain category.

Embodiment B.20. The one or more non-transitory, machine-readable media of any of the embodiments above, the operations further comprising obtaining the feedback indicator, wherein obtaining the feedback indicator comprises: determining a result indicating whether a count of matches between a set of target tokens associated with the data stream data and the first message satisfies a set of criteria; and generating the feedback indicator based on the result.

Embodiment A.21. One or more tangible, non-transitory, machine-readable media storing instructions that, when executed by a set of processors, cause the set of processors to effectuate operations including those of any of embodiments A.1 to A.20 or B.1 to embodiments B.20.

Embodiment A.22. A system comprising: a set of processors and a set of media storing computer program instructions that, when executed by the set of processors, cause the set of processors to effectuate operations including those of any of embodiments A.1 to A.20 or embodiments B.1 to B.20.

What is claimed is:

1. A method for providing adaptive responses to data stream data comprising:
    obtaining a first vector associated with a text sequence entered into a first client device and a second vector associated with data stream data provided by a second client device;
    selecting a first vector subset by determining a ranking of first distances between content vectors and at least one of the first vector or the second vector using control parameters configured to a first state;
        wherein determining the ranking of the first distances comprises determining the first distances, and wherein determining the first distances comprises determining distances between content vectors and the second vector associated with the data stream data;
    determining first content to be used as input context for a language model based on the first vector subset;
    obtaining a first message by sending, to the language model, a prompt comprising the text sequence and the first input context, the first input context comprising the data stream data and first content associated with the first vector subset;
    updating the control parameters to a second state by using a feedback-based protocol based on the first state and a feedback indicator;
    determining a second vector subset by performing search using the updated control parameters;
    selecting a second vector subset by determining a ranking of second distances between the content vectors and at least one of the first vector and the second vector using the control parameters after updating the control parameters to the second state; and
    obtaining a second message by sending, to the language model, the data stream data, second content mapped to the second vector subset, and the text sequence.

2. The method of claim 1, wherein:
    the feedback-based protocol comprises a neural network,
    using the feedback-based protocol comprises providing, as inputs to the neural network, a parameter set and the feedback indicator, and
    the parameter set comprises a parameter controlling a limit on a count of nearest neighbors, a parameter controlling a number of clusters to search, a parameter controlling a search radius, or a parameter controlling a search time.

3. The method of claim 1, wherein the data stream data comprises voice data, and wherein obtaining the second vector comprises generating tokens based on the voice data.

4. The method of claim 1, wherein the data stream data comprises visual data, and wherein obtaining the second vector comprises:
    applying a convolutional neural network to the visual data to recognize a set of object categories; and
    generating the second vector based on the set of object categories.

5. The method of claim 1, further comprising determining a domain category associated with the text sequence, wherein determining the first distances between the content vectors and the second vector comprises selecting a set of databases comprising the content vectors based on the domain category.

6. The method of claim 5, wherein determining the domain category comprises determining the domain category by determining domain space vector distances between the text sequence and a set of domain category vectors representing different domain categories.

7. The method of claim 1, wherein the feedback indicator indicates a failed outcome or a negative reward, and wherein applying the feedback-based protocol comprises:
    determining a set of parameter space directions of a previous update to the control parameters;
    selecting an opposite direction of the set of parameter space directions; and
    setting a parameter value of the second state based on the opposite direction.

8. The method of claim 1, further comprising obtaining the feedback indicator, wherein obtaining the feedback indicator comprises:
    determining a result indicating that the first message comprises an output value that exceeds a set of numeric boundaries; and
    generating the feedback indicator based on the result, wherein the feedback indicator indicates a failed outcome.

9. The method of claim 1, further comprising obtaining the feedback indicator, wherein obtaining the feedback indicator comprises:
    retrieving a set of target tokens based on the text sequence or the data stream data;
    determining a count of matches between the set of target tokens and the first message;
    determining a result indicating that the count of matches does not satisfy a threshold; and
    generating the feedback indicator based on the result, wherein the feedback indicator indicates a failed outcome.

10. One or more non-transitory, machine-readable media storing program code that, when executed by one or more processors, causes the one or more processors to perform operations for providing adaptive responses to data stream data comprising:

obtaining a first vector associated with a text sequence and a second vector associated with data stream data;

selecting a first vector subset by determining a ranking of first distances between content vectors and at least one of the first vector or the second vector using control parameters configured to a first state;
　　wherein determining the ranking of the first distances comprises determining the first distances, and wherein determining the first distances comprises determining distances between content vectors and the second vector associated with the data stream data;

determining first content to be used as input context for a language model based on the first vector subset;

obtaining a first message by sending, to the language model, a prompt comprising the text sequence and the first input context, the first input context comprising the data stream data and first content associated with the first vector subset;

updating the control parameters to a second state by using a feedback-based protocol based on the first state and a feedback indicator;

determining a second vector subset by performing search using the updated control parameters;

selecting a second vector subset by determining a ranking of second distances between the content vectors and at least one of the first vector and the second vector using the control parameters after updating the control parameters to the second state; and obtaining a second message by sending, to the language model, the data stream data, second content mapped to the second vector subset, and the text sequence.

11. The one or more non-transitory, machine-readable media of claim 10, wherein updating the control parameters to the second state comprises:
　　obtaining a set of tolerance boundaries;
　　determining a result indicating that a candidate new state satisfies the set of tolerance boundaries; and
　　setting the control parameters to the candidate new state based on the result.

12. The one or more non-transitory, machine-readable media of claim 10, wherein updating the control parameters comprises modifying a parameter controlling an order of an input context.

13. The one or more non-transitory, machine-readable media of claim 10, wherein determining the ranking of the first distances comprises:
　　determining the first distances between the content vectors and at least one of the first vector or the second vector using the control parameters; and
　　ranking the first distances.

14. The one or more non-transitory, machine-readable media of claim 10, wherein:
　　the feedback-based protocol comprises a neural network,
　　using the feedback-based protocol comprises providing, as inputs to the neural network, a parameter set and the feedback indicator, and
　　the parameter set comprises a parameter controlling a limit on a count of nearest neighbors, a parameter controlling a number of clusters to search, a parameter controlling a search radius, or a parameter controlling a search time.

15. The one or more non-transitory, machine-readable media of claim 10, the operations further comprising:
　　obtaining text data in an image;
　　applying a convolutional neural network the image to obtain text data;
　　generating the second vector based on the text data.

16. The one or more non-transitory, machine-readable media of claim 10, the operations further comprising determining a domain category associated with the text sequence, wherein determining the first distances between the content vectors and the second vector comprises selecting a set of databases comprising the content vectors based on the domain category.

17. The one or more non-transitory, machine-readable media of claim 10, the operations further comprising obtaining the feedback indicator, wherein obtaining the feedback indicator comprises:
　　determining a result indicating whether a count of matches between a set of target tokens associated with the data stream data and the first message satisfies a set of criteria; and
　　generating the feedback indicator based on the result.

* * * * *